(12) United States Patent
Gherardi et al.

(10) Patent No.: US 10,440,533 B2
(45) Date of Patent: Oct. 8, 2019

(54) METHODS AND SYSTEMS FOR SCHEDULING THE TRANSMISSION OF LOCALIZATION SIGNALS AND OPERATING SELF-LOCALIZING APPARATUS

(71) Applicant: Verity Studios AG, Zurich (CH)

(72) Inventors: Luca Gherardi, Zurich (CH); Raffaello D'Andrea, Wollerau (CH); Markus Hehn, Zurich (CH); Markus Waibel, Zurich (CH)

(73) Assignee: Verity Studios AG, Zurich (CH)

( * ) Notice: Subject to any disclaimer, the term of this patent is extended or adjusted under 35 U.S.C. 154(b) by 0 days.

(21) Appl. No.: 16/167,482

(22) Filed: Oct. 22, 2018

(65) Prior Publication Data

US 2019/0058977 A1  Feb. 21, 2019

Related U.S. Application Data

(63) Continuation of application No. 15/168,122, filed on May 30, 2016, now Pat. No. 10,111,044, which is a
(Continued)

(51) Int. Cl.
*H04W 4/30* (2018.01)
*H04W 4/021* (2018.01)
(Continued)

(52) U.S. Cl.
CPC ............... *H04W 4/30* (2018.02); *G01S 1/024* (2013.01); *G01S 1/042* (2013.01); *G01S 1/20* (2013.01);
(Continued)

(58) Field of Classification Search
CPC ......... H04W 4/021; H04W 4/30; H04W 4/02; H04W 4/026; H04W 4/027; H04W 84/18;
(Continued)

(56) References Cited

U.S. PATENT DOCUMENTS

| 5,548,512 A | 8/1996 | Quraishi |
|---|---|---|
| 6,354,946 B1 | 3/2002 | Finn |

(Continued)

FOREIGN PATENT DOCUMENTS

| EP | 1219047 B1 | 5/2010 |
|---|---|---|
| EP | 1334372 B1 | 3/2013 |

(Continued)

OTHER PUBLICATIONS

International Search Report and Written Opinion of the International Searching Authority for application No. PCT/IB2016/053173, dated Oct. 20, 2016.

(Continued)

*Primary Examiner* — Kyaw Z Soe
(74) *Attorney, Agent, or Firm* — Haley Guiliano LLP; James A. Leiz

(57) ABSTRACT

Localization systems and methods for transmitting time-stampable localization signals from anchors according to one or more transmission schedules. The transmission schedules may be generated and updated to achieve desired positioning performance. For example, one or more anchors may transmit localization signals at a different rate than other anchors, the anchor transmission order can be changed, and the signals can partially overlap. In addition, different transmission parameters may be used to transmit two localization signals at the same time without interference. A self-localizing apparatus is able to receive the localization signals and determine its position. The self-localizing apparatus may have a configurable receiver that can select to receive one of multiple available localization signals. The self-localizing apparatuses may have a pair of receivers able to receive two localization signals at the same time. A bridge anchor may be provided to enable a self-
(Continued)

localizing apparatus to seamlessly transition between two localization systems.

20 Claims, 35 Drawing Sheets

Related U.S. Application Data continuation-in-part of application No. 15/063,104, filed on Mar. 7, 2016, now Pat. No. 9,885,773.

(60) Provisional application No. 62/168,704, filed on May 29, 2015.

(51) Int. Cl.

| | | |
|---|---|---|
| *G01S 5/02* | (2010.01) | |
| *G01S 1/02* | (2010.01) | |
| *G01S 1/20* | (2006.01) | |
| *G01S 5/14* | (2006.01) | |
| *G05D 1/00* | (2006.01) | |
| *H04W 4/02* | (2018.01) | |
| *H04W 84/18* | (2009.01) | |
| *H04B 1/69* | (2011.01) | |
| *G05D 1/02* | (2006.01) | |
| *G05D 1/10* | (2006.01) | |
| *G01S 1/04* | (2006.01) | |
| *H04W 4/04* | (2009.01) | |

(52) U.S. Cl.
CPC .......... *G01S 5/0284* (2013.01); *G01S 5/0289* (2013.01); *G01S 5/14* (2013.01); *G05D 1/00* (2013.01); *G05D 1/028* (2013.01); *G05D 1/102* (2013.01); *H04B 1/69* (2013.01); *H04W 4/021* (2013.01); *H04W 4/026* (2013.01); *H04W 4/027* (2013.01); *H04W 4/04* (2013.01); *H04W 84/18* (2013.01); *G05D 2201/0216* (2013.01)

(58) Field of Classification Search
CPC .. H04W 4/04; G01S 1/024; G01S 1/20; G01S 5/14; G01S 5/0284; G01S 1/042; G01S 5/0289; G05D 1/00; G05D 1/028; G05D 1/102; H04B 1/69
See application file for complete search history.

(56) References Cited

U.S. PATENT DOCUMENTS

| | | |
|---|---|---|
| 6,466,168 B1 | 10/2002 | McEwan |
| 6,501,393 B1 | 12/2002 | Richards et al. |
| 6,585,597 B2 | 7/2003 | Finn |
| 6,661,342 B2 | 12/2003 | Hall et al. |
| 6,750,812 B2 | 6/2004 | Mizugaki et al. |
| 6,763,282 B2 | 7/2004 | Glenn et al. |
| 6,768,944 B2 | 7/2004 | Breed et al. |
| 6,868,314 B1 | 3/2005 | Frink |
| 6,879,878 B2 | 4/2005 | Glenn et al. |
| 6,895,301 B2 | 5/2005 | Mountz |
| 7,023,833 B1 | 4/2006 | Aiello et al. |
| 7,031,294 B2 | 4/2006 | Aiello et al. |
| 7,038,589 B2 | 5/2006 | Schmidt et al. |
| 7,069,111 B2 | 6/2006 | Glenn et al. |
| 7,246,746 B2 | 7/2007 | McNamara et al. |
| 7,403,783 B2 | 7/2008 | Cheok et al. |
| 7,555,370 B2 | 6/2009 | Breed et al. |
| 7,574,219 B2 | 8/2009 | Rofheart et al. |
| 7,592,944 B2 | 9/2009 | Fullerton et al. |
| 7,610,146 B2 | 10/2009 | Breed |
| 7,636,062 B2 | 12/2009 | Ward et al. |
| 7,768,394 B2 | 8/2010 | Amidi |
| 7,783,385 B2 | 8/2010 | Tamura |
| 7,839,916 B1 | 11/2010 | Luecke et al. |
| 7,962,285 B2 | 6/2011 | Breed |
| 7,974,264 B2 | 7/2011 | Rothschild |
| 7,979,172 B2 | 7/2011 | Breed |
| 7,983,694 B2 | 7/2011 | Cheok et al. |
| 8,010,133 B2 | 8/2011 | Cheok et al. |
| 8,031,690 B2 | 10/2011 | Aiello et al. |
| 8,040,859 B2 | 10/2011 | Chowdhury et al. |
| 8,160,609 B2 | 4/2012 | Alles et al. |
| 8,169,319 B2 | 5/2012 | Kaplan et al. |
| 8,203,487 B2 | 6/2012 | Hol et al. |
| 8,214,147 B2 | 7/2012 | Cheok et al. |
| 8,229,130 B2 | 7/2012 | Paradiso et al. |
| 8,248,263 B2 | 8/2012 | Shervey et al. |
| 8,284,100 B2 | 10/2012 | Vartanian et al. |
| 8,319,687 B2 | 11/2012 | Kahle |
| 8,660,571 B2 | 2/2014 | Hulkkonen et al. |
| 8,725,416 B2 | 5/2014 | Choi et al. |
| 9,195,360 B2 | 11/2015 | Lin |
| 9,282,429 B2 | 3/2016 | Duggan et al. |
| 9,294,181 B2 | 3/2016 | Park |
| 9,436,181 B2 | 9/2016 | Peeters et al. |
| 9,485,628 B2 | 11/2016 | Callou et al. |
| 9,488,978 B2 | 11/2016 | Callou et al. |
| 9,516,513 B2 | 12/2016 | Saegrov et al. |
| 9,548,799 B2 | 1/2017 | Hsu et al. |
| 9,646,502 B1 | 5/2017 | Gentry |
| 2004/0002346 A1 | 1/2004 | Santhoff |
| 2005/0228613 A1* | 10/2005 | Fullerton .............. G01S 5/0289 342/458 |
| 2006/0291537 A1 | 12/2006 | Fullerton et al. |
| 2008/0167051 A1 | 7/2008 | Cheok et al. |
| 2008/0234930 A1 | 9/2008 | Cheok et al. |
| 2009/0081923 A1 | 3/2009 | Dooley et al. |
| 2009/0323716 A1 | 12/2009 | Chintalapudi et al. |
| 2012/0036198 A1 | 2/2012 | Marzencki et al. |
| 2012/0165012 A1 | 6/2012 | Fischer et al. |
| 2012/0290168 A1 | 11/2012 | De et al. |
| 2013/0023285 A1 | 1/2013 | Markhovsky et al. |
| 2013/0137423 A1 | 5/2013 | Das et al. |
| 2013/0234834 A1 | 9/2013 | Lampe et al. |
| 2014/0032035 A1* | 1/2014 | Thomson ............. G05D 1/0274 701/25 |
| 2014/0253388 A1 | 9/2014 | Jalali et al. |
| 2015/0116151 A1 | 4/2015 | Liu et al. |
| 2015/0156637 A1* | 6/2015 | Li ........................ G01S 1/725 455/454 |
| 2015/0380803 A1 | 12/2015 | Hopkins et al. |
| 2016/0018509 A1 | 1/2016 | McCorkle |
| 2016/0025502 A1 | 1/2016 | Lacaze et al. |
| 2016/0044630 A1 | 2/2016 | Markhovsky et al. |
| 2016/0061957 A1 | 3/2016 | Li et al. |
| 2016/0069983 A1 | 3/2016 | Gonia et al. |
| 2016/0094250 A1 | 3/2016 | Mujtaba et al. |

FOREIGN PATENT DOCUMENTS

| | | |
|---|---|---|
| WO | WO200195278 A1 | 12/2001 |
| WO | WO2002091013 A2 | 11/2002 |
| WO | WO2004057361 A1 | 7/2004 |
| WO | WO2005081012 A1 | 9/2005 |
| WO | WO2008116168 A1 | 9/2008 |
| WO | WO2011003839 A1 | 1/2011 |
| WO | WO2012034832 A1 | 3/2012 |
| WO | WO2012175352 A1 | 12/2012 |
| WO | WO2014089040 A1 | 6/2014 |

OTHER PUBLICATIONS

International Search Report and Written Opinion of the International Searching Authority for application No. PCT/IB2016/051272, dated Aug. 17, 2016.

* cited by examiner

METHODS AND SYSTEMS FOR SCHEDULING THE TRANSMISSION OF LOCALIZATION SIGNALS AND OPERATING SELF-LOCALIZING APPARATUS

CROSS-REFERENCE TO RELATED APPLICATIONS

This application is a continuation of U.S. patent application Ser. No. 15/168,122, filed May 30, 2016, which claims the benefit of U.S. Provisional Patent Application No. 62/168,704, filed May 29, 2015, and is a continuation-in-part of U.S. patent application Ser. No. 15/063,104, filed Mar. 7, 2016 (now U.S. Pat. No. 9,885,773), all of which are hereby incorporated by reference herein in their entireties.

FIELD

The present disclosure relates to the field of localizing objects. The disclosure also relates to localization systems and methods that use timestampable signals such as ultra-wideband (UWB) signals. The disclosure further relates to operating self-localizing apparatuses.

BACKGROUND

Logistics and industrial automation increasingly rely on accurate localization to support and control manual and automated processes, with applications ranging from "smart things" through effective tracking and assistance solutions to robots such as automated guided vehicles (AGVs).

UWB technology has been advocated as a localization solution suitable for asset tracking applications. Such applications are concerned with maintaining a centralized database of assets and their storage locations in a warehouse, hospital, or factory. When using UWB technology, assets, such as pallets, equipment, or also people may be equipped with tags that emit UWB signals at regular intervals. These signals may then be detected by UWB sensors installed in the warehouse, hospital, or factory. A central server then uses the UWB signals detected by the UWB sensors to compute the tag's location and update the centralized database.

Mobile robots are increasingly used to aid task performance in both consumer and industrial settings. Autonomous mobile robots in particular offer benefits including freeing workers from dirty, dull, dangerous, or distant tasks; high repeatability; and, in an increasing number of cases, also high performance. A significant challenge in the deployment of mobile robots in general and autonomous mobile robots in particular is robot localization, i.e., determining the robot's position in space. Current localization solutions are not well suited for many mobile robot applications, including applications where mobile robots operate in areas where localization such as that provided by global navigation satellite systems (GNSS) is unreliable or inoperative, or applications that require operation near people.

Using current UWB localization solutions for robot localization would not enable a mobile robot to determine its own location directly. Rather, a robot equipped with a tag would first emit an UWB signal from its location, UWB sensors in its vicinity would then detect that UWB signal and relay it to a central server that would then compute the mobile robot's location, and then this location would have to be communicated back to the robot using a wireless link. This type of system architecture invariably introduces significant communication delays (e.g., latency) for controlling the mobile robot. This communication architecture also results in a relatively higher risk of lost signals (e.g., due to wireless interference) and correspondingly lower system robustness, which makes it unsuitable for many safety-critical robot applications (e.g., autonomous mobile robot operation). Furthermore, in this architecture the maximum number of tags and the tag emission rate (i.e., the localization system's update rate) are invariably linked because in these systems multiple UWB signals currently do not overlap. This results in limited scalability for a given tag emission rate (i.e., the system can only support a limited number of tags in parallel). In addition, if a higher tag emission rate or redundancy is required, then a smaller number of tags will need to be used. In addition, with such an architecture, the maximum update rate for determining the position of tags is inversely proportional to the number of tags. This is unsuitable for situations where a large number of objects need to be tracked with a high update rate.

Another localization system proposed in the prior art uses mobile transceivers that communicate with stationary transceivers through the two-way exchange of UWB signals. Two-way communication with a stationary transceiver enables a mobile transceiver to compute the time-of-flight between itself and the stationary transceiver. In this architecture, communication between mobile transceivers and stationary transceivers must be coordinated, such that communications do not interfere. Knowledge of the time-of-flight to three or more stationary transceivers enables each mobile transceiver to compute its relative location within an environment using trilateration. Because each mobile transceiver communicates with each stationary transceiver, the update rate of the system is inversely proportional to the number of mobile transceivers and to the number of stationary transceivers. This architecture is therefore not suitable for systems where a large number of objects must be localized at a high frequency (e.g., tracking a group of robots, where position measurements are used in the robots' control loops to influence the robots' motions), where a mobile transceiver's position or identity should be kept private (e.g., tracking people), where both transceiver redundancy and high update frequency are desired (e.g., safety critical applications such as positioning systems for vehicles), or in multipath environments, which require a maximum of transceivers to help disambiguate multipath signals, where a high update frequency and a large number of tracked objects are desired (e.g., robot warehouses).

BRIEF DESCRIPTION OF THE DRAWINGS

Embodiments of the present disclosure are illustrated by way of example and not limitation in the figures of the accompanying drawings, in which like references indicate similar elements and in which.

DETAILED DESCRIPTION

Figure 1:
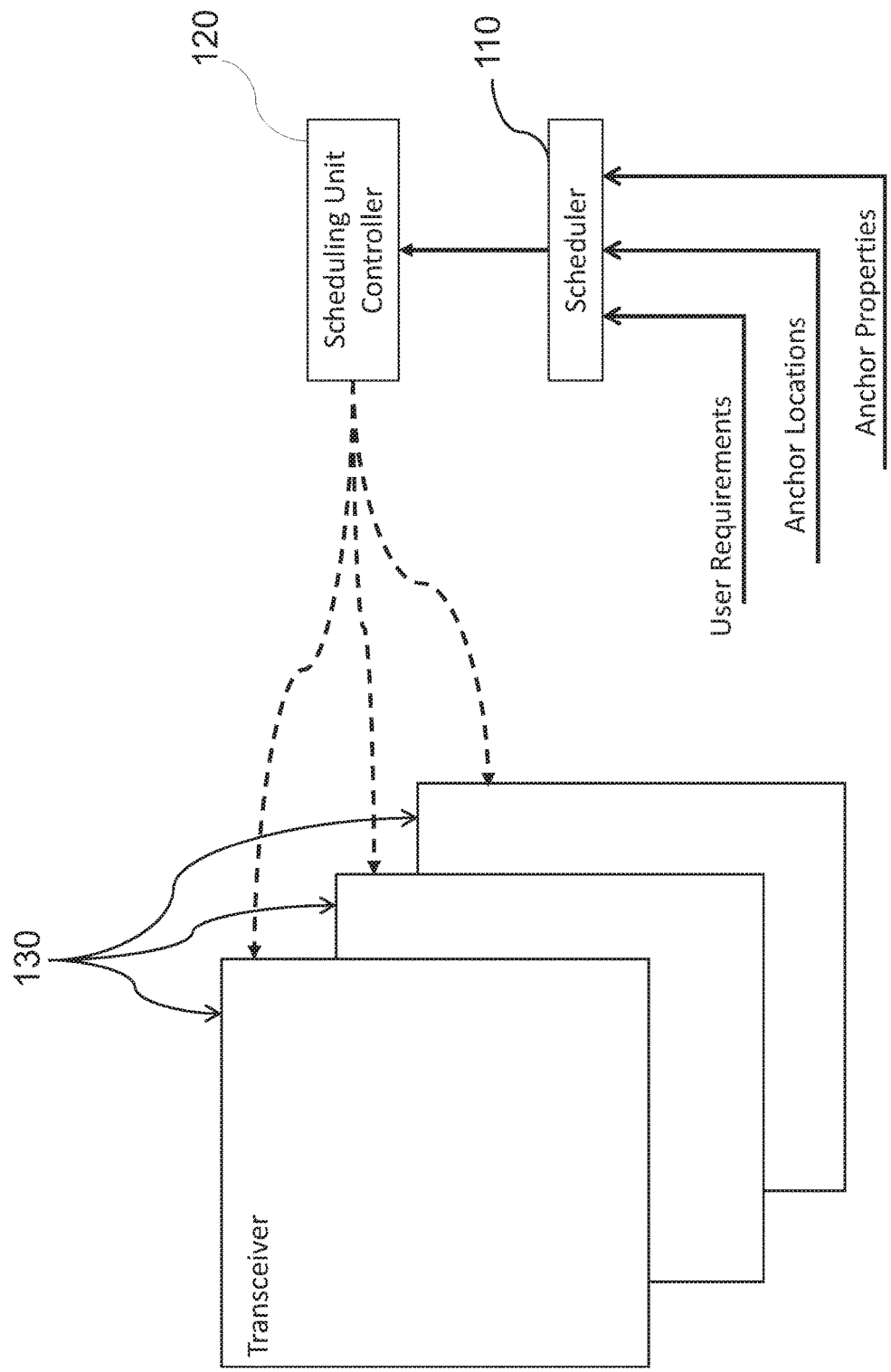
FIG. 1 is a block diagram of an illustrative localization system in accordance with some embodiments of the present disclosure.

In accordance with the present disclosure, limitations of current systems for localizing have been reduced or eliminated. In addition, the present disclosure provides various technical advantages over current localization systems.

Technical advantages of certain embodiments of the present disclosure relate to localizing objects in two-dimensional or three-dimensional space. For example, in an embodiment where a self-localizing apparatus is used to determine the location of a wheeled mobile robot, a transmission schedule may be optimized such that it accounts for the relative location of the anchors to the robot's operating area or current position, or such that it accounts for the robot's movement constraints (e.g., all possible locations are in a 2D plane). Further technical advantages of certain embodiments may optimize the performance of a localization system for a specific use case or application, either in real-time or offline. For example, in certain embodiments, the transmission schedule may be dynamically reconfigured based on predetermined rules (e.g., based on comparing the estimated location of a self-localizing apparatus with one or more predetermined locations, based on a timecode, based on a property) or based on a request (e.g., an operator command).

Technical advantages of certain embodiments improve the localizing accuracy or precision. Technical advantages of certain embodiments improve the rate or latency at which the localizing information may be obtained or updated. For example, in certain embodiments overlapping yet not interfering localization signals may be used to allow a self-localizing apparatus to determine its position at a higher rate in a particular region or at a particular time. Technical advantages of certain embodiments improve the information content of the localization information. For example, in some embodiments a self-localizing apparatus may select to receive localization signals such that a particularly high uncertainty of its position estimate in a certain spatial direction or along a certain spatial axis is reduced.

Yet further technical advantages of certain embodiments relate to the reception of wireless signals used, for example, by a device to determine its own location. In some embodiments, the reception of localizing signals does not deteriorate when a direct line of sight cannot be established between a receiving device and a sufficiently large number of signal transmitters. For example, some embodiments allow operation in areas both without good line of sight to GNSS satellites and indoors. In some embodiments, signals are not distorted by multipath, do not suffer multipath fading observed in narrowband signals, or do not suffer from reduced signal quality when lacking direct line of sight in indoor environments. For example, some embodiments do not show performance degradation in enclosed environments (e.g., indoors), in forests, or in dense urban environments, such as those where retaining a lock on a GNSS signals becomes more difficult.

Technical advantages of some embodiments may allow arrival of a plurality of localization signals at a receiver's antenna with adequate time separation, avoiding degraded signal detection and reduced performance of a localization system, even in situations of signal overlap.

Technical advantages of some embodiments are such that they may be used in real-time or may be used by an unlimited number of receivers, to determine their 2D or 3D position, in GPS-denied environments or any environment where greater accuracy or system redundancy or failsafe operation may be desired.

Technical advantages of some embodiments may increase performance of current mobile robots and allow new uses of mobile robots by enabling localization with higher update rates, with lower latency, in larger spaces, or with higher accuracy than currently possible, resulting in more performant robot control.

Further technical advantages of some embodiments may allow a person, a mobile robot, or another machine to be equipped with a self-localizing apparatus that can determine its 3D position in space without the need to emit signals. This may increase localization performance and allow new uses of localization technology by providing regulatory advantages; by allowing scalability (e.g., the system may be used by an unlimited number of self-localizing apparatuses in parallel) or in an arbitrarily large space; by allowing higher redundancy (e.g., non-emitting apparatuses allow for more emitting anchors for a given network traffic load); by enabling more efficient bandwidth usage (e.g., lower emissions, less interference); by increasing energy efficiency of the receivers (e.g., by not requiring energy for transmissions); by enhancing privacy of operation; and by making data available locally where it is needed, resulting in increased update rates, lower latency, higher speed, and greater system robustness.

Further technical advantages of some embodiments may allow improved system performance by fusing data from several sources including one or more localization networks (e.g., UWB networks), readings of global properties from multiple locations, and onboard motion sensors.

Further technical advantages of some embodiments are linked to providing a distributed localization system. Such a system may provide increased robustness and safety for robot operation because it does not rely on sensor signals from a single source. It may also offer graceful performance degradation by providing redundancy; may allow identification and resolution of inconsistencies in data by providing redundant data; and may provide higher performance by performing localization based on a comparison of the signals received from individual transceivers.

Yet further technical advantages of some embodiments allow for localization without direct line of sight between a transceiver and self-localizing apparatus. Moreover, further technical advantages allow for lower susceptibility to disturbance from radio frequency traffic, secure communications, and increasing resistance to interference, noise, and jamming.

Further technical advantages will be readily apparent to one skilled in the art from the following description, drawings, and claims. Moreover, while specific advantages have been enumerated above, various embodiments may include all, some, or none of the enumerated advantages. The listed advantages should not be considered as necessary for any embodiments.

The present disclosure uses timestampable signals (sometimes referred to herein as "localization signals"). Timestampable signals are radio frequency (RF) signals, with each signal having a feature that can be detected and that can be timestamped precisely. Examples of features include a signal peak, a signal's leading edge, and a signal preamble. Examples of timestampable signals include RF signals with a distinct, well-defined, and repeatable frequency increase or frequency decrease with time. Further examples of time-stampable signals include signal bursts, signal chirps, or signal pulses. Further examples of timestampable signals include signals with features suitable for phase correlation or amplitude correlation techniques (e.g., signals with codes that have low auto-correlation values).

In some embodiments, the timestampable signal are "open-loop", one-directional RF signals transmitted over a reception area. Examples include DCF77 time code signals, GPS P-code signals, and terrestrial trunked radio signals. In some embodiments, the apparatus is a non-emitting apparatus.

In some embodiments, the timestampable signals use a narrow frequency band. In some embodiments, a center or carrier frequency in the ISM band is used. In some embodiments, a center or carrier frequency in the range of 1 to 48 GHz is used. In some embodiments, a center or carrier frequency in the range of 2.4 to 12 GHz is used. In some embodiments, a center or carrier frequency in the range of 3.1 to 10.6 GHz is used. In some embodiments, higher frequencies are used. Narrow band signals tend to suffer from multipath fading more than wide band signals (e.g., ultra-wideband (UWB) signals). In narrow band signals, signal duration is typically longer than the delay variance of the channel. Conversely, with UWB signals the signal duration is typically less than the delay variance of the channel. For example, in the case of an UWB system with a 2 nanosecond pulse duration, the pulse duration is clearly much less than the channel delay variation. Thus, signal components can be readily resolved and UWB signals are robust to multipath fading.

In some embodiments, the timestampable signals are UWB signals. UWB signals are spread over a large bandwidth. As used herein, UWB signals are signals that are spread over a bandwidth that exceeds the lesser of 125 MHz or 5% of the arithmetic center frequency. In some embodiments, UWB signals are signals that are spread over a bandwidth that exceeds the lesser of 250 MHz or 10% of the arithmetic center frequency. In some embodiments, UWB signals are signals that are spread over a bandwidth that exceeds the lesser of 375 MHz or 15% of the arithmetic center frequency. In some embodiments, UWB signals are signals that are spread over a bandwidth that exceeds the lesser of 500 MHz or 20% of the arithmetic center frequency. In some embodiments, a bandwidth in the range of 400-1200 MHz is used. In some embodiments, a bandwidth in the range of 10-5000 MHz is used. In some embodiments, a bandwidth in the range of 50-2000 MHz is used. In some embodiments, a bandwidth in the range of 80-1000 MHz is used. Ultra-wideband technology allows an initial radio frequency (RF) signal to be spread in the frequency domain, resulting in a signal with a wider bandwidth, ordinarily wider than the frequency content of the initial signal. UWB technology is suitable for use in a localization system because it can transmit very short-duration pulses that may be used to measure the signal's arrival time very accurately and hence allow ranging applications. UWB signals may be advantageous for use in localization systems because of their capability to penetrate obstacles and to allow ranging for hundreds of meters while not interfering with conventional narrowband and carrier waves used in the same frequency bands.

In some embodiments, the arrival time of timestampable signals can be measured to within 0.6 nanoseconds relative to a clock. In some embodiments, the arrival time of timestampable signals can be measured to within 1, 2, 3, 4, 5, 6, 7, 8, 9, 10, 11, 12, 13, 14, or 15 nanoseconds relative to a clock.

In some embodiments, the transmission rate is measured as the long time average of number of transmissions per second. In some other embodiments, the transmission rate is measured as the inverse of the long time average of the time separation between two subsequent transmissions. In some embodiments, the typical separation one of 1-500 microseconds, 1-1,000 microseconds, 1-500 milliseconds, 1-1,000 milliseconds, 1-5 seconds, 1-500 seconds, or any combination thereof. In some embodiments, no separation is used. In some embodiments, the longtime average is computed over a window of 1-10 seconds. In some other embodiments, the longtime average is computed over a window of 1-10 minutes. In some other embodiments, the longtime average is computed over a window of 10 minutes.

In some embodiments, the signal's mean equivalent isotropically radiated power (EIRP) density is smaller than −40 dBm/MHz at all frequencies. In some embodiments, the signal's mean EIRP density is smaller than −80, −70, −60, −50, −30, −20, or −10 dBm/MHz at all frequencies.

In some embodiments, the transmitted signal's maximum power is smaller than 0.1 mW per channel. In some embodiments, the transmitted signal's maximum power is smaller than 1.0 mW per channel. In some embodiments, the transmitted signal's maximum power is smaller than 100 mW per channel. In some embodiments, the transmitted signal's maximum power is smaller than 500 mW per channel. In some embodiments, the transmitted signal's maximum power is smaller than 10 W per channel.

In some embodiments, the less limiting of a signal's EIRP density and a signal's maximum power applies. In some embodiments, the more limiting of a signal's EIRP density and a signal's maximum power applies. In some embodiments, one of a limit on a signal's EIRP density and a limit on a signal's maximum power applies. In some embodiments, both of a limit on a signal's EIRP density and a limit on a signal's maximum power applies. In some embodiments, a limit applies to narrow band signal. In some embodiments, a limit applies to broadband signal.

In some embodiments, a transceiver's typical effective range is between 1 m and 50 m. In some embodiments, a transceiver's typical effective range is between 1 m and 100 m. In some embodiments, a transceiver's typical effective range is between 1 m and 500 m. In some embodiments, a transceiver's typical effective range is between 1 m and 1000 m. In some embodiments, a transceiver's typical effective range is between 1 m and 5000 m. In some embodiments, the apparatus may only receive UWB signals from a subset of transceivers.

In some embodiments, a maximum data rate of 50 Mbps is used. In some embodiments, a maximum data rate of 5 Mbps is used. In some embodiments, a maximum data rate of 1 Mbps is used.

In some embodiments, chirp spread spectrum (CSS) signals are used. In some embodiments, frequency-modulated continuous-wave (FMCW) signals are used.

Some embodiments include a localization unit. In some embodiments, the localization unit can compute at least one of (i) an orientation or orientation information, (ii) a position, or (iii) a motion of the self-localizing apparatus.

In some embodiments, the localization unit computes the location of the self-localizing apparatus based on the reception times of the timestampable signals and the known locations of the transceivers. In some embodiments, a time of arrival scheme is used. In some embodiments, a time difference of arrival scheme is used. Multilateration requires the localization unit to compute the time-difference between the reception times of two timestampable signals. By subtracting the known time-difference of the signals' transmission times from the difference in their reception times (also referred to as a "TDOA measurement"), a localization unit may compute the difference in distance to the two transceivers, from which the signals were transmitted (e.g., transceiver two is 30 cm further away than transceiver one, since the reception of the signal from transceiver two was delayed by 1 ns in comparison to the signal from transceiver one). By computing the difference in distance between multiple transceivers, the localization unit may be able to compute the location of the self-localizing apparatus by solving a system of hyperbolic equations, or a linearized version thereof. Methods of solving this system of equations are well known to those skilled in the art and may include non-linear least squares, least squares, Newton iterations, gradient descent, etc. The method of multilateration requires the time-difference of the signals' transmission times to be known.

In some embodiments, the localization unit of the self-localizing apparatus may compute location iteratively. In some embodiments, rather than waiting for a timestampable signal to be received from all transceivers, the localization unit iteratively updates the location estimate whenever a signal is received. In some embodiments, when a timestampable signal is received, an adjustment to the current location estimate is computed based on the difference between its reception time and the reception time of a previously received timestampable signal. In some embodiments, a known method of filtering (e.g., Kalman filtering, particle filtering) is used to compute or apply this update. In some embodiments, the adjustment is computed based on the variance of the current location estimate (e.g., if the current estimate is highly accurate, less adjustment will be applied). In some embodiments, the adjustment is computed based on the locations of the two transceivers from which the timestampable signals were transmitted. In some embodiments, this adjustment is computed based on a measurement model, describing the probability distribution of a TDOA measurement based on the current location estimate and the locations of the two transceivers. In some embodiments, this enables more or less adjustment to be applied depending on how accurate the TDOA measurement is determined to be (e.g., if a first transceiver lies on a line connecting the current location estimate with a second transceiver, the TDOA measurement resulting from the two transceivers may be considered unreliable, and thus less adjustment applied).

In some embodiments, the localization unit updates a location estimate based on a system model, describing the probability distribution of the self-localizing apparatus' location. In some embodiments, this system model may be based on other estimated states (e.g., the velocity or heading of the self-localizing apparatus). In some embodiments, this system model may be based on input history (e.g., if an input command should yield a motion in the positive x-direction according to system dynamics, it is more probable the new location estimate lies in the positive x-direction, than in the negative x-direction).

In some embodiments, this system model may be based on measurements from a sensor or global property. In some embodiments, the localization unit may compute the location of the self-localizing apparatus based on a global property. In some embodiments, the localization unit may compute the location of the self-localizing apparatus based on the difference between a global property measured by the self-localizing apparatus and a global property measured by one or more of the transceivers (e.g., if both self-localizing apparatus and transceiver measure air pressure, the relative altitude difference between the two can be computed according to the known relationship between altitude and air pressure).

In some embodiments, the localization unit may use a history of location estimates and a system model to compute further dynamic states of the body, for example, velocity or heading. For example, if the history of location estimates indicates motion, velocity can be estimated. A further example is if the history of location estimates indicates motion in the positive y-direction, and the system model indicates that only forward motion is possible (e.g., a skid-steer car), the orientation can be determined as oriented in the positive y-direction.

In some embodiments, the location is a 1D location, a 2D location, a 3D location, or a 6D location (i.e., including position and orientation).

In some embodiments, the performance of the localization unit (also referred to as localization performance or positioning performance) can be expressed as an average error of the position estimate. In some embodiments, the localization performance can be expressed as a variance of the position estimate. In some embodiments, the localization performance can be computed based on a dilution of precision. In some embodiments, the localization performance can be computed based on a latency (e.g., the time required for the location unit to detect a change of the self-localizing apparatus' position).

In some embodiments, the relative location computed by the localization unit is computed with an accuracy of 1 m, 20 cm, 10 cm, or 1 cm. In some embodiments, the time delay between the reception of timestampable signal and the computation of an updated position estimate provided by the localization unit is less than 50 ms, 25 ms, 10 ms, 5 ms, 2 ms, or 1 ms. In some embodiments, the system's update rate for full position updates or for partial position updates is more than 1 Hz, 5 Hz, 10 Hz, 50 Hz, 250 Hz, 400 Hz, 800 Hz, 1000 Hz, or 2000 Hz.

In some embodiments, a localization system comprises at least 1, 2, 3, 5, 7, 10, 25, 50, 100, or 250 anchors. In some embodiments, a localization system supports more than 1, 2, 3, 5, 10, 20, 40, 100, 200, 500, 1,000, 5,000, or 10,000 self-localizing apparatuses.

A clock as used herein refers to circuitry, structure, or a device that is capable of providing a measure of time. The measure of time may be in any suitable units of time. For example, the measure of time may be based on a base unit of a second. As another example, the measure of time may be based on a counter that increments at a particular rate. In some embodiments, the clock comprises an internal oscillator used to determine the measure of time. In some embodiments, the clock determines the measure of time based on a received signal (e.g., from an external oscillator). In some embodiments, a clock interface provides a clock signal.

In some embodiments, each transceiver may use its own onboard clock. In some embodiments, a single clock may generate a clock signal transmitted to each transceiver via cables or wirelessly. In some embodiments, the clock signal may be dependent on at least one-time code transmitted by a radio transmitter, or on at least one of a terrestrial radio clock signal, a GPS clock signal, and a time standard. In some embodiments, the clock signal may be based on a GPS-disciplined oscillator, on a transmitter, or on a time estimate computed from at least two clocks to improve accuracy or long-term stability of the clock signal.

Clocks may, for example, use a crystal oscillator or a temperature compensated crystal. In some embodiments, enhanced clock accuracy may be obtained through temperature stabilization via a crystal oven (OCXO) or via analog (TCXO) compensation or via digital/micro-controller (MCXO) compensation. In some embodiments, a centralized synchronization unit is used. In some embodiments, an atomic oscillator (e.g., rubidium) is used as a clock.

In some embodiments, a clock is configured to have an Allan variance of at most $(1\times10^{-8})^2$ or $(1\times10^{-9})^2$ or $(5\times10^{-10})^2$ for averaging intervals between 5 milliseconds and 10 milliseconds or for averaging intervals between 5 milliseconds and 100 milliseconds or for averaging intervals between 1 milliseconds and 1 second.

The apparatus or transceiver may be equipped with analog and digital reception electronics. The reception electronics may amplify the received signal and convert it to a base signal, which may then be demodulated and passed on to central processing electronics. An important design aspects of the receiver is to minimize noise and distortion. This may be achieved by carefully selecting reception electronics' components (especially those of the amplifier) and by optimizing the receiver's circuit design accordingly.

In some embodiments, the self-localizing apparatus is, or the self-localizing apparatus' antenna, analog reception electronics, and digital reception electronics are, configured to receive two timestampable signals within a time window of 2, 10, or 50 seconds, wherein the time difference between the time stamps of the two UWB signals is within 0.6, 3, or 15 nanoseconds of the time difference between their actual reception times at the apparatus' antenna with reference to the apparatus' clock. The terms "receiver" and "reception electronics" used herein refer to the antenna, analog reception electronics, and the digital reception electronics that receive signals In some embodiments, the apparatus' digital reception electronics are further operable to perform the timestamping of the received UWB signals with reference to the apparatus' clock in less than 1 millisecond, 100 microseconds, or 10 microseconds.

The apparatus or transceiver may be equipped with analog and digital transmission electronics.

In some embodiments, a transceiver is, or a transceiver's digital transmission electronics, analog transmission electronics, and antenna are, configured to transmit two timestampable signals within a time window of 2, 10, or 50 seconds, or configured such that the time difference between the transmission of two timestampable signals from the transceiver's antenna is within 0.6, 3, or 15 nanoseconds of the time difference between their scheduled transmission times with reference to the transceiver's clock. The terms "transmitter" and "transmission electronics" used herein refer to the antenna, analog transmission electronics, and the digital transmission electronics that are used to generate signals.

In some embodiments, a scheduling unit is used to schedule the signal transmission times. It will be apparent to one skilled in the art that any error by transceivers in adhering to this transmission schedule may affect the accuracy of the location computed by a localization unit.

In some embodiments, the scheduled time refers to the time at which the first pulse of the signal leaves the transceiver's antenna. In some embodiments, the scheduled time refers to the beginning of a start-of-frame delimiter (i.e., the point at which the transmitted signal changes from the repeated transmission of a preamble code to the transmission of the start-of-frame delimiter). In some embodiments, the apparatus is configured to compare two timestampable signals transmitted by the same transceiver.

In some embodiments, transceivers coordinate their transmissions at the packet level. In some embodiments, signal overlap is avoided. In some embodiments, signals are transmitted in a round-robin fashion; at regular intervals; in a specific time sequence; or taking turns. In some embodiments, transceivers transmit signals simultaneously. In some embodiments, transceivers transmit signals that partially overlap.

In some embodiments, each of three or more transceivers includes a scheduling unit. In some embodiments, a single scheduling unit is operationally coupled to three or more transceivers. In some embodiments, this operational coupling is a wired connection. In some embodiments, this operational coupling is a wireless connection. In some embodiments, this wireless operational coupling is implemented using signals such as UWB signals. In some embodiments, the scheduling unit uses a lower update rate than the localization signal rate.

In some embodiments, the scheduling unit is operable to ensure a time separation of at least 5 microseconds, 10 microseconds, or 50 microseconds between one transceiver terminating its transmission and a different transceiver beginning its transmission. In some embodiments, the scheduling unit is operable to monitor the localization signals. In some embodiments, the scheduling unit is operable to compute an improved scheduling. In some embodiments, the scheduling unit is operable to ensure a time separation of at least 1 microsecond, 5 microseconds, or 10 microseconds between the end of one signal and the start of a second signal emitted by the same transceiver. In some embodiments, the scheduling unit is operable to maintain a memory of the assignment of media access control addresses and scheduled transmission times.

In some embodiments, each of the three or more transceivers comprises a sensor. In some embodiments, the sensor is physically and operationally coupled to the transceiver. In some embodiments, the sensor is operable to provide data representative of the orientation, the position, or the movement of the transceiver. In some embodiments, the sensor is structured to detect a disturbance to the transceiver's position or orientation. In some embodiments, the sensor signal is a signal of a sensor physically connected to a transmitter, wherein the sensor signal is transmitted as part of a payload of a signal, such as an UWB localization signal.

In some embodiments, the self-localizing apparatus comprises a sensor, physically and operationally coupled to the apparatus and operable to provide data representative of the orientation of the apparatus. In some embodiments, the sensor is operable to provide data representative of the orientation, the position, or the movement of the apparatus. In some embodiments, the sensor is configured to provide data representative of the orientation of a self-localizing apparatus' antenna.

Data from a sensor may be processed by a localization unit or by a position calibration unit. For example, data related to a landmark may be compared with other data (e.g., data related to another landmark, data from memory, sensor data, data representative of a location) to improve a position estimate or a position calibration unit. As another example, a comparison of the position of a landmark relative to a transceiver detected by a first camera and the position of the same landmark relative to a self-localizing apparatus detected by a second camera may allow a localization unit to improve a localization estimate. A comparison may use data related to one or more landmarks. A comparison may use data related to observations by one or more visual sensors.

Typical examples of sensors that may be usefully employed as part of the present disclosure include an optical sensor, an accelerometer, a magnetometer, and a gyroscope.

In some embodiments, micro-electro-mechanical systems (MEMS) or piezoelectric systems may be used to allow achieving operating characteristics outlined in the present disclosure. Examples of such micro-sensors that can be usefully employed with the present disclosure include MEMS gyroscopes, MEMS accelerometers, piezoelectric gyroscopes, and piezoelectric accelerometers. In some embodiments, the use of micro-sensors allows using one or more inertial measurement units (IMUs), which may each combine multiple gyroscopes or accelerometers or use multiple-axis gyroscopes or accelerometers, in each subsystem. In some embodiments, such selection of micro-sensors allows creating or using a self-localizing apparatus suitable for highly dynamic movement that require low weight and low power consumption in spite of high performance. For example, a 3-axis MEMS gyroscope may be used to monitor a self-localizing apparatus' attitude and to allow triggering a signal if an attitude threshold is exceeded. As another example, a MEMS gyroscope may be used to control a small flying robot equipped with a self-localizing apparatus around hover in spite of its low time constant. Examples of optical sensors include infrared sensors, linear cameras, optic flow sensors, and imaging sensors, among others.

Some embodiments comprise a global property sensor, i.e., a sensor operable to provide data representative of a global property.

Examples of global properties include fields that have a determinable value at multiple or every point in a region, such as a gravitational force, an electromagnetic force, a fluid pressure, and a gas pressure. Further examples of global properties include an RF signal strength, a GPS signal, the Earth's magnetic field, the Earth's gravitational field, the atmosphere's pressure, landmarks, and radio time signals (e.g., those sent by DCF77 time code transmitters).

Examples of landmarks include the horizon, the sun, moon or stars, mountains, buildings, and prominent environmental features. Prominent environmental features may include distinctive natural features such as mountains, distinctive buildings such as monuments, and others such as those used in simultaneous localization and mapping (SLAM). Further examples for landmarks include those used in Scale-Invariant Feature Transform (SIFT) and Speeded Up Robust Features (SURF). Note that in the present disclosure, GPS or GNSS may be used as a placeholder to describe any similar signals by other global navigation satellite systems such as e.g., GLONASS, Galileo, IRNSS, or BeiDou-2 as well as their improved versions such as real-time kinematic (RTK) GPS or DGPS.

In some embodiments, an apparatus and a transceiver are both configured to detect the same global property. In some embodiments, a transceiver is configured to communicate data representative of the global property at its location to an apparatus or to another transceiver, and the apparatus or the another transceiver is configured to compare the data with data representative of the same global property at the apparatus' or the another transceiver's location. In some embodiments, the global property can be associated with a global property model.

In some embodiments, the global property sensor is an orientation sensor. The orientation sensor may enable the transceiver to measure its orientation relative to a frame of reference common to the transceivers and the self-localizing apparatus. The transceiver may then transmit signals representative of its orientation included as data (payload) within the localization signals. In some embodiments, a transceiver is capable of measuring its orientation and of transmitting this orientation as a payload of a localization signal.

In some embodiments, a position calibration unit may compute an estimate for the position of a transceiver. In some embodiments, the transceiver position is computed once (e.g., as part of a calibration routine during the localization system's setup). In some embodiments, the transceiver position is computed continuously (e.g., each time new data related to the transceiver's position becomes available). In some embodiments, the transceiver position unit is initialized with known, partially known, estimated, or partially estimated position information (e.g., initial transceiver distances, positions, or orientations may be measured or entered manually).

Position calibration may be achieved in various ways. For example, the position calibration unit may compute a transceiver's position based on time stamped signals received from other transceivers with known locations. This may, for example, allow for the addition of an additional transceiver to an existing network of transceivers. In some embodiments, a position calibration unit operates analogously to a localization unit or vice versa. In some embodiments, a position calibration unit is operationally coupled to a compensation unit.

In some embodiments, a single position calibration unit may be used to compute the location of multiple transceivers relative to each other. This may, for example, allow initialization of a network of transceivers that do not yet have known locations. In some embodiments, multiple position calibration units are used (e.g., one for each transceiver).

In some embodiments, a position calibration unit is implemented offboard a transceiver. For example, the position calibration unit may be implemented on a laptop computer connected to the transceiver using a cable. This may, for example, allow for a more convenient interface for an operator.

In some embodiments, the synchronization unit is operable to synchronize at least one of (i) an offset of the first clock, and (ii) a rate of a first clock, based on a second clock. In some embodiments, the correction is computed or the synchronization is performed based on at least one of an average, a median, and a statistical property of a multitude of the localization system's clocks. In some embodiments, global properties that also provide timing information, such as those provided by GPS, DCF77, and further systems, are used. In some embodiments, the synchronization unit uses global properties that also provide timing information.

In some embodiments, the synchronization unit is operable to implicitly or explicitly account for timing errors introduced by at least one of (i) a first difference between the rate of the apparatus' clock and the rate of a first communicating transceiver's clock and (ii) a second difference between the rate of the apparatus' clock and the rate of a second, different communicating transceiver's clock.

In some embodiments, the synchronization unit is operable to perform the synchronization or to compute the clock correction based on a compensation computed by a compensation unit or data stored in a memory.

In some embodiments, the synchronization unit is operable to synchronize the onboard clock's rate such that the statistical mean error between the onboard clock's rate and the median of the two other transceivers' onboard clock rates is less 10 parts per million or 1 part per million or 100 parts per billion. In some embodiments, the synchronization unit is operable to synchronize the onboard clock's offset such that the statistical mean error between the onboard clock's offset and the median of the two other transceivers' onboard clock offsets is less than 10 nanoseconds or 5 nanoseconds or 1 nanosecond or 10 picoseconds. In some embodiments, this is achieved by implicitly or explicitly accounting for timing errors introduced by one or more of the transceiver's antenna, and the transceiver's analog and digital transmission electronics, or by computing clock corrections to the onboard clock's offset based on the timestamped UWB clock synchronization signal and data provided by the transceiver's memory unit, or by altering a clock rate (e.g., but altering a voltage, a temperature, or a crystal trim of a clock).

In some embodiments, a compensation unit is used to correct for signal delays. The compensation unit computes compensations for effects on the timestampable signal from the moment of scheduling the transmission time of the signal at the transceiver to the moment of timestamping the signal at the transceiver's or apparatus' reception electronics.

Compensation is typically achieved by correcting the reception time stamp or by correcting transmission time information (e.g., a transmission time stamp included in the UWB data as payload), e.g. based on signal quality or group delay. This correction may be computed and applied immediately (e.g., by computing corrections for or modifying individual timestamps) or in batch (e.g., by computing corrections for or modifying timestamps in batch). The compensation may use several data sources to determine the required correction; examples include (i) data representative of the location and orientation of the transceivers and the apparatus; (ii) data provided by onboard sensors; (iii) data stored in a memory; (iv) data provided by the synchronization unit; and (v) quality metrics provided by the digital reception electronics.

In some embodiments, the compensation unit compensates for effects of position, orientation, or movement of the apparatus' antenna relative to a transceiver's antenna. In some embodiments, the compensation unit compensates for effects of obstacles. In some embodiments, the compensation is performed by computing (i) data representative of a correction for a distance, time, or duration, (ii) data representative of a correction for a comparison of a first and a second distance, time, or duration, or (iii) data representative of a correction for a comparison of a multitude of distances, times, or durations. In some embodiments, the data representative of a correction is provided to the localization unit.

In some embodiments, the compensation unit may also account for the impact of the relative orientation, direction and distance of the apparatus' antenna relative to the transceiver's antenna. This is important due to the difficulty in creating omnidirectional antennae for timestampable signals such as UWB signals. This is also important because some apparatuses may be receiving signals from a larger number of transceivers, receiving signals at a higher update rate, or receiving signals with a higher quality than others, depending on their location in space relative to the transceivers, or on the communication architecture used. Corresponding data related to the computation of compensation values may be determined as part of a calibration routine or during use (e.g., provided by an operator), and improved using assumptions (e.g., radial symmetries) or using data from other system components as outlined above. They may then be stored in a memory for use, e.g. as a look-up table of compensation values for different pairwise combinations of relative antenna orientations, directions, and distances.

Strategies similar to those outlined above for the compensation unit and timestampable signals may also be used by the synchronization unit or for clock synchronization signals.

It will be understood that while compensation and various aspects thereof are sometimes explained for signals travelling between an apparatus and a transceiver, explanations may be equally valid, and analogously used, for signals travelling between two apparatuses or two transceivers.

A control unit is used to generate control signals for actuators based on data received from a localization unit (e.g., a position estimate) or of sensors (e.g., an onboard sensor) or of a global property (e.g., an atmospheric pressure).

The control unit can implement control laws that are well-established in the prior art or widely used. Examples of such control laws include PID control; model predictive control; sliding mode control; full state feedback; and backstepping control. Depending on the control law, the control unit may use state estimates provided by a localization unit.

A control unit may compute control signals for a single actuator. In some embodiments, a control unit computes different sets of control signals for different sets of actuators. For example, a control unit may compute a first set of control signals for two actuators of a first module or axis of a robot and a second set of control signals for a second module or axis of a robot.

Actuators may belong to the group of electric, magnetic, and mechanical motors moving or controlling a mechanism or system. Examples include a piezoelectric actuator, a brushless electric motor, and a servo motor.

In some embodiments, the apparatus' actuator is configured to move the apparatus in its three translational degrees of freedom. In some embodiments, the actuator is configured to move the apparatus in its three rotational degrees of freedom. In some embodiments, the actuator is configured to move a part of the apparatus, such as the antenna. In some embodiments, multiple actuators are used in conjunction.

In some embodiments, the apparatus' actuator is configured to move the apparatus' position by at least 30 cm. In some embodiments, the apparatus' actuator is configured to move the apparatus' position by at least 100 cm. In some embodiments, the apparatus' actuator is configured to move the apparatus' rotation by at least 30 degrees. In some embodiments, the apparatus' actuator is configured to move the apparatus' rotation by at least 90 degrees.

FIG. 1 is a block diagram of an illustrative localization system 100 (sometimes referred to herein as a "network") that includes components involved in the generation and execution of a schedule for transmitting localization signals in accordance with some embodiments of the present disclosure. System 100 comprises scheduler 110, scheduling unit controller 120, and transceivers 130 (also referred to herein as an "anchor").

Scheduler 110 uses one or more input parameters to determine the schedule. As illustrated, the input parameters may comprise one or more user requirements, anchor locations, and anchor properties. The user requirements may include desired positioning performance. For example, a user may specify a minimum positioning performance within a localization region. As another example, a user may specify different positioning performance within the localization region. In some embodiments, the positioning performance may be input via a two- or three-dimensional map, where zones within the localization region are marked with the desired positioning performance. The anchor locations may be input according to a known coordinate system. In some embodiments, a user may input the anchor locations. In some embodiments, the localization system 100 may be configured to determine the locations of the anchors using the localization signals. The anchor properties may include the connectivity of the anchors to each other and other anchor properties such as the available configurations (e.g., whether an anchor can receive and transmit at the same time), the frequencies to which the anchor can be set, antenna radiation pattern, any other suitable anchor properties, and any combination thereof.

Scheduler 110 may include one or more inputs such as a user input or a communication input for receiving the input parameters. The user input may include, for example, a keyboard, a mouse, a touch screen, buttons, switches, a touch pad, or any other suitable user input device. The communication input may include, for example, a wired interface (e.g., using USB, RS-232, Ethernet, or other standards) or a wireless interface (e.g., using Wi-Fi, IR, WiMAX, wireless BLUETOOTH, or other standards). Scheduler 110 may also include a processor and memory. The processor may be adapted to execute computer program instructions stored in the memory, which may include an operating system and one or more applications, as part of performing the functions described herein. For example, the processor may be configured to receive the one or more input parameters, process the one or more inputs, and determine an appropriate schedule as explained in more detail below. Scheduler 110 may also include an output for outputting the schedule to the anchors, such as transceivers 130. In some embodiments, the schedule is first outputted to scheduling unit controller 120. The output may, for example, include a wired interface or a wireless interface. In some embodiments, the output may be the same as the communication input. In some embodiments, scheduler 110 may be implemented as a personal computer.

Scheduling unit controller 120 facilitates the transmission of the schedule to the anchors. In some embodiments, scheduling unit controller 120 may be in communication with one or more anchors such as transceivers 130. In some embodiments, scheduling unit controller 120 may process the schedule received from scheduler 110. For example, scheduling unit controller 120 may prepare the schedule for transmission to the anchors. In one embodiment, the processing comprises translating the schedule and preparing it for transmission to the anchors. This may involve parsing a schedule file format (e.g., a XML or YAML file), converting the data in the file into a scheduling unit-specific format, adding information such as a unique schedule ID, serializing the data, and adding data protection information such as a CRC. Scheduling unit controller 120 may transmit the schedule (e.g., in its translated format) to the anchors such as transceivers 130. In some embodiments, the transmission is performed using the same type of wireless signals that are normally used for localization purposes. In this case, scheduling unit controller 120 comprises digital transmission electronics, analog transmission electronics, and an antenna. These components are described in more detail below. In some embodiments, the transmission is performed through a wired interface or a separate wireless transmission channel that is available to both scheduling unit controller 120 and the anchors.

Scheduling unit controller 120 is shown as a separate component in localization system 100. However, it will be understood that this is merely illustrative. In some embodiments, scheduling unit controller 120 or the functionality of scheduling unit controller 120 may be integrated into other components. For example, scheduling unit controller 120 may be integrated into scheduler 110. As another example, scheduling unit controller 120 may be integrated into one or more anchors such as transceivers 130.

As mentioned above, localization system 100 may include transceivers 130. Transceivers 130 are configured to receive a schedule from scheduling unit controller 120. Each transceiver 130 may receive the schedule directly from scheduling unit controller 120 or indirectly through one or more other transceivers. The received schedule may be stored in a memory within each transceiver, from where it may be accessed by a scheduling unit of each transceiver. The details of transceivers 130 are described below.

In some embodiments, transceivers 130 are capable of switching between different schedules. This may be achieved by including several scheduling units within each transceiver, or by using a single scheduling unit which is configured to receive a signal that will cause the scheduling unit to switch to a different schedule. Several schedules may be received from scheduling unit controller 120, including for example, unique identifiers that allow a scheduling unit to determine which schedule to use depending on a received signal. In some embodiments, the received signal could cause the scheduling unit to interrupt the current schedule, to restart the current schedule, or to jump to a specific point in the schedule. In some embodiments, the first part of a long schedule may be designed to facilitate the clock synchronization between the network transceivers while the second part may be designed to optimize the localization performance. The scheduling unit controller may send a signal to restart the execution of the schedule when the network synchronization error increases above a certain threshold. In some other embodiments, the execution of the schedule may have to be restarted from the beginning or from a certain point in time every time a self-localizing apparatus enters the region of space covered by the network of transceivers. In some embodiments, the point in time from which the execution of the schedule is restarted may depend on the position from which the self-localizing apparatus enters the region of space. In some embodiments, a default schedule (e.g., one based on the ALOHA protocol) may be permanently stored in a memory of a transceiver, and an additional schedule can be transmitted by scheduling unit controller 120. A transceiver could then operate in a default mode (based on the default schedule) or an improved-performance mode (e.g., based on an optimized schedule received from scheduling unit controller 120).

Figure 2:
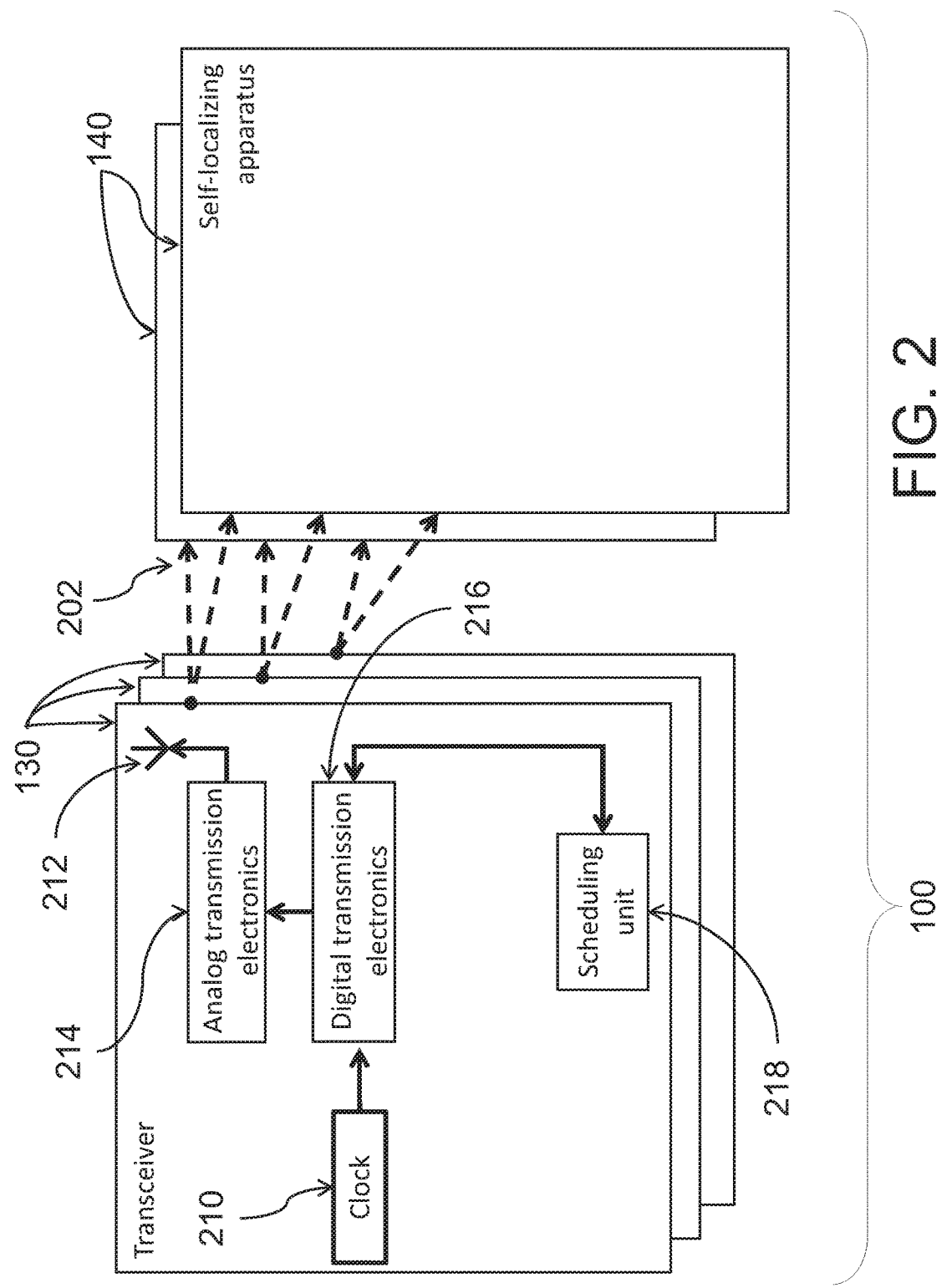
FIG. 2 is a block diagram of illustrative transceivers and self-localizing apparatus of a localization system in accordance with some embodiments of the present disclosure.

FIG. 2 is a block diagram of three illustrative transceivers 130 and two self-localizing apparatuses 140 of an illustrative localization system 100 in accordance with some embodiments of the present disclosure. In some embodiments, localization system 100 of FIG. 2 is the same as localization system 100 of FIG. 1. In some embodiments, localization system 100 of FIG. 2 is a different localization system than that depicted in FIG. 1. Each of the three transceivers 130 transmits timestampable localization signals 202. In some embodiments, the three stationary transceivers 130 have known relative locations to each other. In some embodiments, the three transceivers 130 have synchronized clocks 210. Transceivers are sometimes referred to herein as "anchors" or "beacons". It will be understood that while three transceivers and two self-localizing apparatuses are illustrated in FIG. 2, any suitable numbers of transceivers and self-localizing apparatuses may be used in localization system 100.

Each transceiver 130 in FIG. 2 comprises analog electronic components 214 and digital electronic components 216. An antenna 212 is coupled to analog transmission electronics 214. Analog transmission electronics 214 may generate an analog transmission signal from at least one digital data packet. Digital data packets are provided by digital transmission electronics 216. The analog transmission signal can be generated using an analog pulse generator. The analog transmission signal may also be amplified by an amplifier before being passed to antenna 212 for transmission.

In FIG. 2, transmission electronics 214, 216 are used to convert payload data (sometimes called "payload") into signals 202 that may then be transmitted by transmitters 130. In some embodiments, signal 202 is an UWB signal. A single UWB signal 202 transmitted by a single transceiver 130 can be received by a plurality of apparatuses 140. Each apparatus may use information gained from multiple signals 202 to compute its location without emitting signals of its own.

Clock 210 is coupled to transmission electronics 214, 216 and provides timing information for transmitting signals 202. Clock 210 may include an onboard clock or may have a wireless or wired connection (not shown) that receives time information from an offboard clock (not shown), e.g., at a remote location.

Transmissions (e.g., signals 202) from three transceivers 130 may be coordinated using a scheduling unit 218, which is operable to schedule the transmission of signals 202. In some embodiments, scheduling unit 218 may provide sufficient time separation between the localization signals to prevent transceiver messages from arriving at a receiver's antenna without adequate time separation, which can result in degraded signal detection and hence reduced performance of localization system 100. In some embodiments, scheduling unit 218 may implement an ALOHA protocol to reduce or prevent the effect of insufficient time separation. In some embodiments, signal transmission may follow a pre-programmed schedule, or scheduling may be performed centrally and a schedule communicated to each transceiver as described, for example, in FIG. 1. In some embodiments, scheduling may be performed by each transceiver. For example, the scheduling for a transceiver may be based on information stored by the transceiver about the other transceivers (e.g., an ordered list or a transmission schedule of the other transceivers in range). In some embodiments, the scheduling unit may furthermore provide configuration signals to the transmission electronics. These configuration signals can be interpreted by the transmission electronics to adjust certain settings of the transmitter, for example, the center frequency, the signal bandwidth, the preamble code, the preamble length, transmission power, or antenna.

Analog transmission electronics 214 are coupled to digital transmission electronics 216 and together they allow the transmission of UWB signals 202. Such transmissions may be performed such that the transmission of signal 202 from antenna 212 occurs accurately at a specified transmission time relative to clock 210. This can be achieved using digital transmission electronics 216. Digital transmission electronics 216 may coordinate its operation with scheduling unit 218. The transmission of a signal at a specified time is preferably performed such that a specific symbol is emitted from the antenna 212 at the specified time. For transmissions that follow the IEEE 802.15.4 standard, a common choice for the symbol to be transmitted at that time is the beginning of the start-of-frame delimiter, i.e., the point at which the transmitted signal changes from the repeated transmission of the preamble code to the transmission of the start-of-frame delimiter. Digital transmission electronics 216 may use the signal provided by clock 210 as a reference in this transmission at the specified time; the transmission time can therefore be expressed relative to this clock.

The two self-localizing apparatuses 140 shown in FIG. 2 are each configured to receive the UWB radio signals 202 transmitted by transceivers 130.

Figure 3:
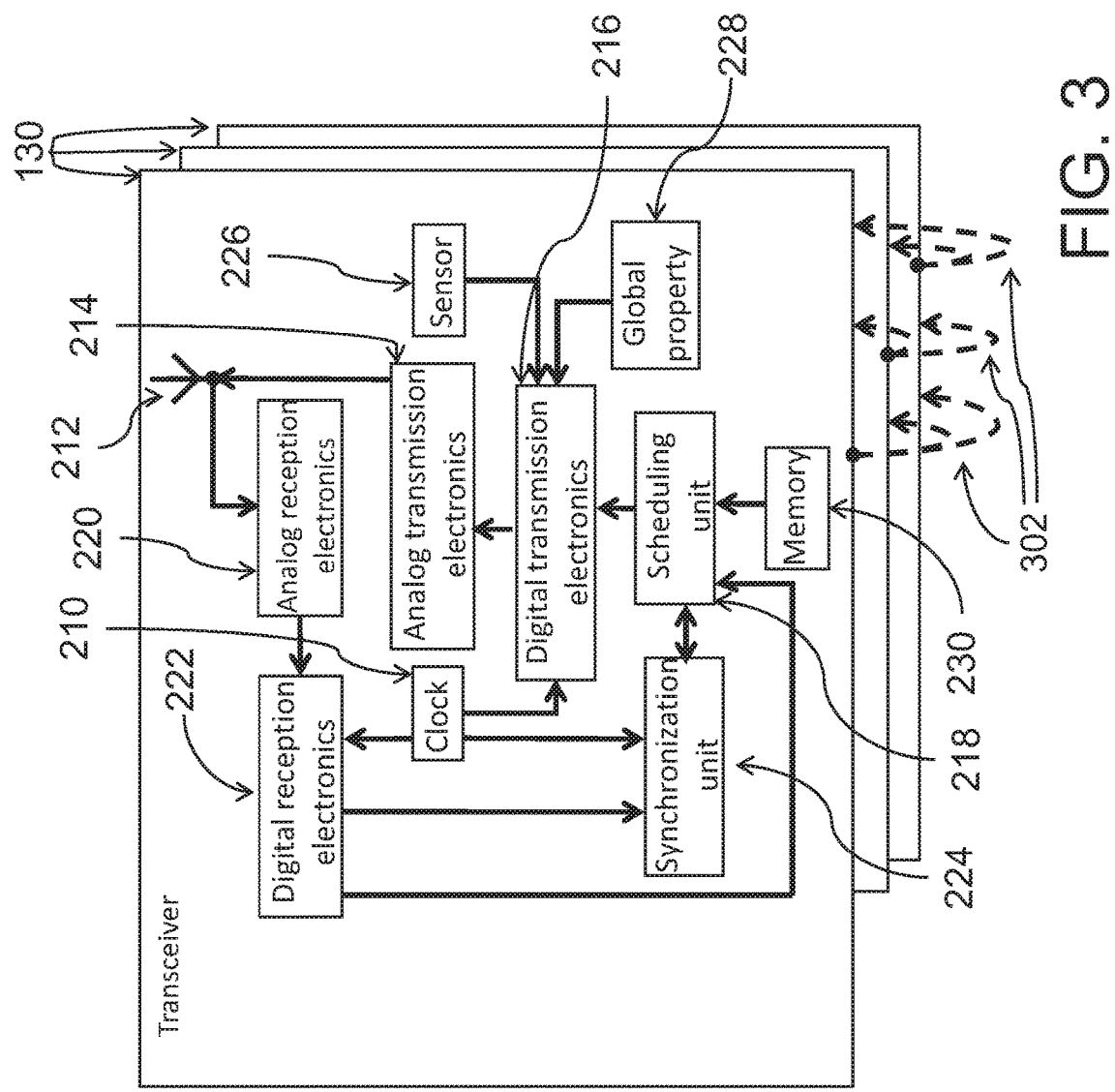
FIG. 3 is a detailed block diagram of illustrative transceivers of a localization system in accordance with some embodiments of the present disclosure.

FIG. 3 is a detailed block diagram of illustrative transceivers 130 in accordance with some embodiments of the present disclosure. In some embodiments, transceivers 130 of FIG. 3 are used in localization system 100 of FIG. 1 or localization system 100 of FIG. 2. In some embodiments, transceivers 130 of FIG. 3 are used with a different localization system than that depicted in FIGS. 1 and 2.

Transceivers 130 of FIG. 3 may each include an antenna 212 that is coupled to both analog transmission electronics 214 and analog reception electronics 220. In some embodiments, a TX/RX-switch is used to connect the antenna to one or the other of electronics 214, 220. Analog reception electronics 220 is coupled to digital reception electronics 222 and together they allow the reception of signals 302 transmitted by other transceivers 130. Analog and digital reception electronics 220, 222 may have similar capabilities to the ones on self-localizing apparatus 130 of FIG. 2. For example, analog and digital reception electronics 220, 222 may convert signals 302 into data (the payload), accurately determine the time at which the transmitted signal reached antenna 212, and may provide additional quality metrics related to received signal 302 such as signal strength, reception time standard deviation, and metrics for determining whether the signal traveled in line of sight or not, among others.

Digital reception electronics 222 are operationally coupled to a synchronization unit 224, which may be used to identify and compensate for a clock 210 of any one transceiver not running in perfect synchrony with the clocks of the other transceivers. Upon reception of an UWB radio signal, the received data, timestamp, and quality metrics are sent to synchronization unit 224. Synchronization unit 224 may compare the reception time stamp to previous reception time stamps, to transmission time information included in the data (payload) of the signal, and to transmission time information included in previous signals 202. From this information, synchronization unit 224 may compute the current behavior of clock 210 such as, for example, its current clock rate, or the current rate of change of the clock rate. In addition, synchronization unit 224 may determine the time-of-flight of signals between stationary transceivers by evaluating the discrepancy between locally measured reception timestamps, locally set transmission times, measured reception timestamps reported from other transceivers, and set transmission times of other transceivers. Through careful correction for errors such as differing clock offsets, clock rates, and signal propagation times, synchronization unit 224 may compute a correction to allow the transceivers to obtain a common, synchronized reference time. In some embodiments, synchronization uses signals 302 received from other transceivers 130. Time synchronization between the transceivers is beneficial, for example, because any offset in transceiver timing may translate into errors in the localization of the self-localizing apparatus.

Transceiver 130 of FIG. 3 may also include a sensor 226 and a global property sensor 228. Both of these sensors are coupled to digital transmission electronics 216. This enables signals representative of the measurements taken by sensor 226 and global property sensor 228 to be included in the data that is transmitted by digital transmission electronics 216, analog transmission electronics 214, and antenna 212 in the form of localization signals 202.

In some embodiments, a sensor 226 or a global property sensor 228 may be used to sense a transceiver's orientation. With knowledge of the transceiver's orientation, a self-localizing apparatus (e.g., self-localizing apparatus 140 of FIG. 2) that receives a localization signal from that transceiver may be able to compensate for signal delays introduced by the relative orientation of the transceiver's antenna 212 to the self-localizing apparatus' antenna. This may, for example, be achieved by communicating the transceiver's detected orientation as part of its transmitted localization signal.

Each transceiver 130 may be equipped with memory 230, which may be used to store data such as configuration data, desired signal amplification, synchronization data (e.g., offsets or rate corrections for clocks), or range accuracy calibration data. Memory 230 may also be used to buffer data after reception and before transmission. In some embodiments, memory 230 can be rewritten multiple times or is non-volatile memory. In some embodiments, memory 230 is used to store one or more transmission schedules.

FIG. 3 shows illustrative transceivers that can receive and process wireless signals from other transceivers (sometimes referred to herein as "wireless transceivers" or "wireless UWB transceivers"). This is enabled by transceivers 130 having analog reception electronics 220 and digital reception electronics 222, which are operable to receive signals transmitted by other transceivers 130.

A first transceiver 130 may use one or more signals 302 from a second transceiver 130 or from a plurality of other transceivers 130 to adjust its transmission schedule to, e.g., provide better time separation between transmissions. This may, e.g., be achieved by scheduling unit 218 storing in a memory 230 the times at which signals 302 were received from other transceivers 130 in the network (e.g., network 100 of FIG. 2), and subsequently adjusting the local transmission schedule based on these times. In some embodiments, better time separation between transmissions results in reduced interference between localization signals 202 and signals 302. In some embodiments, measurement of the time separation between localization signals 202 may be a metric used for assessing or when improving the performance of a localization network.

In some embodiments, signals 302 may be used by a transceiver 130 to indicate the occurrence of an event. In some embodiments, signals 302 may be used by a transceiver 130 to trigger an action by other transceivers 130. In some embodiments, the action results in the scheduling of localization signals 202 or in a change of a transmission schedule. In some embodiments, dynamic transmission scheduling may be used to react to the addition or removal of transceivers from the system. In some embodiments, the reaction of the localization network (e.g., network 100 of FIG. 2) to the addition or removal (e.g., due to a fault) of transceivers may be used as a metric to assess the robustness of the network.

In some embodiments, signals 302 may be the same type of signals used by self-localizing apparatuses (e.g., signals 202). In some embodiments, signals 302 may be in some way different from signals 202. For example, signals 302 may have a different payload. In some embodiments, signals 302 may be transmitted at different times than signals 202. For example, signals 302 may be transmitted during installation or during a calibration phase of a localization system, and signals 202 may be emitted when the system is in operation. Signals 302 and 202 may also differ in further ways (e.g., their signal strength, preamble, etc.). In some embodiments, the use of signals 202 and signals 302 may differ. For example, transceivers may emit signals 202 at a different update rate from that used with signals 302, or the signal emission may follow a different schedule.

Figure 4:
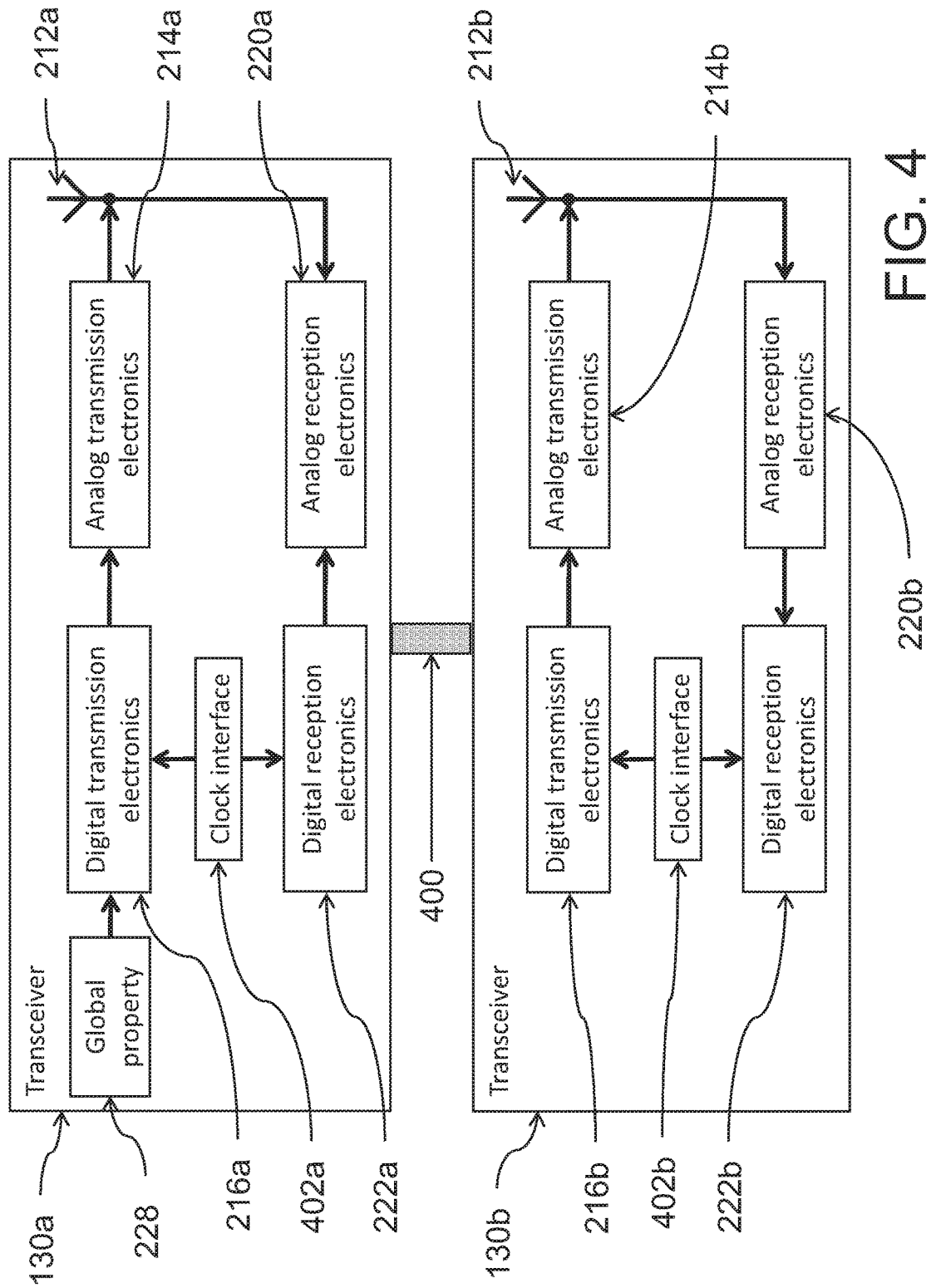
FIG. 4 is a block diagram of an illustrative transceiver comprising a pair of first and second transceivers in accordance with some embodiments of the present disclosure.

FIG. 4 is a block diagram of an illustrative transceiver comprising a pair of first and second transceivers 130a, 103b in accordance with some embodiments of the present disclosure. Transceivers 130a, 130b are physically coupled together using a structural element 400. Each transceiver 130a, 130b comprises an antenna 212a, 212b, analog transmission electronics 214a, 214b, digital transmission electronics 216a, 216b, and a clock interface 402a, 402b. First transceiver 130a may also comprise a global property sensor 228, which may be operationally coupled to the digital transmission electronics 216a.

For many applications, transceivers will have fewer constraints (e.g., weight constraints, size constraints, power constraints) than self-localizing apparatuses, because transceivers do not have to be mobile. It may therefore be preferable to shift complexity away from self-localizing apparatuses towards transceivers. The embodiment shown in FIG. 4 has several technical advantages. First, the pair of transceivers shown in FIG. 4 may be implemented as redundant receivers to provide an additional safeguard against failure. Depending on the use case, redundancy can be achieved for some or all of the transceiver's components. Second, transceivers 130a, 130b may be configured as illustrated to use different antennas 212a, 212b to provide additional functionality. Antennas 212a, 212b may, for example, differ in their orientation, in their antenna polarization, or in their gains, among other factors. This may result in technical advantages for a receiver, including an improved signal-to-noise ratio or less variation in signal reception across different receiver antenna orientations. In some embodiments, transceivers 130 of FIGS. 1-3 may use multiple antennas 212, e.g., connected with an RF switch.

Figure 7:
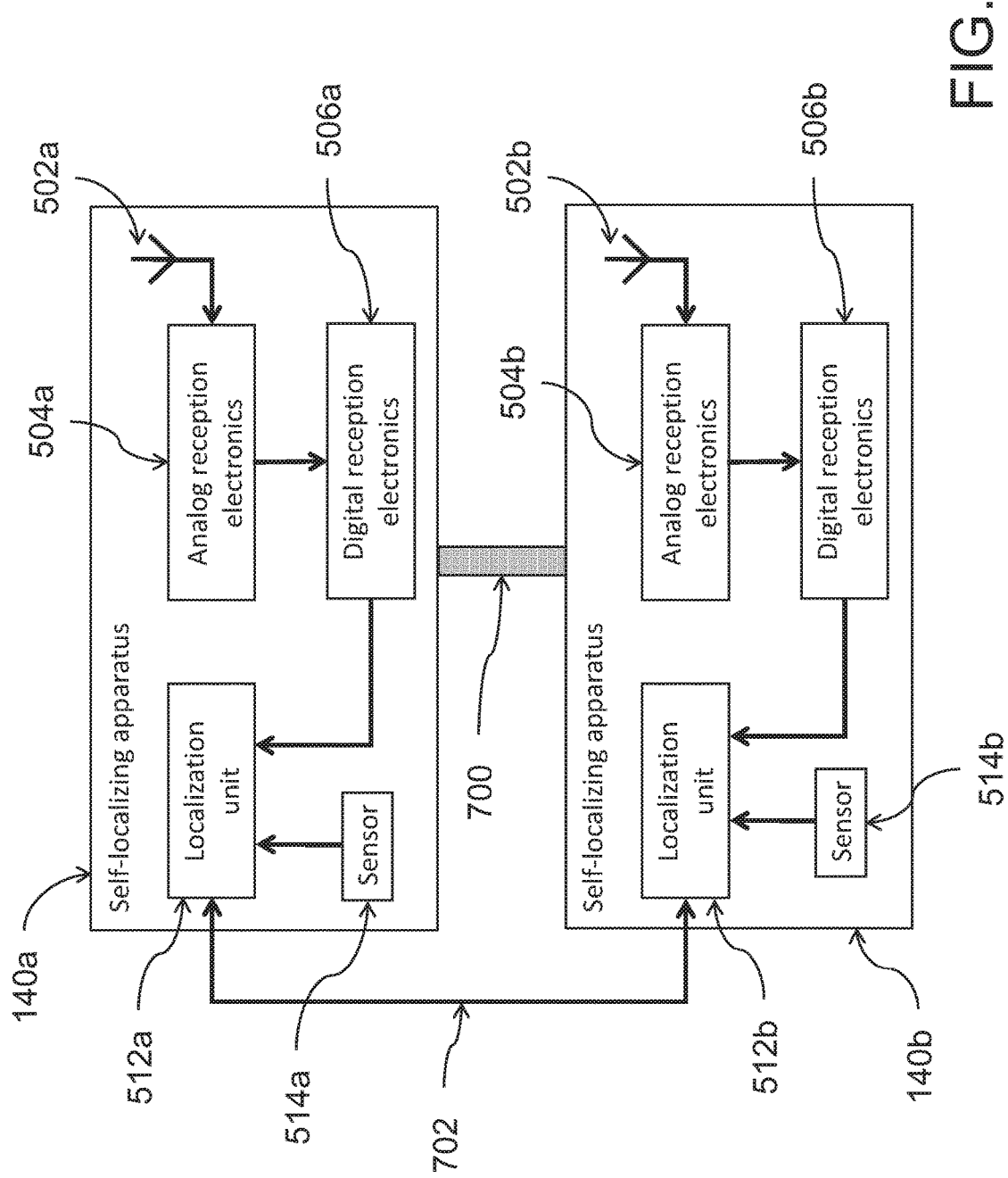
FIG. 7 is a block diagram of an illustrative self-localizing apparatus comprising a pair of first and second first self-localizing apparatuses in accordance with some embodiments of the present disclosure.

Using a pair of transceivers as shown in FIG. 4 may have additional advantages when used with similarly paired self-localizing apparatus (e.g., as shown in FIG. 7). In some embodiments, transceivers 130a and 130b may use different localization signals. For example, transceiver 130a may use a first frequency band while transceiver 130b may use a second, different frequency band. The simultaneous use of two different localization signals may allow higher update rates. It may provide improved resistance to interference. It may also allow disambiguation of signal-dependent effects from true differences in distance. For example, because a signal's speed depends on the refractive index of an obstacle and on the signal's wavelength, the use of two different signals with two different wavelengths may allow the delay introduced by the obstacle to be inferred.

Paired embodiments may also be used to detect a failure. This may, for example, be achieved by receiving a first signal from a first transceiver; receiving a second signal from a second transceiver that is physically attached to the first transceiver; comparing data related to the first signal with data related to the second signal while accounting for a difference in the two signals; and comparing the result to a threshold. Examples of the compared data include the reception of a signal; the accuracy of a signal's arrival; and the peak power of a signal. Examples for the difference in the two signals include a relative antenna position; a time delay between emission of the first and second signal; and a signal preamble.

In some embodiments, a failure is detected using a failure detection unit (not shown). In some embodiments, a failure detection unit is onboard the self-localizing apparatus. In some embodiments, a failure detection unit is offboard the self-localizing apparatus. In some embodiments, a single failure detection unit is used.

In some embodiments, paired antennas may be used to implement a multi-antenna setup.

The transceiver shown in FIG. 4 further comprises digital reception electronics 222a, 222b and analog reception electronics 220a, 220b. This allows each of transceivers 130a, 130b to exchange signals 302 wirelessly. In some embodiments, transceivers 130a, 130b do not include some or all of electronics 222a, 222b, 220a, 220b.

In some embodiments, the transceivers of the present disclosure may be used with a multi-antenna setup. A multi-antenna setup comprises at least two resonant elements (sometimes called "antennas") with known diversity (e.g., spatial diversity, time diversity, polarization diversity, pattern diversity, etc.).

A multi-antenna setup's resonant elements may differ in one or more of their characteristics (e.g., polarity, frequency response, sensitivity, orientation, etc.). For example, antennas may be separated by a known distance. As another example, antennas may be oriented orthogonally with respect to each other. The resonant elements of a multi-antenna setup may be used and combined in various ways using well-known radio frequency techniques (e.g., diplexers, power dividers, etc.). A multi-antenna setup may comprise dedicated electronics for an individual resonant element.

In some embodiments, a transceiver's antennas 212a, 212b may be used to implement a multi antenna setup. A multi antenna setup may comprise some separate electronics 214a, 214b, 216a, 216b, 220a, 220b, 222a, or 222b for an individual resonant element. For example, a multi-antenna setup may comprise separate reception electronics for an antenna.

In some embodiments, a transceiver is equipped with multiple antennas. In some embodiments, a transceiver's multiple antennas are used to implement a multi-antenna setup. In some embodiments, a self-localizing apparatus is equipped with multiple antennas. In some embodiments, a self-localizing apparatus' multiple antennas are used to implement a multi-antenna setup. In some embodiments, a transceiver and a self-localizing apparatus each have a multi-antenna setup.

In some embodiments, identical antennas are used for transmission and reception. In some embodiments, different antennas are used for transmission and reception. For example, transmitters may use a directional antenna while self-localizing apparatuses use omnidirectional antennas, or vice-versa. Various types of antennas may be used and combined to achieve the desired behavior for a given use case. For example, antennas using multiple resonant elements, Multi-Beam Adaptive Antennas, or Multiple-Input Multiple-Output Antennas (MIMO) may be used. In some embodiments, an antenna supporting multiple frequency bands may be used. In some embodiments, a multi-antenna setup's antennas may be isolated from each other.

In some embodiments, a multi-antenna setup may improve the localization performance of a localization unit or of a position calibration unit. In some embodiments, this may be achieved by improving reception (e.g., signal to noise, etc.). In some embodiments, the antenna and the reception electronics are configured to detect a signal strength. In some embodiments, signal strength is used to provide a relative indication of the distance to the transmitter.

In some embodiments, a directional antenna is used. In some embodiments, the antenna is configured to detect a signal bearing that may indicate the direction of source of the signal. In some embodiments, the antenna and the reception electronics are configured to allow detection of a signal's amplitude or phase. In some embodiments, knowledge of an emitted signal's amplitude or phase and a signal's detected amplitude or phase are used to provide a relative indication of the orientation or distance to the transmitter.

In some embodiments, a multi-antenna setup may allow a self-localizing apparatus' attitude to be determined. For example, in some embodiments a multi-antenna setup may be used to detect the direction of polarization of a signal. Knowledge of a signal's emitted polarization and a signal's detected polarization may provide a relative indication of the orientation of emitter (e.g., a transceiver) and receiver (e.g., another transceiver or a self-localizing apparatus).

In some embodiments, a multi-antenna setup's antennas may operate on different frequencies. For example, a multi-antenna setup may be used in a redundant transceiver network that is operating on two separate frequencies. As a further example, a multi-antenna setup may be used on a self-localizing apparatus used in a redundant transceiver network that is operating on two separate frequencies.

In some embodiments, the antenna, analog reception electronics, and digital reception electronics are configured to measure a Doppler shift of the signal. This may, for example, allow a localization unit to improve its localization estimate by providing data related to a self-localizing apparatus' movement relative to the known location of a transceiver.

In some embodiments, the advantages of a transceiver's multi-antenna setup and a self-localizing apparatus' multi-antenna setup may be combined. This may, for example, be achieved by combining knowledge of a transceiver's multi-antenna setup's properties (e.g., the transceiver's position), knowledge of the emitted signal's properties (e.g., the signal strength, the signal polarization), and knowledge of the self-localizing apparatus' multi-antenna setups' properties (e.g., its antenna array's resonant element's relative alignment and its reception characteristics) in a localization unit.

In some embodiments, a localization unit is used to fuse data from one or more of the following: a multi-antenna setup; a sensor; a global property sensor; a first and a second global property sensor; and a known location.

Multi-antenna setups may have technical advantages. In some embodiments, a multi-antenna setup may allow reception to be optimized, a signal-to-noise ratio to be improved, or a data rate to be increased. This may, for example, be achieved by allowing better reception over a range of receiver positions or orientations. As another example, a multi-antenna setup may be used to implement spatial multiplexing in a MIMO system to increasing data rate.

In some embodiments, the system components' influence on localization signals is known. For example, the transceiver's RF components may have well known transmission properties. As a further example, the self-localizing apparatus' electronics and structural components have a well-known RF response. In some embodiments, known RF effects are compensated for by a compensation unit. In some embodiments, antennas may use shielding.

It will be understood that while transceivers 130 of FIGS. 2-4 have been described in different embodiments as having wireless transmission and wireless reception capabilities, the wireless reception capability is optional. For example, in some embodiments, transceivers 130 do not include the wireless reception components. In some embodiments, transceivers 130 are configured to exchange synchronization information and other information with other transceivers 130, scheduling unit controller 120, or scheduler 110 using wired connections. As mentioned above, the transceivers are also referred to as anchors. Accordingly, it will also be understood that anchors as used herein can include both wireless transmission components and wireless reception components or only wireless transmission components.

Figure 5:
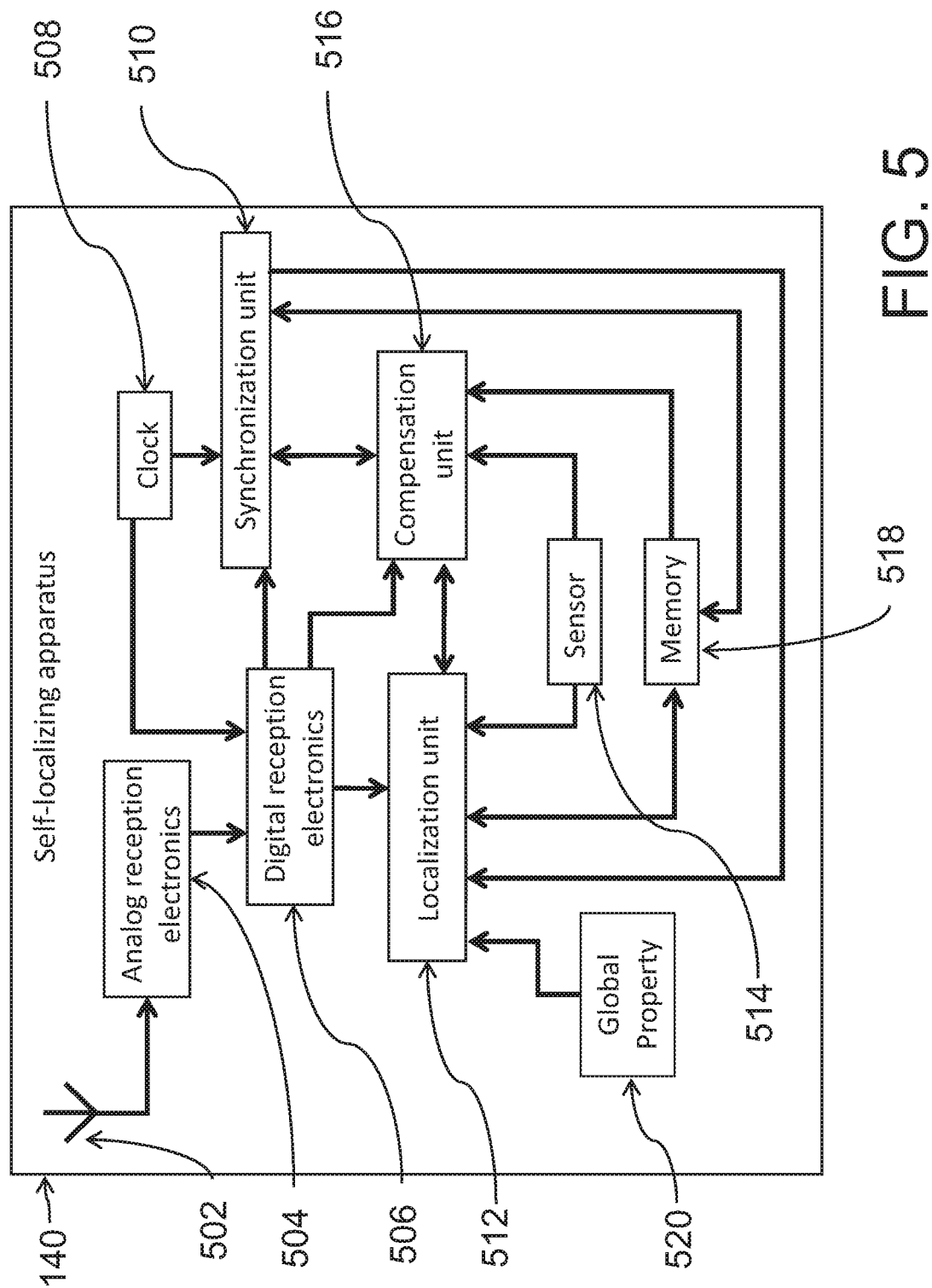
FIG. 5 is a block diagram of an illustrative self-localizing apparatus in accordance with some embodiments of the present disclosure.

FIG. 5 is a block diagram of an illustrative self-localizing apparatus 140 in accordance with some embodiments of the present disclosure. Self-localizing apparatus 140 comprises an antenna 502 for receiving localization signals 202. Antenna 502 is operationally coupled to analog reception electronics 504, which may amplify the signal. Digital reception electronics 506 may then be used to timestamp the signal in reference to clock 508. A synchronization unit 510 may compare an input from clock 508 to inputs from other clocks (e.g., received as part of a synchronization signal or message from another part of the localization system and received by the digital reception electronics 506). Synchronization unit 510 may use this information to compute a clock correction for a clock rate or a clock offset, which it may communicate to localization unit 512 or compensation unit 516, or store in a memory 518. Additionally, information from compensation unit 516 may be used.

Self-localizing apparatus 140 of FIG. 5 may be used, for example, with localization system 100 of FIG. 2. In this embodiment, self-localizing apparatus 140 of FIG. 5 receives timestampable localization signals 202 transmitted by transceivers 130 of FIG. 2 through its antenna 502, analog reception electronics 504, and digital reception electronics 506. Self-localizing apparatus 140 may use signals 202 to compute its location relative to transceivers 130. In some embodiments, this is achieved by timestamping signals 202, converting the timestamps to distances, and using these distances to compute the relative location. This conversion can use an estimation of the speed of the signals 202 in the transmission medium (e.g., the speed of light in air). This conversion may be accomplished using localization unit 512. Localization unit 512 may compute the self-localizing apparatus' location relative to the known locations of transceivers 130 by trilateration or multilateration. Sufficiently accurate timestamping may be provided by digital reception electronics 506 and clock 508.

Reception electronics 504, 506 may accurately determine the reception times at which the transmitted signals reach antenna 502. Determining a signal's reception time ("timestamping") may be carried out by determining the time at which a symbol is detected. For transmissions that follow the IEEE 802.15.4 standard, a common choice for the symbol to be timestamped is the beginning of the start-of-frame delimiter (i.e., the point at which the transmitted signal changes from the repeated transmission of a preamble code to the transmission of the start-of-frame delimiter). Digital reception electronics 506 uses a signal provided by the apparatus' clock 508 as a reference in this timestamping process. The timestamp may be therefore expressed relative to this clock. In some embodiments, clock 508 comprises an onboard clock. Reception electronics 504, 506 may also provide additional metrics related to received signals 202.

Quality metrics may, for example, include signal strength, reception time standard deviation, or noise properties of the signal. Quality metrics may be computed based on absolute values (e.g., an absolute signal strength) or based on relative values (e.g., a difference of signal strengths). Quality metrics may also be computed by comparing signals. For example, quality metrics may be computed based on comparisons of a signal over time, on comparisons between signals from different transceivers, on comparisons of signals received from different directions, on comparisons of signals with thresholds, on comparisons of signals with their expected property, and others. Comparisons may use individual signal properties (e.g., the peak power) or entire signals (e.g., the signal's spectral shapes). Quality metrics may, for example, be used to determine whether a signal 202 travelled in line of sight, or what material it may have traversed, or how it may have been reflected.

Self-localizing apparatus 140 of FIG. 5 (and FIG. 2) may further comprise a global property sensor 520. Global properties may allow a more accurate computation of the relative location of a self-localizing apparatus 140 by providing additional reference data with respect to a reference point (e.g., a transceiver or a coordinate system). This can be achieved by equipping at least one transceiver 130 and a self-localizing apparatus 140 to detect the global property. The localization system's accuracy may be improved by a method comprising the steps of: (i) transmitting a transceiver's global property reading to an apparatus, by (ii) comparing the transceiver's reading of the global property at its location and the apparatus' reading of the global property at its location, by (iii) using a model of the global property ("global property model") to translate the comparison into data related to an orientation, position, or movement, and (iv) appropriately fusing that data with other sensor data by using an estimator. Steps (ii) and (iii) may be accomplished using a localization unit 512, such as the one shown as part of self-localizing apparatus 140 of FIG. 5. Global property models allow conversion of one or more readings of the global property into data that can be processed by the localization system (e.g., the equation describing atmospheric pressure as a function of altitude/height). Models can take various forms, such as functions or look-up tables.

The use of data from one or more global property sensors (e.g., global property sensor 228 of FIG. 3) in addition to other data provided by the localization system such as data from a local, onboard sensor (e.g., onboard sensor 514 of FIG. 5), may be particularly useful in the presence of systematic sensor errors or sensors with a high noise rate.

For example, in an exemplary embodiment for an outdoor installation, an apparatus and multiple transceivers may be equipped to receive GPS signals in addition to localization signals 202. This may allow self-localizing apparatus 140 to not only determine its position relative to transceivers 130, but also relative to a global reference frame using localization unit 512. Additionally, this combination of localization modalities may allow detection of erroneous data by comparing readings from two independent measurement systems. The localization system may be further improved by equipping the transceivers and the apparatus with additional sensors to detect global properties, such as barometers. This may be particularly useful to allow localization unit 512 to achieve more accurate, more reliable, or faster localization in the vertical direction, for which both GPS and local localization systems may provide poorer information because of unfavorable positioning of transceivers (often all on the ground plane, below apparatuses) and GPS satellites (high in the sky, typically high above apparatuses).

Global signals may also be used to determine the relative orientation of a communicating transceiver's antenna 212 and a self-localizing apparatus' antenna 502, which can have an important influence on signal quality or group delay and hence on their computed relative location. Determining orientation can, for example, be achieved by detecting the gravity vector of the transceiver (e.g., using an accelerometer), communicating this information to the apparatus (e.g., as part of the payload of the localization signal), and comparing it with the gravity vector detected by the apparatus (possibly corrected for the influence of apparatus' motion) using a model for each of the transceiver's and apparatus' antenna orientation relative to their accelerometer. This comparison can be performed by a compensation unit (e.g., compensation unit 516 of FIG. 5).

As mentioned above localization unit 512 uses data to compute a location estimate. The data may include received signals 202, data from one or more onboard sensors 514, data from one or more offboard sensors (e.g., global property sensor 228 of a transceiver), or other data. Data related to received signals 202 may include payload, timestamps, signal characteristics (e.g., signal strength, peak shape, etc.), or others. This may be achieved by computing an estimate of the position (and, possibly, orientation or motion) of self-localizing apparatus 140 based on fusing current values of the data and other information (e.g., knowledge of input history, a dynamic model of the apparatus) using an estimator. Each individual received signal 202 may be used recursively to provide an updated (posterior) position estimate by merging it with a previous (prior) estimate. In some embodiments, (extended) Kalman Filters, complementary filters, particle filters, Luenberger observers, or any other suitable technique can be used to recursively compute an estimate. Localization unit 512 may collect several localization signal receptions (e.g., 3, 4, 5, 6, 7, 8, 9, 10, etc.) by storing them in memory (e.g., memory 518) and batch-processing them (either after receiving a predefined number of signals, or at fixed intervals). Batch-processing methods may be based on multilateration techniques by solving the time difference of arrival (TDOA) measures for the position of the apparatus 140. In some embodiments, a combination of recursive and batch processing may be used.

Memory 518 may be used to store information, such as data from received signals 202, for batch processing the current location estimate or parameters for the recursive computation and sensor fusion. Localization unit 512 may also use data (e.g., compensation values) from a compensation unit or information about received signals 202 generated by the digital reception electronics 506 (e.g., quality metrics).

A reason for variation in signal quality or group delay may be that transceivers and self-localizing apparatuses are small and may operate in relative proximity to each other. This may result in a large variety of relative orientations, relative distances, and relative directions of transmitter antenna 212 to receiver antenna 502 used in a typical application and encountered during typical use, such as multiple transceivers situated on a plane with apparatuses operating above or below the plane, or multiple transceivers situated around a volume with apparatuses operating inside the convex hull of the volume.

Unlike in other localization systems, here signals 202 arriving at the self-localizing apparatus can be of varying quality or can have different group delay. In some embodiments, localization unit 512 may be used to improve the location estimate over prior localization systems by using specifics of localization signals as well as quality metrics related to the received localization signal, such as those provided by reception components (e.g., UWB peak signal strength, UWB peak shape). This may, for example, be achieved by relating the measurement variance to a signal metric such that measurements with higher variance have a lower impact on the localization unit's state estimate. As another example, the localization unit may put more emphasis on data that is independent of the localization signal (e.g., inertial sensors, global properties). As another example, the localization unit may entirely discard measurements from certain transceivers that do not meet a quality metric such as a minimum signal quality or group delay.

Unlike prior systems, localization unit 512 may here be situated on self-localizing apparatus 140 because the time-stampable localization signals travelling from the transceivers to the self-localizing apparatus can contain enough information to allow the apparatus to self-localize. For example, transceivers may be synchronized and their locations may be known to the apparatus.

Figure 6:
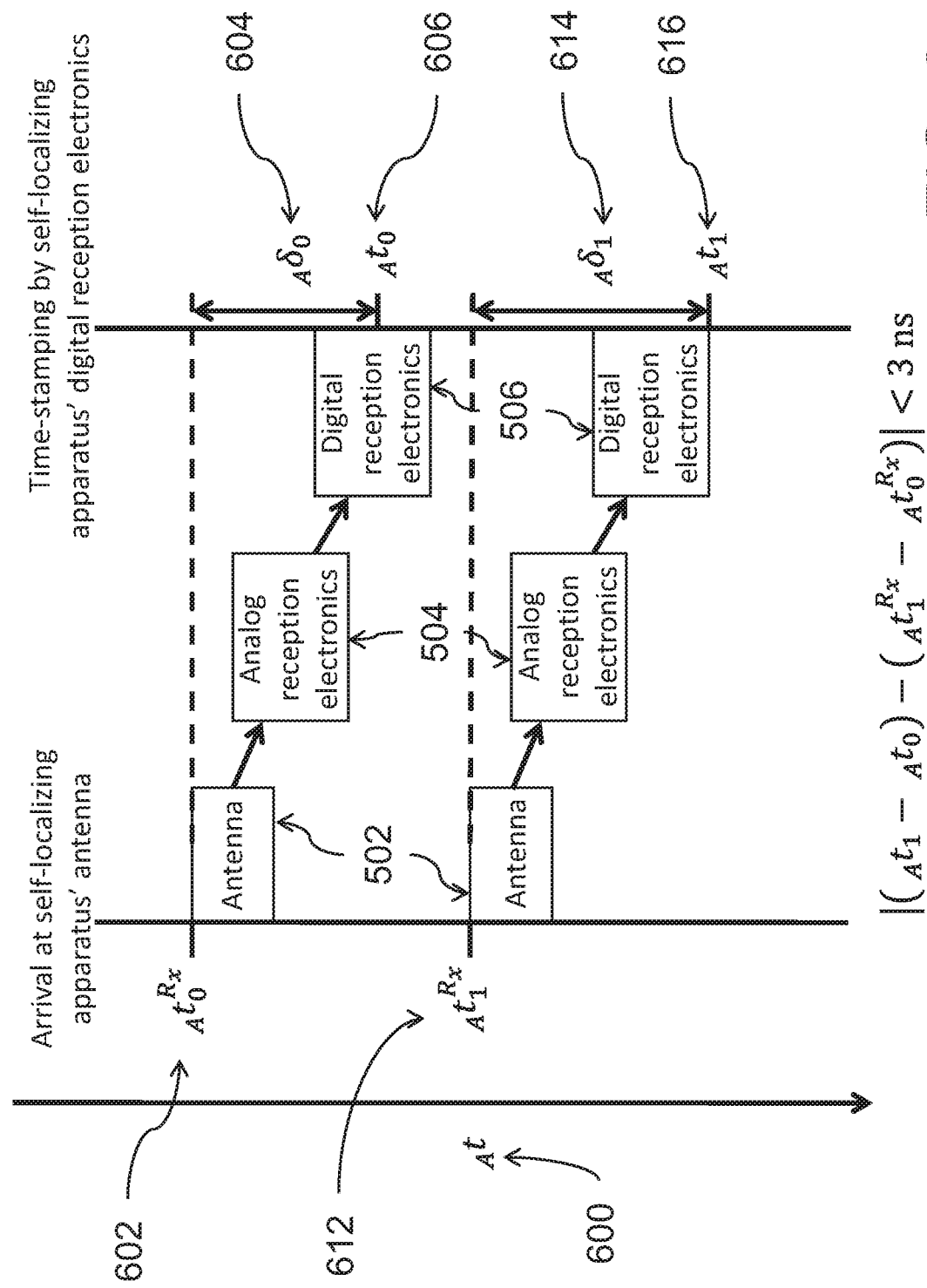
FIG. 6 is an illustrative timing diagram in accordance with some embodiments of the present disclosure.

FIG. 6 is an illustrative timing diagram, which depicts the propagation of a received localization signal (e.g., a UWB signal) through a self-localizing apparatus' antenna 502, analog reception electronics 504, and digital reception electronics 506 in accordance with some embodiments of the present disclosure. The interconnection of these components will be referred to as the reception pipeline. Each of these components introduces a delay to the propagation of the received signal. Time is shown on the vertical axis, where the notation $_A t$ is used to indicate that time t is measured with reference to the clock of self-localizing apparatus A.

Considering a signal that arrives at time $_A t_0^{Rx}$ 602 at antenna 502 of a self-localizing apparatus, the signal propagates through the reception pipeline, before its arrival is timestamped at time $_A t_0$ 606 by digital reception electronics 506. The delay introduced by the pipeline (given by the difference between $_A t_0$ 606 and $_A t_0^{Rx}$ 602) is denoted $_A \delta_0$ 604 and is referred to as pipeline delay. Consider now a second signal that arrives at time $_A t_1^{Rx}$ 612 at antenna 502 of the self-localizing apparatus and, after a pipeline delay of $_A \delta_1$ 614 through the reception pipeline, is timestamped at time $_A t_1$ 616. The variation in pipeline delay between the two signals is given as $|_A\delta_1 - _A\delta_0|$. Note that this measurement is with respect to the clock of the self-localizing apparatus 140, and is thus independent of clock-rate offsets. In some embodiments, the difference between pipeline delays 604 and 614 is less than 0.01, 0.6, 3, or 15 nanoseconds, which allows more accurate localization to be achieved.

Variation in pipeline delay is influenced by physical, measurable factors including the frequency response of the self-localizing apparatus' antenna 502, internal amplification and the accuracy and variation in the generation of timestamps by digital reception electronics 506. Since antennas are non-ideal electromagnetic devices, their frequency response is described by a reception-angle-dependent magnitude response corresponding to how much a radio signal is amplified or attenuated by the antenna, as well as a reception-angle-dependent phase response corresponding to how much a radio signal is delayed by the antenna. These responses are deterministic functions of the angle at which a signal is received and result in an electrical delay of the signal as it passes through antenna 502. In some embodiments, the signal's propagation through the analog reception electronics 504 and digital reception electronics 506 may be further delayed by internal amplification of the signal to achieve a consistent signal level, irrespective of received signal strength. Furthermore, the ability of digital reception electronics 506 to consistently and accurately timestamp the arrival of an UWB signal requires it to consistently and accurately identify the signal's "first-path". Errors in this identification, which are discussed below, result in a non-constant error in the timestamping process and thus a perceived delay in the signal's propagation time through the reception pipeline. In addition to systematic pipeline delays, in some embodiments random, external or unmodelled processes may also affect the pipeline delay, introducing non-systematic delays in the reception pipeline. In some embodiments, temperature is an example of such a process, whereby changes in temperature may influence the processing time required by digital reception electronics 506.

The effect of a non-constant pipeline delay is the introduction of non-constant error in the reception time of any signal 202. It will therefore be apparent to one skilled in the art that a non-constant pipeline delay, as illustrated in FIG. 6, may correspond to a non-constant error in any time-of-arrival or time-distance-of-arrival measurement derived from the reception times of any signals 202. A compensation unit (e.g., compensation unit 516 of FIG. 5) may, in some embodiments, compensate for this systematic, yet non-constant error.

FIG. 7 is a block diagram of an illustrative self-localizing apparatus comprising a pair of first and second self-localizing apparatuses 140a, 140b in accordance with some embodiments of the present disclosure. Self-localizing apparatuses 140a, 140b are physically coupled together using a structural element 700. Each self-localizing apparatus 140a, 140b comprises an antenna 502a, 502b, analog reception electronics 504a, 504b, digital reception electronics 506a, 506b, and a localization unit 512a, 512b. As illustrated, the pair of localization units 512a, 512b are operationally coupled using communication path 702. Communication path 702 allows localization units 512a, 512b to exchange data related to their location (e.g., their current location estimate).

Structural element 700 provides a rigid or semi-rigid attachment between self-localizing apparatuses 140a, 140b. In some embodiments, structural element 700 may include one or more of printed circuit board (PCB) mounts, multi-purpose enclosure boxes, struts, or connecting rods, among others. Because self-localizing apparatuses 140a, 140b are physically connected, their relative location is fully or partially known. This may allow first localization unit 512a to improve its location estimate based on data related to the location of second localization unit 512b and data related to the known relative location of first and second localization units 512a, 512b.

In some embodiments, the pair of self-localizing apparatuses 140a, 104b shown in FIG. 7 may operate as redundant self-localizing apparatuses, which can provide a safeguard against failure. For example, if a component in first self-localizing apparatus 140a fails, a localization system may rely on second self-localizing apparatus 140b. Depending on the use case, redundancy can be achieved for some or all of the self-localizing apparatus's components.

As illustrated, first and second self-localizing apparatuses 130a, 130b use different antennas 502a, 502b. In some embodiments, antennas 502a, 502b may have different characteristics. For example, antennas 502a, 502b may differ in their orientation, in their antenna polarization, or in their gains, among other factors. This may result in technical advantages, including an improved signal-to-noise ratio or less variation in signal reception while the self-localizing apparatus moves.

In some embodiments, a self-localizing apparatus' antennas 502a, 502b may be used to implement a multi antenna setup. A multi-antenna setup may comprise some separate electronics 504a, 504b, 506a, 506b for an individual resonant element. For example, a multi-antenna setup may comprise separate reception electronics for an antenna.

In some embodiments, self-localizing apparatuses 140a, 140b further comprise respective sensors 514a, 514b. Each sensor 514a, 514b is operationally coupled to a respective localization unit 512a, 512b. Sensors 514a, 514b may allow the corresponding self-localizing apparatus to improve its localization. In some embodiments, first localization unit 512a may communicate data related to its location (e.g., its current location estimate, its sensor 514a readings) to second localization unit 512b. This may allow second localization unit 512b to improve its location estimate.

It will be understood that the pair of self-localizing apparatuses of FIG. 7 can be used in place of a single self-localizing apparatus depicted in FIGS. 2 and 5.

Figure 8:
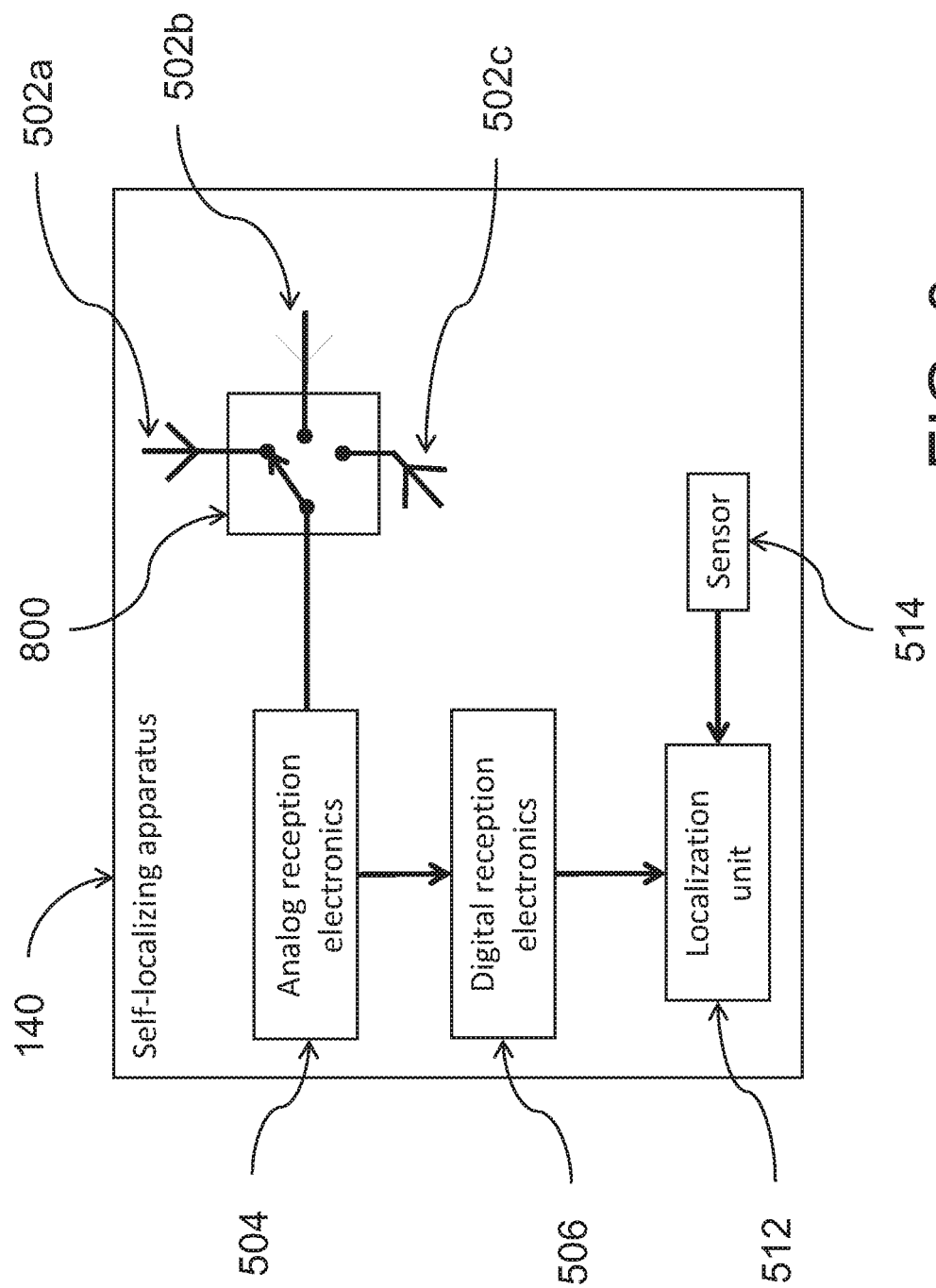
FIG. 8 is a block diagram of an illustrative self-localizing apparatus comprising multiple selectable antennas in accordance with some embodiments of the present disclosure.

FIG. 8 is a block diagram of an illustrative self-localizing apparatus 140 comprising multiple selectable antennas 502a, 502b, 502c in accordance with some embodiments of the present disclosure. Self-localizing apparatus 140 further comprises a radio frequency switch (RF switch) 800 that selects a specific one of antennas 502a, 502b, 502c for use. In some embodiments, RF switch 800 comprises a single-pole-double-throw (SPDT) or multiport (SPnT) switch. The parameters of RF switch 800 (e.g., frequency range, isolation, switching speed, etc.) may be optimized to fit the particular use case. As illustrative in FIG. 8, RF switch 800 is used as a multi-antenna setup. In some embodiments, antennas 502a, 502b, 503c may have different characteristics. For example, antennas 502a, 502b, 503c may differ in one or more of the following characteristics orientation, polarization, gains, antenna type. Localization unit 512, or other components of self-localizing apparatus 140, may control RF switch 800 to select one of the multiple antennas based on localization information. The localization information may include, for example, one or more of the position of the self-localizing apparatus, the orientation of the self-localizing apparatus, the next localization signal to be received, a quality associated with one or more antennas, the type of antenna, and any other localization information. It will be understood that in some embodiments, RF switch 800 and multiple selectable antennas 502a, 502b, 502c may be used with any other self-localizing apparatus of the present disclosure.

Figure 9:
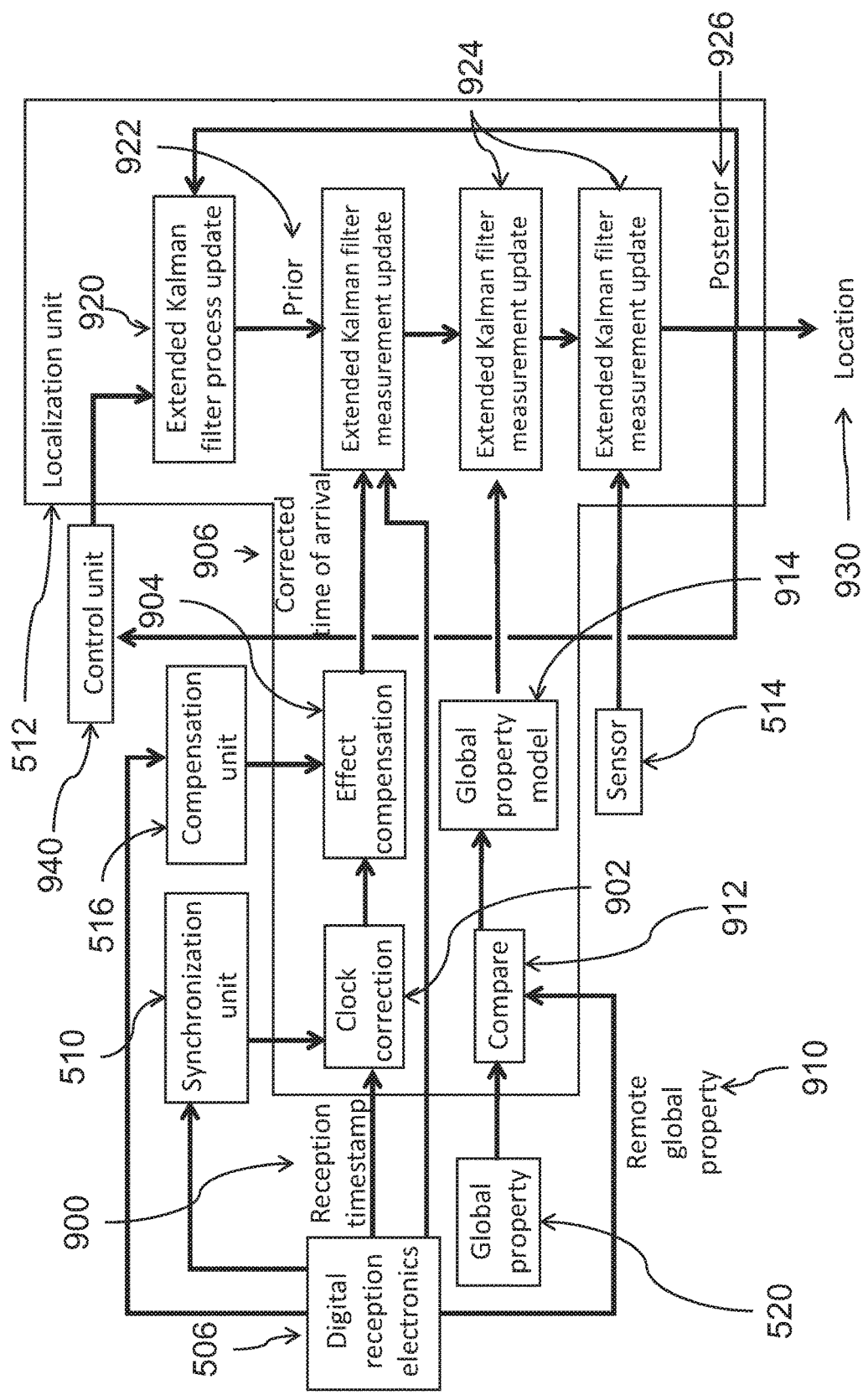
FIG. 9 is a block diagram of an illustrative localization unit, which includes a location update process, in accordance with some embodiments of the present disclosure.

FIG. 9 is a block diagram of an illustrative localization unit 512, which includes a location update process, in accordance with some embodiments of the present disclosure. The localization algorithm depicted in FIG. 9 takes the form of an extended Kalman filter (EKF). Localization unit 512 may be used with any suitable self-localizing apparatus 140 of the present disclosure. At the beginning of a cycle, localization unit 512 performs a process update step 920, where it uses the previously estimated state of the apparatus and, if available, data from control unit 940 that is indicative of the signal sent to one or more actuators. The result of this step is a prior estimate 922 (e.g., an estimate of the current state of an apparatus 140 that does not take into account any newly taken measurements). This prior estimate is then fused with available measurements. The prior estimate, measurements, and other data used by the localization unit 512 may be temporarily stored in a memory (not shown).

A first kind of measurement is the reception of a localization signal 202. In this case, timestamp 900 of the received signal is first processed by a clock correction 902 (using data from synchronization unit 510) and an effect compensation 904 (using data from compensation unit 516). The resulting corrected time of arrival 906 represents an estimate of when the localization signal reached the self-localizing apparatus antenna 212, which may then be fused with the prior estimate in an EKF measurement update step.

As stated above, the resulting corrected time of arrival 906 represents an estimate of when a localization signal 202 reached the apparatus' antenna 212. In some embodiments, transmission information is included in the payload of the received localization signal, which represents when the signal was transmitted and by which transceiver 130. The transmission information, together with the corrected time of arrival, is a measure for the distance between apparatus 140 and transceiver 130. In localization unit 512, the corrected time of arrival and the transmission information may then be fused with the prior estimate in an EKF measurement update step 924.

A second kind of measurement, if new data is available, is data representative of a local measurement of a global property (e.g., from global property sensor 520). This data is then compared to data representative of remote measurement(s) (provided by digital reception electronics 506) of that global property (e.g., from global property sensor 228) at compare 912, and a global property model 914 provides information on how this comparison relates to the location, orientation, or motion of a self-localizing apparatus 140. This information may then be fused into the state estimate in an EKF measurement update step 924. An example of a global property is the signal strength of a wireless signal. The free-space path loss of a radio frequency signal of frequency f transmitted over a distance d is:

$$FSPL(\text{dB}) = 20 \log 10(d) + 20 \log 10(f) + K,$$

with K being a constant that depends on the units used for d and f. Through this equation, the distance of the self-localizing apparatus to the source of the wireless signal may be related to the distance of the transceiver(s) 130 to the same source.

A third kind of measurement, if new data is available, is from a sensor such as sensor 514. Such a measurement may also be fused into the state estimate in an EKF measurement update step 924.

Synchronization unit's 510 estimate of the local clock behavior and compensation unit's 516 estimate of compensation values may depend on the estimated location computed by the localization unit 512. This dependence may be resolved by first using the prior location estimate to compute clock behavior and compensation values, and by then computing a new posterior location estimate 926. This dependency may also be resolved by estimating the clock behavior or clock correction, compensation values, and location in parallel, or iteratively by alternating between 1) the computation of new clock behavior or clock correction and compensation value computation using the current location estimate; and 2) location estimation using the current clock and compensation values until the computed values have substantially converged.

In some embodiments, localization unit 512 and the other components depicted in FIG. 9 may be integrated with a mobile robot. In such a configuration, control unit 940 may be configured to compute actuator commands based on the location computed by localization unit 512 for controlling the mobile robot.

Figure 10:
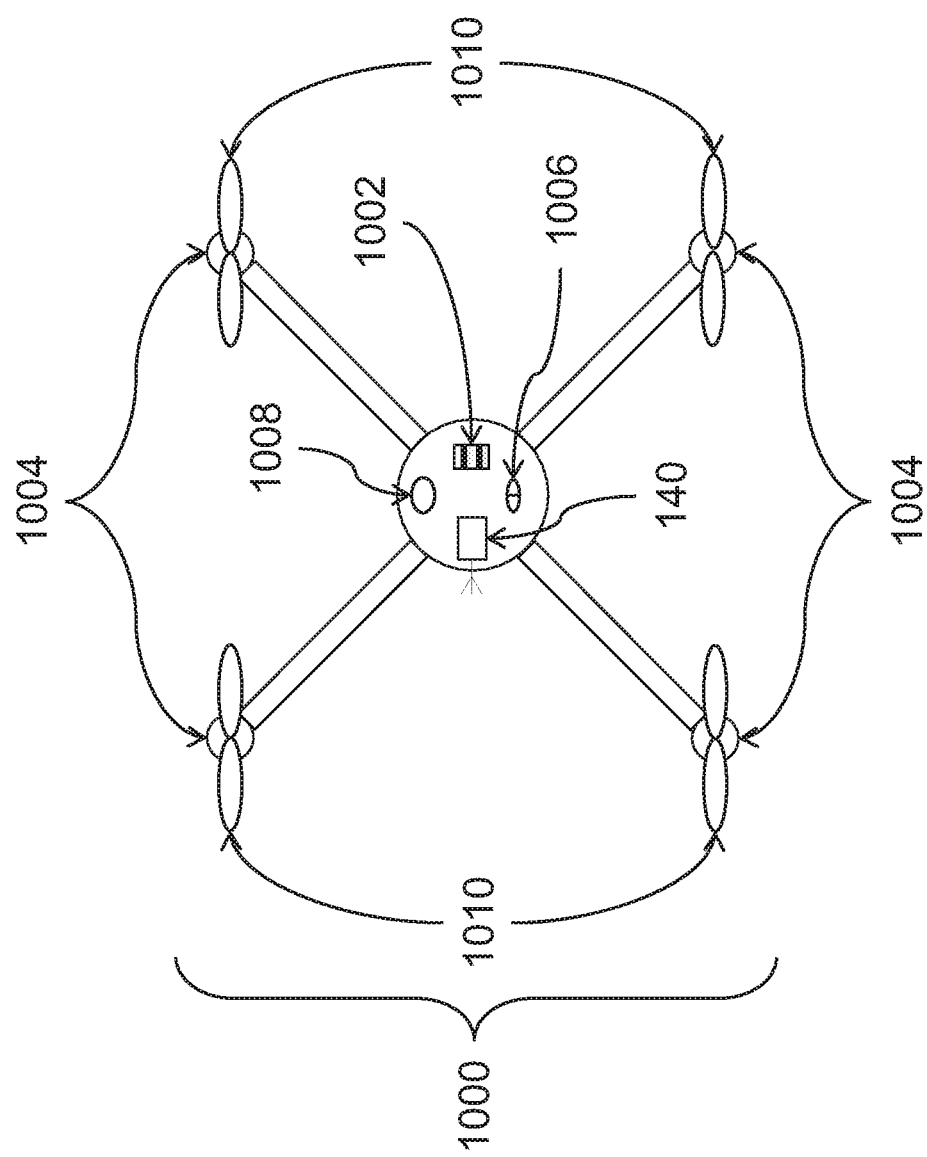
FIG. 10 shows an illustrative mobile robot including a self-localizing apparatus in accordance with some embodiments of the present disclosure.

FIG. 10 shows an illustrative mobile robot 1000 that includes a self-localizing apparatus 140 in accordance with some embodiments of the present disclosure. Mobile robot 1000 may also include one or more sensors (e.g., MEMS sensors and sensors 514). In some embodiments, mobile robot 1000 includes an accelerometer 1006 and a gyroscope 1008. In some embodiments, mobile robot 1000 additionally includes one or more of magnetometers, barometers, a GPS receiver, and proprioceptive sensors (e.g., sensors to monitor battery level and motor currents). Mobile robot 1000 as illustrated also includes actuators 1004 (e.g., four motors) that are used to rotate four propellers 1010 that allow the mobile robot to stay airborne and to control its movement through the space. In some embodiment, actuators 1004 are powered by a battery. In some embodiments, transceivers or apparatuses are powered by batteries.

Self-localizing apparatus 140 of FIG. 10 may be integrated with mobile robot's 1000 electronics (e.g., central processing electronics 1002). For example, apparatus 140 may have access to mobile robot's 1000 sensors (e.g., sensor 514, accelerometer 1006, and gyroscope 1008). This may, for example, be useful or convenient to achieve a certain weight distribution on a flying robot, to allow for better antenna reception, or to co-locate related electronic components.

Depending on the application, flight electronics may be more complex than the embodiments described here and may, e.g., comprise multiple electronic processing units, multiple antennas, or multiple self-localizing apparatuses.

Figure 11:
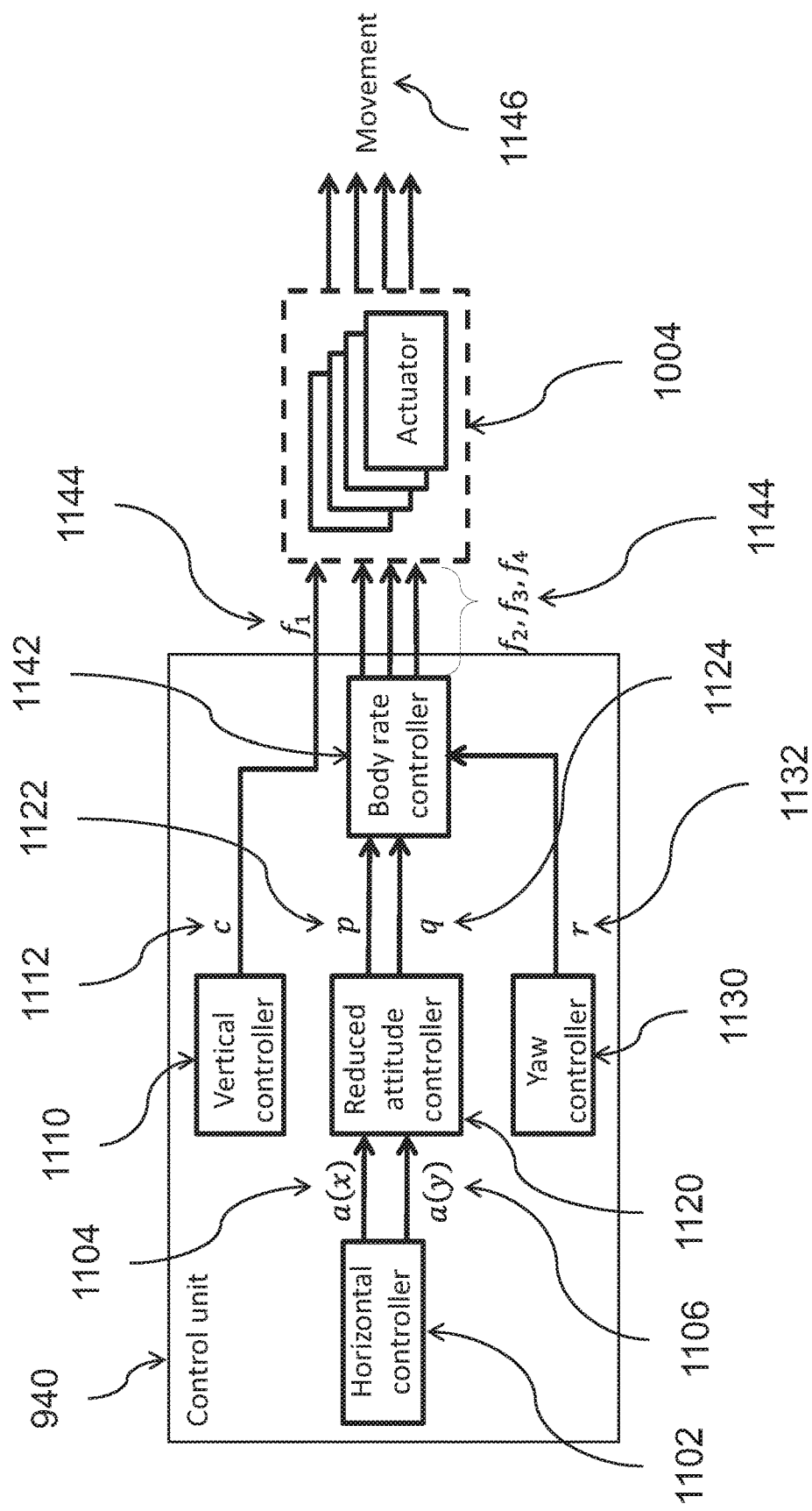
FIG. 11 is a block diagram of an illustrative control unit that may be used, for example, with the mobile robot of FIG. 10 in accordance with some embodiments of the present disclosure.

FIG. 11 is a block diagram of an illustrative control unit 940 that may be used, for example, with mobile robot 1000 of FIG. 10 in accordance with some embodiments of the present disclosure. Control unit 940 uses cascaded controllers (horizontal controller 1102, vertical controller 1110, reduced attitude controller 1120, yaw controller 1130, and body-rate controller 1142, with reference signal/feedback signal flow omitted for clarity).

The control scheme depicted in control unit 940 is used to follow desired vehicle position and yaw trajectories. The onboard control comprises four separate loops: horizontal 1102 and vertical position control 1110 loops, a reduced attitude control 1120 loop and a yaw control 1130 loop. It will be understood that the reference numerals used for controllers within control unit 940 of FIG. 11 are also used to refer to control loops associated with the controllers. The output of the four control loops are the three body rate commands to the flying mobile robot 1000 shown in FIG. 10, and the collective thrust produced by the mobile robot's four propellers 1010.

The control strategy shown in FIG. 11 is based on a cascaded loop shaping design strategy. The controller design is therefore split into the design of several controllers of lower-order dynamic systems. The vertical control loop 1110 is shaped such that it responds to altitude errors like a second-order system with collective thrust c 1112. Similarly, to the vertical control loop 1110, the two horizontal control loops 1102 are shaped to behave in the manner of a second-order system. However, no control inputs are directly calculated but commanded accelerations a(x) 1104 and a(y) 1106 are given as set points to the attitude controller 1120. The attitude controller 1120 controls the reduced attitude of the mobile robot such that commanded accelerations a(x) 1104 and a(y) 1106 are met. The commanded accelerations are then converted to commanded rotation matrix entries. Using the rotational kinematics of the mobile robot, the rate of change of the matrix entries can be used to compute the desired vehicle body rates p 1122 and q 1124. The controllers described above fully define the translational behavior of the mobile robot. The yaw controller 1130 may then be implemented as a proportional controller from the measured yaw angle to compute the desired yaw rater 1132 (e.g., as measured by a sensor 514 on the mobile robot 1000). Body-rate controller 1142 receives current body rates (measured or estimated), desired vehicle body rates p 1122, q 1124, and r 1132 and together with collective thrust c 1112 control unit 940 outputs actuator commands $f_1, f_2, f_3, f_4$ 1144 to actuators 1004 to cause movement 1146 of mobile robot 1000.

Figure 12:
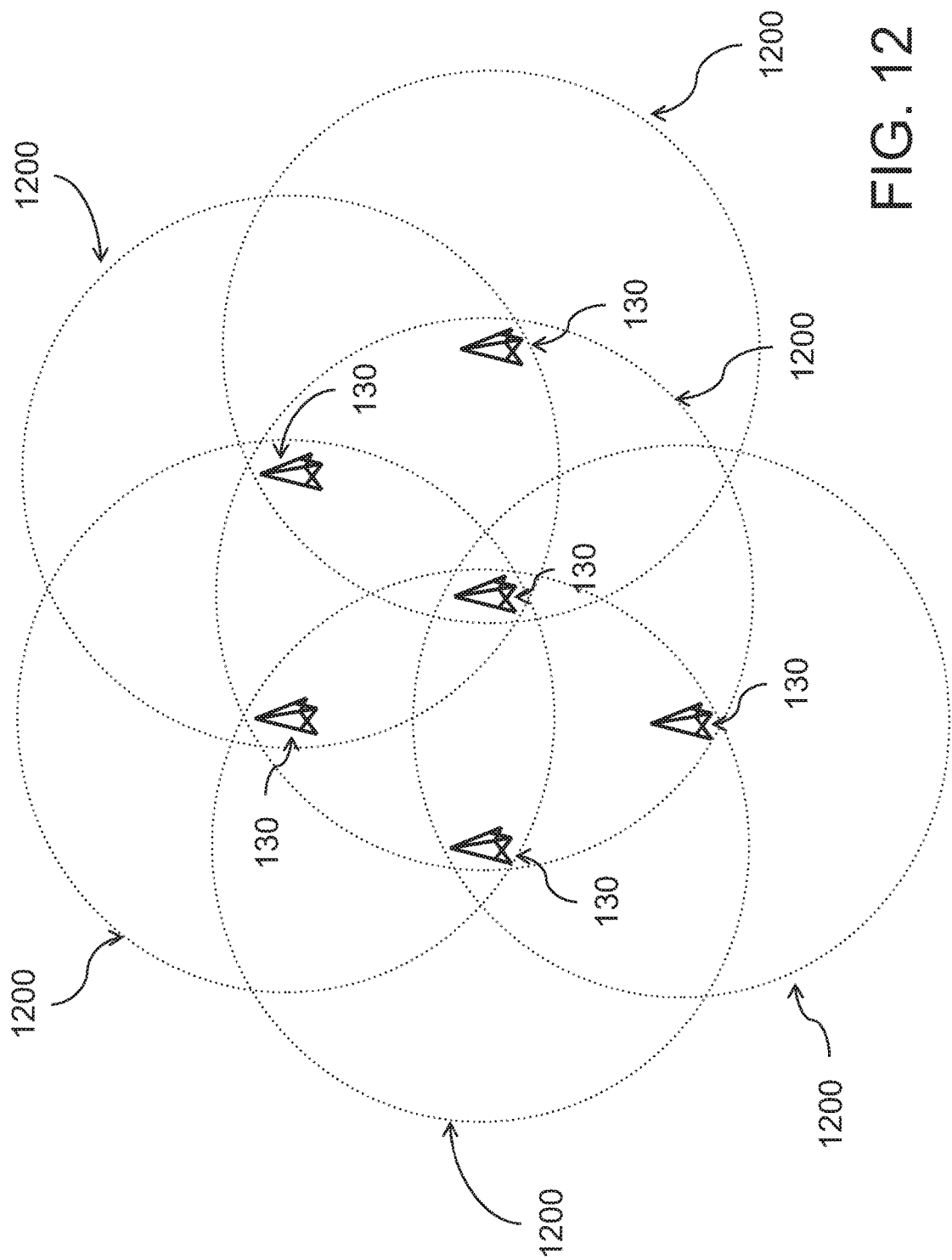
FIG. 12 shows an illustrative transceiver network with a large number of transceivers in accordance with some embodiments of the present disclosure.

FIG. 12 shows an illustrative transceiver network including multiple transceivers 130 in accordance with some embodiments of the present disclosure. Such a transceiver network may allow for the use of a self-localizing apparatus 140 in a wide geographic area by allowing for the simultaneous use of a large number of transceivers. As shown in FIG. 12, in the case where transmission ranges 1400 of two transceivers overlap, the transceivers will be referred to as "interfering", because simultaneous transmission of localization signals 202 by both transceivers may result in the localization signals 202 interfering. A transmission range may, for example, be defined as the boundary of the area where the signal strength of the transmitted signal drops below the receiver sensitivity. To avoid signal interference, the signal emissions of transceivers in a particular area are typically coordinated. In some embodiments, this may be achieved by ensuring adequate separation of signals in time (e.g., through sufficient time between the emission of two signals, e.g., using a scheduling unit), in space (e.g., through sufficient geographic separation of transceivers, by regulating the transmission power), in frequency (e.g., through sufficient separation of the localization signals' transmission carrier frequencies (center frequency) or bandwidth, e.g., using a scheduling unit), or in preamble properties (e.g., preamble code, preamble modulation).

The amount of time required for sufficient signal separation in time may depend on many factors (e.g., strength of the signal, size of a signal packet, pulse/peak shape of the signal, transceiver's antenna, receiver's antenna, the geographic location of transceivers (including their geographic separation), obstacles, background noise, etc.). Ensuring time separation of signals may mean that the duration between subsequent signals from any particular transceiver increases as the number of transceivers grows. This can be particularly problematic for dynamic autonomous mobile robots, where even relatively small reductions in update rates may result in a significant degradation in localization performance. A known method of ensuring time separation is Time Division Multiple Access (TDMA). Aloha methods may also be utilized in embodiments where occasional signal interference is acceptable, and where signal timing is unimportant.

Sufficient separation in space, related to the transmission range of each transceiver, may depend on many factors (e.g., strength of the signal, frequency of the signal, bandwidth of the signal, pulse/peak shape of the signal, transceiver's antenna, receiver's antenna, the geographic location of transceivers (including their geographic separation), obstacles, background noise, etc.). In some embodiments, typical spatial separation is 1-100 meters. In some embodiments, typical spatial separation is 10-500 meters. In some embodiments, typical spatial separation is 200-2000 m. In some embodiments, typical spatial separations are on the order of kilometers. In some embodiments, two transceivers may be co-located. In some embodiments, combinations of spatial separations are used. In FIG. 12, transmission range 1200 is graphically represented as a circle for simplicity; however, it will be apparent to one skilled in the art that transmission range 1200 may be a more complex shape. When ensuring space separation of transmissions, it may be desirable to locate transceivers 130 such that a self-localizing apparatus 140 would be capable of receiving transmissions from a predetermined number of transceivers 130 at every point within a defined geographic area. This number of transceivers 130 may depend on many factors (e.g., desired update rate, desired system robustness, time separation of the transmissions, frequency separation of the transmissions, background noise, obstacles, etc.).

Achieving sufficient separation in space may be further aided by the selection of suitable antennas. Some embodiments use directional antennas. Some embodiments use omnidirectional antennas. In some embodiments, directional antennas are used to help ensure space separation of localization signals. In some embodiments, by directing the transmissions of transceivers 130 using directional antennas, it may be possible to more accurately control which transceivers 130 transmit to which regions of a defined space and thus more accurately control the space separation of localization signals 202. In some embodiments, by directing the transmissions of transceivers 130 using directional antennas, it may be possible to achieve a longer transmission range in a desired direction. Other methods that may aid spatial separation include shielding, placement (e.g., away from noise sources), optimizing radiation patterns, and combinations of the above. In some embodiments, by equipping a self-localizing apparatus 140 with a directional antenna, orientation information can be estimated based on a comparison of which signals are received with the known locations of transceivers 130.

In some embodiments, transceivers 130 are arranged such that coverage of a desired operating area is optimized with respect to some metric. In some embodiments, a transceiver's 130 operation is optimized with respect to some metric. Suitable metrics may include the number of transceivers in range, a signal strength, update rate from a specific combination of transceivers, multipath effects, or others, including combined metrics. Transceiver arrangement may comprise a transceiver's location, a transceiver's antenna orientation, a transceiver's operating frequency, a transceiver's bandwidth, or other factors. An operating area may be a geographic area, a flight volume for a flying robot 1000, a pre-defined operating volume, or another area. Optimization may concern physical parameters (e.g., geographic placement of transceivers, antenna orientations, etc.) or operational parameters (e.g., the operation of a scheduling unit 218). In some embodiments, optimization may be performed by a scheduler. In some embodiments, an optimization may be pre-computed. In some embodiments, a schedule is created manually. In some embodiments, a schedule is created base on an optimization. For example, in some embodiments an optimal schedule may be determined by minimizing the number of transceivers per zone or per region, with the constraint that every point within a defined area be capable of receiving from, for example, at least three transceivers. For some problems such a schedule may ensure that a self-localizing apparatus is capable of localization in three-dimensions throughout a defined area, while further minimizing the TDOA cycle time within the cell (which can be proportional to the number of transceivers within the cell). As another example, in some embodiments a schedule may be computed as the solution of an optimization problem that weighs up the cost of a self-localizing apparatus changing frequency, with the cost of an increased TDOA cycle time.

Sufficient separation in transmission frequency may depend on many factors (e.g., strength of the signal, frequency of the signal, bandwidth of the signal, pulse/peak shape of the signal, transceiver's antenna, receiver's antenna, the geographic location of transceivers (including their geographic separation), obstacles, background noise, etc.). In some embodiments, it may be implemented using a scheduling unit. In some embodiments, separation is in the range of 1-50 MHz. In some embodiments, separation is in the range of 100-500 MHz. In some embodiments, separation is in the range of 200-1000 MHz. In some embodiments, overlapping transmission frequencies are used. When designing for frequency separation of signals, it may be important to consider that a self-localizing apparatus 140 may need to change its reception frequency to receive the frequency-separated localization signals 202. A known method of ensuring frequency separation is Frequency Division Multiple Access (FDMA). In some embodiments, combinations of various frequency separations are used.

In some embodiments, TDMA may be employed to ensure time separation of localization signals 202. In some embodiments, a simple approach may be employed, whereby if the transceiver network comprises N transceivers, N time slots will be allocated, one per transceiver 130. The time of cycling through all time slots is sometimes referred to as TDMA cycle time. In a case where all transceivers in a network are interfering, this allocation of N transceivers to N time slots is optimal in that it is the shortest amount of time that allows each transceiver to transmit once per cycle. Other optimization criteria, such as positioning performance or information propagation time, may be used. However, in the embodiment as illustrated in FIG. 13, where not all transceivers interfere, a different optimal TDMA allocation schedule is possible, which uses fewer than N time slots and thus decreases the TDOA cycle time, and increases the average rate at which a self-localizing apparatus 140 would receive localization signals 202.

Figure 13:
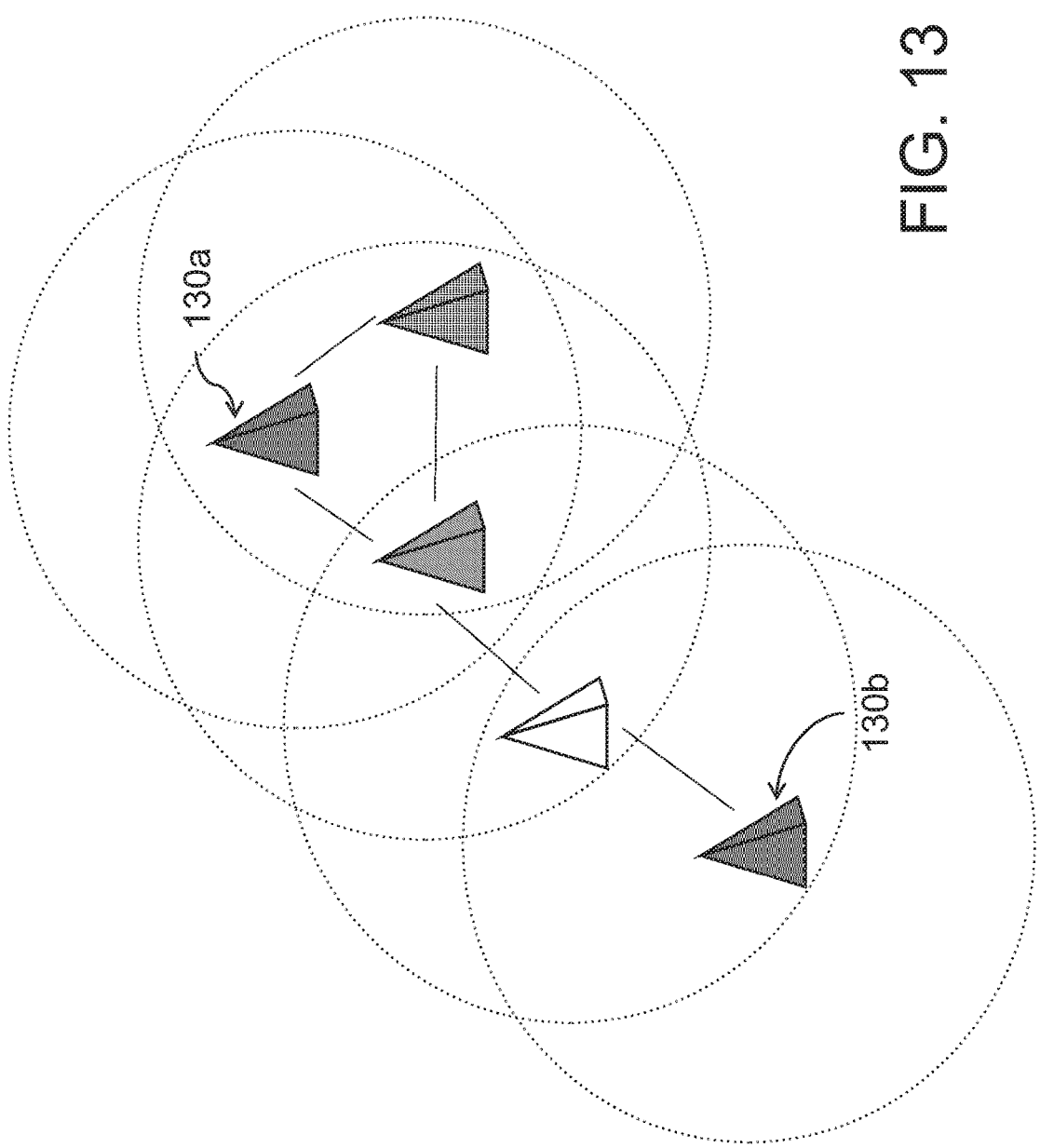
FIG. 13 shows an illustrative simplified transceiver network in accordance with some embodiments of the present disclosure.

FIG. 13 shows an illustrative simplified transceiver network in accordance with some embodiments of the present disclosure. In FIG. 13, transceivers 130a and 130b do not interfere. It will be apparent to one skilled in the art that in this case, both transceivers 130a and 130b may utilize the same TDMA timeslot, since it is not possible for a self-localizing apparatus to simultaneously receive signals from both transceivers because of their separation in space, and thus simultaneous transmissions will not interfere. This is illustrated in FIG. 13 by transceivers 130a and 130b having the same shading.

In some embodiments, a scheduling unit 218 may coordinate the scheduling of TDMA timeslots. The synchronization of multiple transceivers 130 to achieve a consistent time schedule may in some embodiments be enabled by a synchronization unit 224 or may be enabled by transceivers 130 sharing a common clock 210. In some embodiments, timeslot allocation (i.e., the schedule) may be manually determined or programmed into the transceiver's memory (e.g., memory 230). In some embodiments, the schedule may be computed autonomously by a scheduler. In some embodiments, the schedule determined by a scheduler may be transmitted by a scheduling unit controller.

In some embodiments, the scheduler (e.g., scheduler 110) may operate periodically or may be triggered by a transceiver 130 through transmission of an appropriate signal 302. In some embodiments, signal 302 is transmitted in response to an event. In some embodiments, an additional TDMA timeslot is allocated for transmission of arbitrary localization signals 202 or transceiver signals 302. In some embodiments, usage of this TDMA timeslot is coordinated by ALOHA. In some embodiments, transceivers 130 use this TDMA timeslot to alert other transceivers 130 to the occurrence of an event. In some embodiments, this timeslot is used by a scheduling unit controller to trigger switching to a new schedule.

In some embodiments, periodic or triggered reallocation allows the network to adapt the schedule such that the allocation of TDMA timeslots compensates for transceivers joining or leaving the transceiver network. The addition of a transceiver 130 to the network may, in some embodiments, be achieved by leaving one TDMA slot unallocated to allow new transceivers 130 to announce their addition to the network and trigger a redefinition of the transmission schedule (i.e., allocation of TDMA timeslots). Removal of a transceiver 130 from the network may, in some embodiments, be achieved by enabling transceivers to monitor for non-transmission of a transceiver 130 and trigger a redefinition of the transmission schedule if a transceiver 130 has not transmitted for a predetermined number of its TDMA timeslots.

In some embodiments, a TDMA time slot length less than 0.1 ms, 0.5 ms, 1 ms, 2 ms, 2.5 ms, 5 ms, 10 ms, or 50 ms is used.

In some embodiments, a transceiver 130 may include its estimated location or timing information within the payload of its localization signals 202 or transceiver signals 302. In some embodiments, a transceiver 130 is operable to receive these transmitted signals 202, 302. In some embodiments, a receiving transceiver may include a synchronization unit 224 that acts to synchronize the time schedule of the receiving transceiver with the time schedule of the transmitting transceiver, based on received timing or location information.

In some embodiments, transceivers 130 may be allocated more than one TDMA timeslot in at least one schedule, allowing them to transmit more often within one TDMA cycle. In some embodiments, allocation of multiple timeslots may, for example, be decided based on the Fisher Information added by the transceiver 130—a heuristic known to those skilled in the art, which can be calculated based on the transceiver's relative position.

In some embodiments, Frequency Division Multiple Access (FDMA) is used to mitigate transceiver interference, whereby interfering transceivers may be allocated different transmission frequencies such that they no longer interfere. In some embodiments, interfering transceivers may be allocated different preambles or pulse repetition frequencies to achieve a similar effect.

Figure 14:
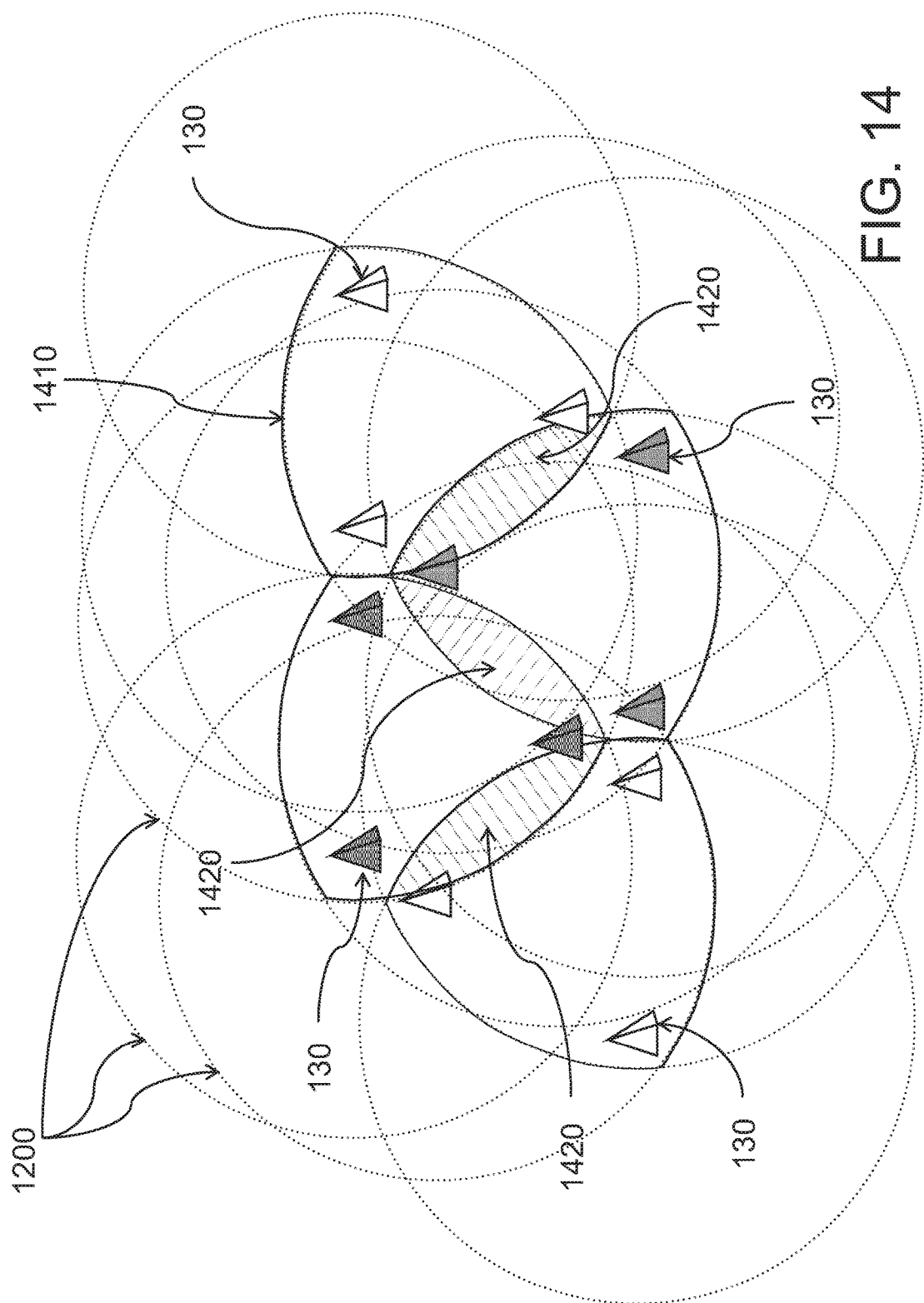
FIG. 14 shows an illustrative transceiver network having geographically adjacent cells in accordance with some embodiments of the present disclosure.

FIG. 14 shows an illustrative transceiver network where transceivers 130 are grouped into adjacent cells 1410 in accordance with some embodiments of the present disclosure. In some embodiments, adjacent cells 1410 may employ FDMA techniques to enable transceivers 130 from different cells 1410 to operate simultaneously and without significant interference in areas 1420 in which the transmissions overlap. In some embodiments, different cells 1410 may use different transmission parameters such as different transmission center frequencies, frequency bandwidths, preambles codes, preamble modulation schemes, or pulse repetition frequencies for the transmission of localization signals 202 such that the different cells 1410 can operate simultaneously and without significant interference. This may enable a self-localizing apparatus 140 to receive localization signals 202 anywhere in the network, even when moving through more than one cell during reception. Within each cell, TDMA may be used to coordinate the transmissions of individual transceivers 130.

Figure 15:
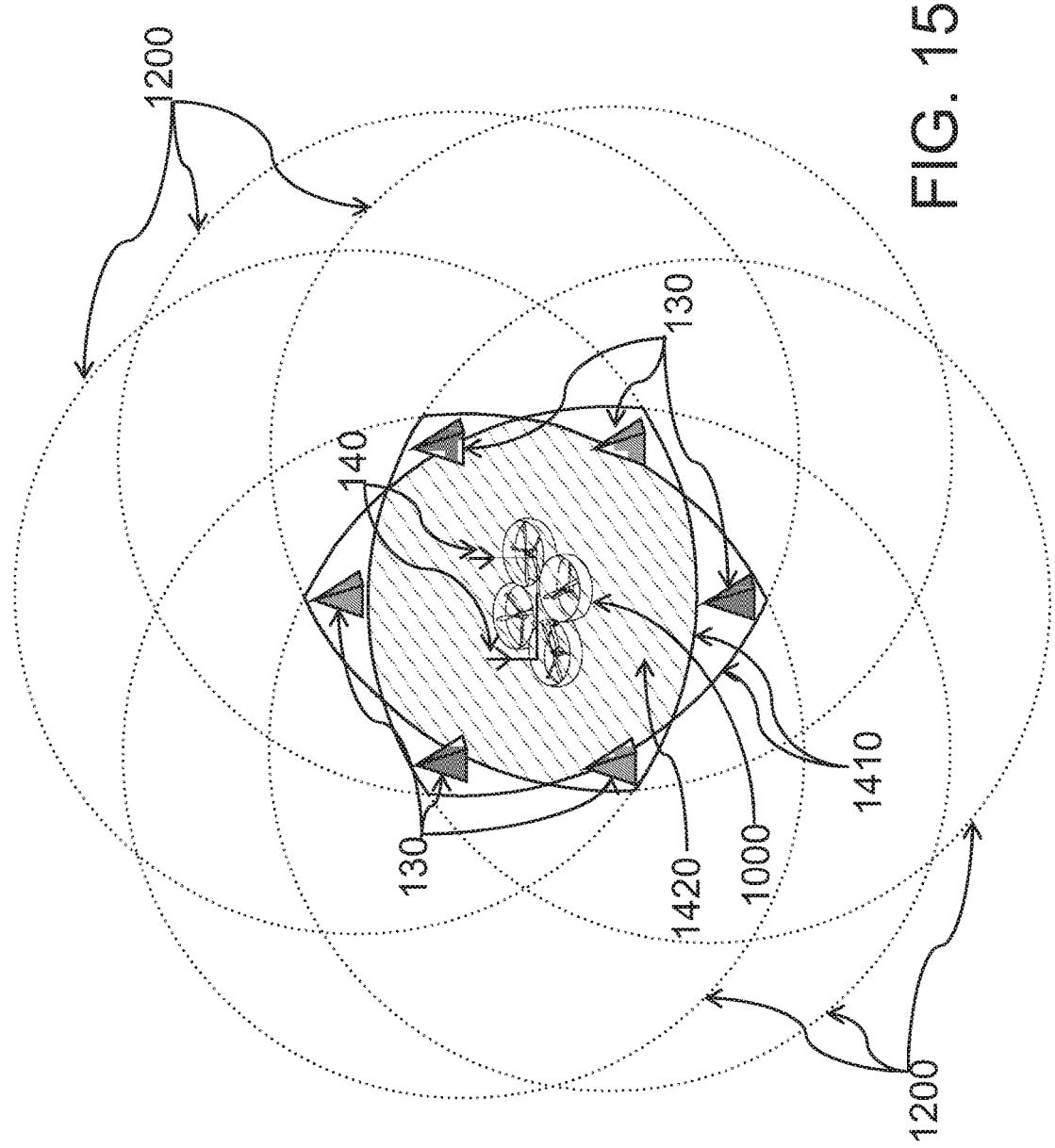
FIG. 15 shows an illustrative mobile robot operating in an area serviced by multiple transceiver cells in accordance with some embodiments of the present disclosure.

FIG. 15 shows a mobile robot 1000 operating within an area 1420 serviced by multiple transceiver cells 1410 of differing frequency in accordance with some embodiments of the present disclosure. Mobile robot 1000 comprises two self-localizing apparatuses 140, which are physically coupled to mobile robot 1000. Because mobile robot 1000 is operating in an area serviced by multiple transceiver cells 1410, multiple localization signals 202 of differing frequencies may be present in area 1420 simultaneously. In some embodiments, this means that the two self-localizing apparatuses 140 coupled to mobile robot 1000, when considered together, receive localization signals 202 at a higher rate than it would if all transceivers 130 were to transmit on the same frequency and use TDMA to coordinate their transmissions. In some embodiments, by using two self-localizing apparatuses 140, this may allow one or more localization units to update a location estimate at a higher rate. In some embodiments, a communication path (e.g., communication path 702) between two self-localizing apparatuses 140 may allow a localization unit to compute the orientation as well as the location of the body (e.g., mobile robot 1000 in FIG. 15) to which the two self-localizing apparatuses are attached. In some embodiments, having multiple self-localizing apparatuses 140 may allow one or more localization units to compute location more accurately.

Figure 16:
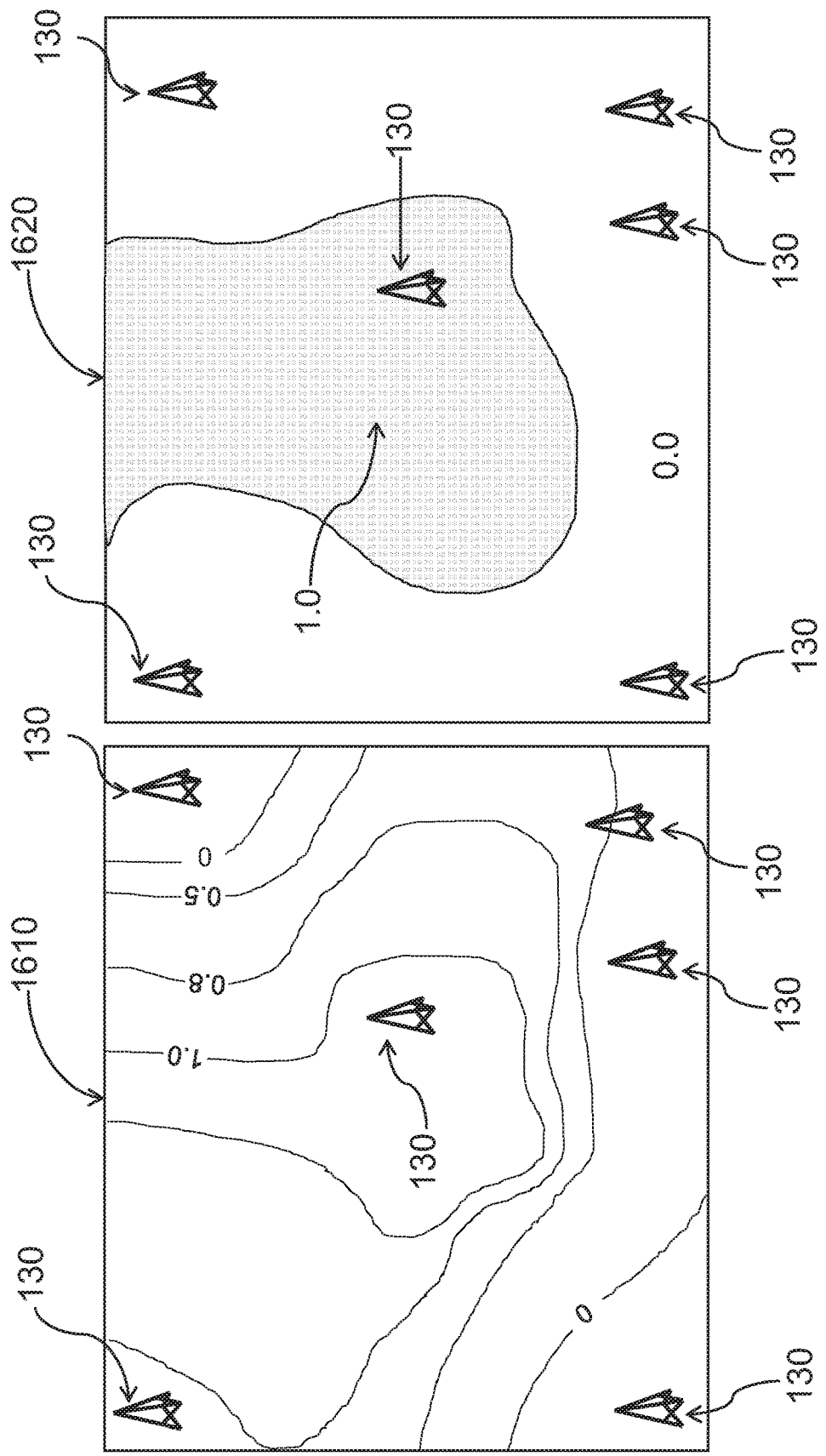
FIG. 16 shows illustrative input parameter maps that can be used for determining a schedule in accordance with some embodiments of the present disclosure.

As explained above, a scheduler such as scheduler 110 of FIG. 1 may use one or more input parameters to determine a schedule for transmitting localization signals by anchors of a localization network. In some embodiments, the inputs to scheduler 110 include the position of the anchors and user requirements such as desired positioning performance. FIG. 16 shows illustrative input parameter maps 1610 and 1620 that can be used for determining a schedule in accordance with some embodiments of the present disclosure.

Input parameter map 1610 illustrates two input parameters. The first input parameter is the position of anchors 130. As illustrated, the localization network comprises six anchors 130. The positions of anchors 130 may be identified automatically in a calibration step, or may be determined by a user when the system is installed (e.g., from a performed survey or from available drawings to which the mounting positions can be referred). The second input parameter is the desired positioning performance of the localization network. Input parameter map 1610 illustrates contour lines of the desired positioning performance. As illustrated, the desired positioning performance is reflected using a scale from 1, which reflects high performance (e.g., performance is crucially important), to 0, which reflects low performance (e.g., where no localization performance is needed). Intermediate values between 1 and 0 signify that some localization performance is required, but a varying degree of degradation is acceptable. In some embodiments, the contour lines of input parameter map 1610 reflect discrete desired performance levels. For example, the desired positioning performance may be 0 below contour line 0, 0.5 between contour lines 0 and 0.5, 0.8 between contour lines 0.5 and 0.8, 1 above contour line 1. In some embodiments, the contour lines reflect continuous values between 0 and 1. Input parameter map 1620 is similar to input parameter map 1610, but uses a binary map to reflect desired positioning performance. The binary positioning performance includes two regions—one region where localization is required (1) and another region where no localization is required (0).

In some embodiments, the desired positioning performance in maps 1610 and 1620 are determined by a user directly (e.g., according to a building plan from which regions of interest have been extracted) or it could be automatically generated (e.g., from known motion patterns of autonomous machines). It will be understood that maps 1610 and 1620 are merely illustrative and that the position of anchors 130 and the desired positioning performance may be inputted to a scheduler in any suitable form. For example, the positions of anchors 130 may be inputted using the coordinates of anchors 130 in a coordinate system. As another example, the desired positioning performance may be inputted using a function that defines the position performance. As another example, the desired positioning performance may be inputted using an array of values that define the positioning performance within a coordinate system. As another example, the desired positioning performance may be inputted using the shape or location of contour lines.

Figure 17:
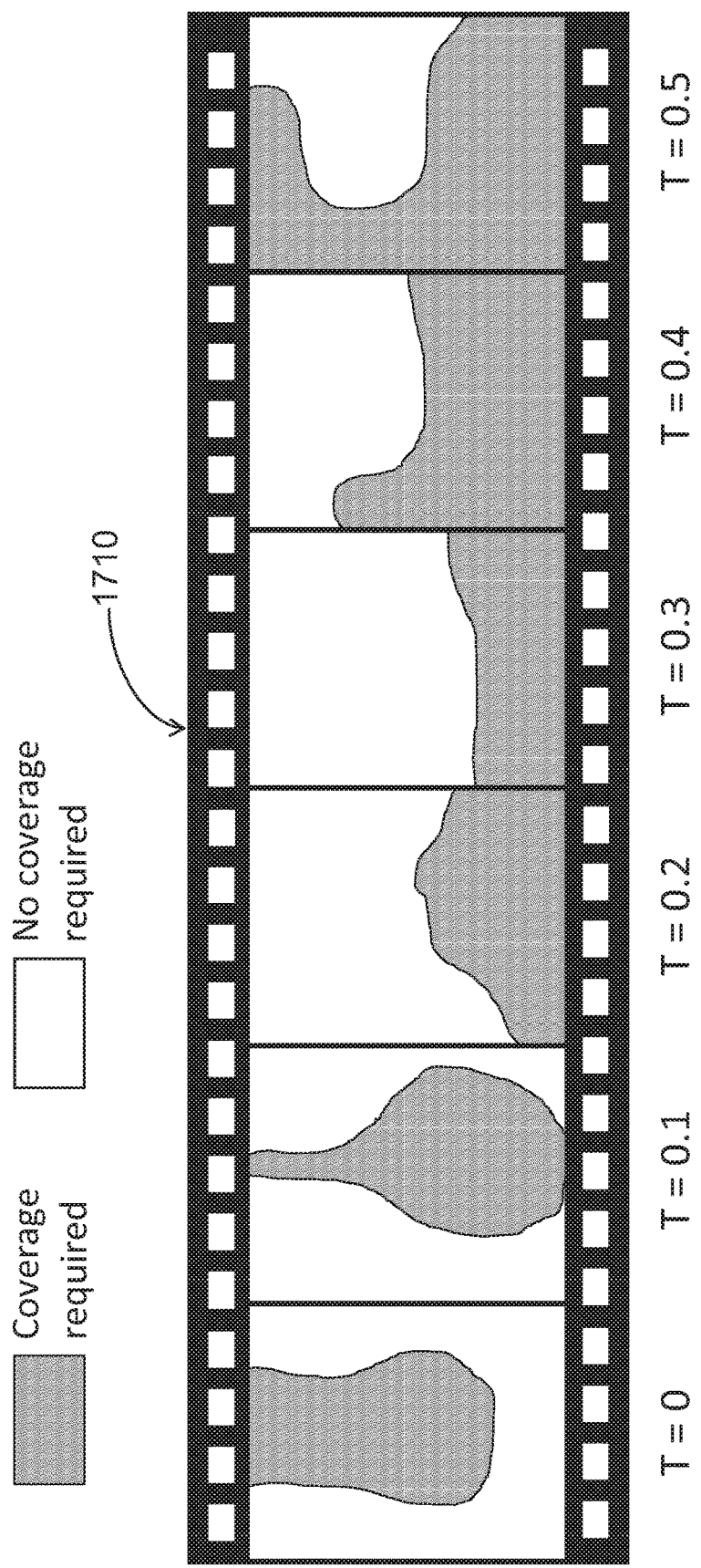
FIG. 17 shows illustrative dynamic positioning performance map used for determining a schedule in accordance with some embodiments of the present disclosure.

In some embodiments, input parameter maps are static maps that are generated upon initialization of a localization system and are not changed until a subsequent initialization or calibration of a localization system. In some embodiments, input parameter maps change over time and therefore can be dynamic. FIG. 17 shows an illustrative dynamic positioning performance map 1710 used for determining a schedule in accordance with some embodiments of the present disclosure. Map 1710 comprises a plurality of different frames that show how localization coverage requirements change over time. The shaded portion of each frame indicates the region where localization coverage is needed. The unshaded portion of each frame indicates regions where localization coverage is not needed. As illustrated, positioning performance map 1710 is a binary map. The consecutive frames of map 1710 show snapshots of a binary performance map that is parametrized in time. Such a map could be stored as a dense series of snapshots, as a sparse series of snapshots (using interpolation techniques between the snapshots), using parametric models (e.g., using periodic functions), using any other suitable, or using any other suitable technique. It will be understood that the binary nature of positioning performance map 1710 this is merely illustrative and that map 1710 may also be implemented using continuous values or using multiple discrete performance levels.

Figure 18:
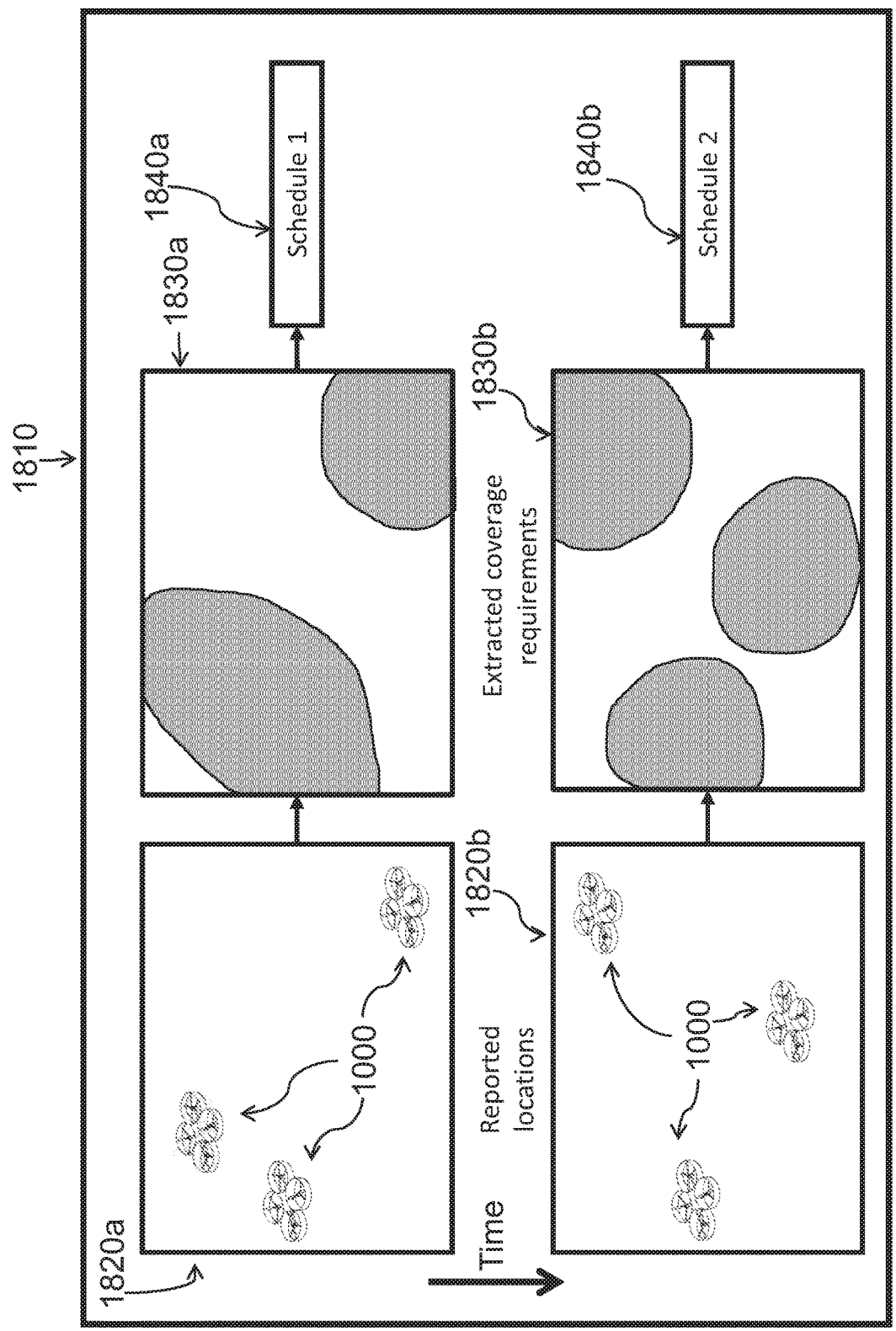
FIG. 18 shows an illustrative example of how a schedule can be adjusted in accordance with some embodiments of the present disclosure.

FIG. 18 shows an illustrative example of how a schedule can be adjusted in accordance with some embodiments of the present disclosure. In some embodiments, the schedule can be adjusted in real-time based on localization requirements. As shown in the top left portion of panel 1810, location map 1820a shows the location of three mobile robots 1000 within a coordinate system. Each of mobile robots 1000 may include one or more self-localization apparatuses 140 and be configured to transmit its location back to the localization network. For example, mobile robots 1000 may be configured to wireless transmit (e.g., via antenna 502 of a self-localizing apparatus 140) their locations back to one or more anchors of the localization network. Mobile robots 1000 may also transmit additional information to the localization network such as their current velocities or planned motions. From this information, coverage requirement map 1830a can be extracted. In some embodiments, a scheduler such as scheduler 110 may receive the information from mobile robots 1000 and generate coverage requirement map 1830a. In some embodiments, coverage requirement map 1830a can be generated by requiring coverage for a fixed radius surrounding the current position of each mobile robot 1000 and also for a fixed radius around the planned motion paths of the mobile robots.

Coverage requirement map 1830a can be used by the scheduler to compute an appropriate schedule 1840a for the given requirements. Depending on the trade-off between positioning performance and computational complexity, the scheduler may select the most appropriate among a series of pre-computed and stored schedules, or it may compute a new, optimized, schedule based on requirement map 1830a. Information regarding schedule 1840a may be transmitted to one or more control units of the localization network for controlling the transmission of localization signals from the anchors of the network.

In some embodiments, the scheduler transmits information about the schedule 1840a to a scheduling unit controller, which in turn transmits a signal to the anchors which then causes the anchors to transmit according to the schedule. When schedule 1840a is pre-computed schedule, the scheduling unit controller may only send a signal indicative of which schedule to use (e.g., "use schedule nr. 3"). When schedule 1840a is a newly computed schedule, the scheduling unit controller may transmit the new schedule to the anchors and then signal the change of schedule once the anchors have received it.

The process described may be repeated at a later time to adjust the schedule in real-time. As shown in the bottom portion of panel 1810, the locations of mobile robots 1000 have changed in location map 1820b. The new locations depicted in location map 1820b may be used to generate a new coverage requirement map 1830b, which in turn can be used to determine schedule 1840b. Schedule 1840b can then be used to control the transmission of localization signals from the anchors of the network as described above.

Figure 19:
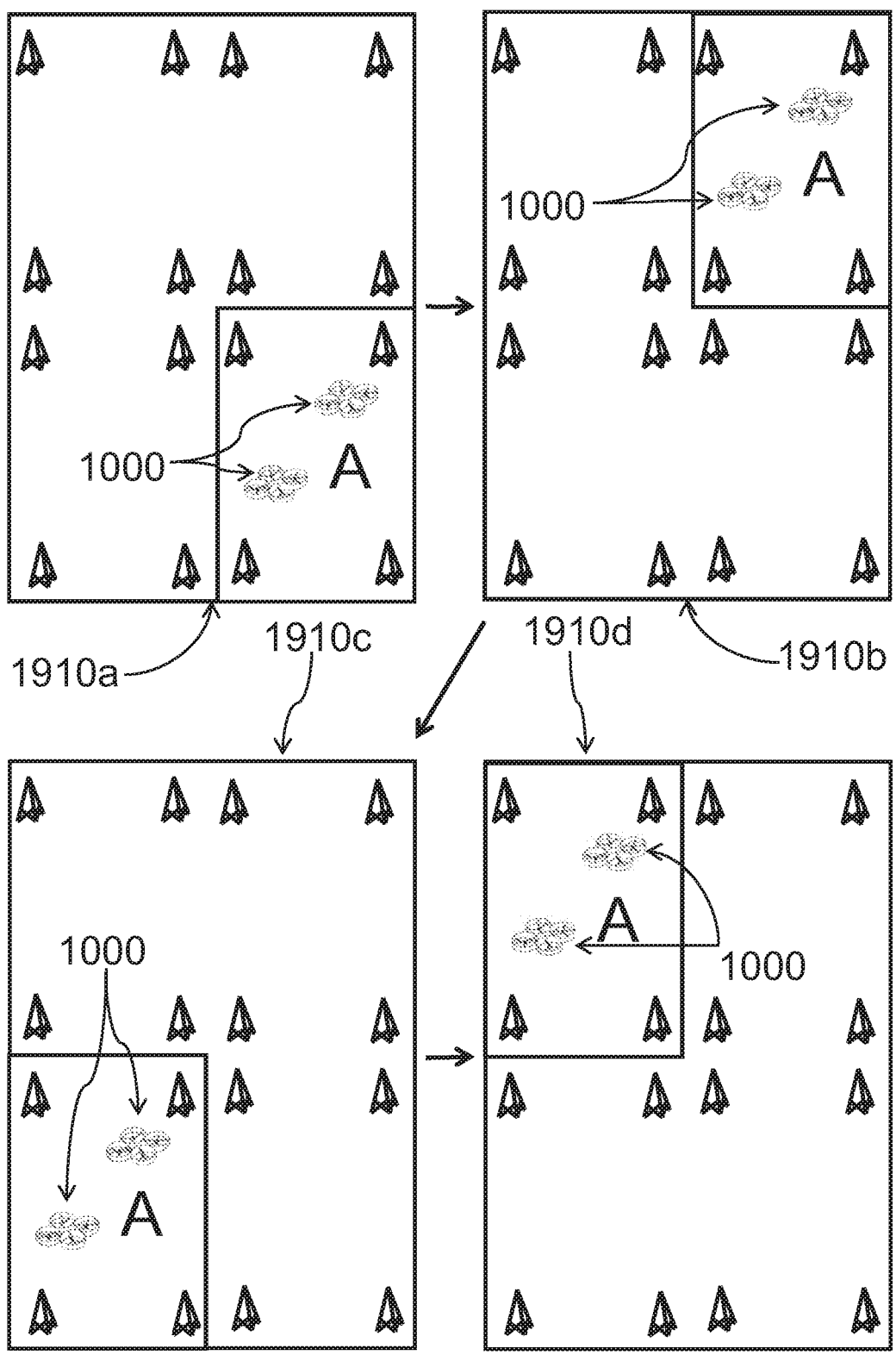
FIG. 19 shows another illustrative example of how a schedule can be adjusted in accordance with some embodiments of the present disclosure.

FIG. 19 shows another illustrative example of how a schedule can be adjusted in accordance with some embodiments of the present disclosure. In this example, a group of mobile robots 1000 is moving in a relatively large space according to a predefined set of trajectories and a set of anchors is distributed among the entire space. Location maps 1910a, 1910b, 1910c, and 1910d show the locations of the mobile robots 1000 as they move along the predefined set of trajectories. Specifically, the group starts in the lower-right quadrant and then moves counter-clockwise through the four quadrants. To improve the positioning performance of the localization network, one may want to use only a subset of the anchors that are in close proximity to the group of mobile robots 1000 and configure the other anchors to not transmit. In location map 1810a, because mobile robots 1000 are located in the bottom right quadrant, it may be desirable to not use anchors in the top-left quadrant. For example, these anchors may be too far away from mobile robots 1000 for their signals to be successfully received. It may also be desirable to have mobile robots 1000 receive localization signals at a relatively high rate and not using anchors that are far away may increase the rate at which localization signals could otherwise be received by mobile robots 1000.

Accordingly, in some embodiments, the schedule may be adjusted so that only anchors located within region A are used to transmit localization signals. In other embodiments, the schedule may be adjusted so that a subset of anchors is used to only provide localization capability in region A. As shown in FIG. 19, as the location of the group of mobile robots 1000 changes over time, region A follows them through the four quadrants. As a result of these schedule changes, the area where the mobile robots can localize themselves (region A) moves over time. The adjustment to the schedule can be achieved in several ways. In one case, the transmission schedule could be changed periodically based on the position of the group of mobile robots 1000. This could be done in an open loop fashion, assuming that a centralized unit knows the target position of the mobile robots, or in a closed loop fashion based on position information provided by the mobile robots. Thus, different schedules can be used over time. In another potentially more sophisticated example, the adjustments can be accomplished using a single long schedule that is synchronized with the movement of the mobile robots (e.g., the schedule can be started when the mobile robots start moving or a certain amount of seconds before) and has a duration which is at least as long as the duration of the mobile robot trajectories.

Figure 20:
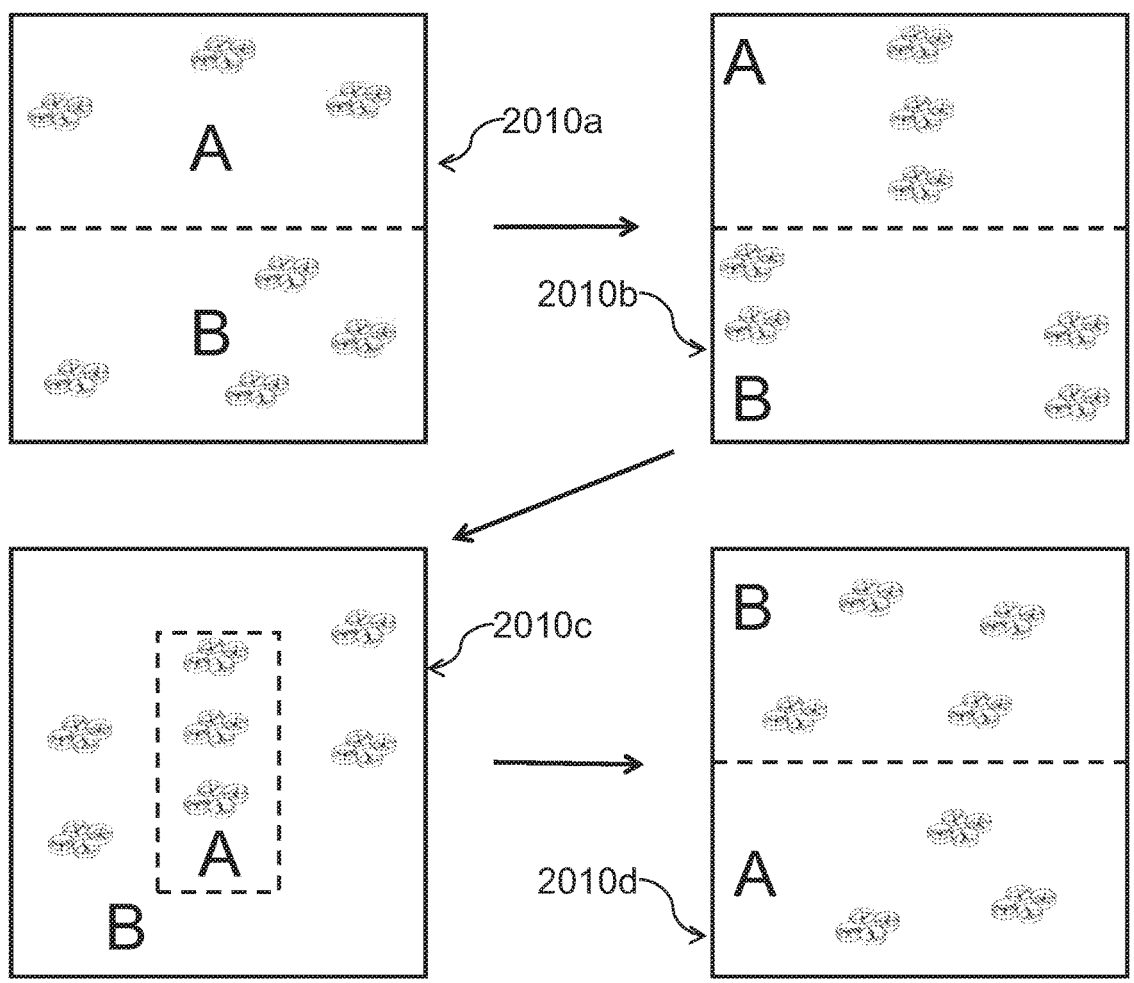
FIG. 20 shows an illustrative example of how a schedule can be adjusted for two groups of mobile robots in accordance with some embodiments of the present disclosure.

While FIG. 19 shows adjusting a schedule based on the location of one group of mobile robots, a schedule can also be adjusted based on two or more groups of mobile robots. FIG. 20 shows an illustrative example of how a schedule can be adjusted for two groups of mobile robots in accordance with some embodiments of the present disclosure. In this case, the mobile robots are organized in two different groups which move according to different sets of trajectories.

This presents a technical problem of how to configure the schedule to accommodate and optimize the transmission of localization signals. In some embodiments, it may be convenient to organize the anchors of the localization network in two clusters and define the schedule in such a way that the mobile robots of the first and second groups can localize and receive data from the anchors (e.g., commands) independently. This can be achieved, for example, by using two different carrier frequencies for the two clusters or by setting the transmission power in such a way that the transmission of the anchors allocated to the first group of mobile robots does not interfere with the transmission of the anchors dedicated to the second group of mobile vehicles.

As shown in location map 2010*a*, a first group of mobile robots starts from the top of the space, within cluster A, while a second group starts from the bottom, within cluster B. The schedule may cause a first group of anchors, cluster A, to cover the area occupied by the first group of mobile robots and a second group of anchors, cluster B, to cover the area occupied by the second group of mobile robots.

As part of the target trajectories, the mobile robots of the first group converge toward the center of the top part of the space while the mobile robots of the second group split and move to the sides of the bottom part. This is illustrated in location map 2010*b*. These movements, for example, do not require an update of the transmission schedule.

Next, the target trajectories may cause the mobile robots of the first group to move toward the bottom part, while the mobile robots of the second group move toward the upper part. This is illustrated in location map 2010*c*. To perform these maneuvers, the transmission schedule is updated to change the set of anchors that belong to cluster A and the set of anchors that belong to cluster B. This creates a central aisle for the mobile robots of the first group and two lateral corridors for the mobile robots of the second group. It is noted that in some cases the region of space covered by cluster B could overlap with the region of space covered by cluster A.

Finally, the target trajectories may cause the mobile robots of the first group to spread out within the bottom part of the space and the mobile robots of the second group to spread out within the upper part. This is illustrated in location map 2010*d*. This is achieved once again by reallocating the anchors among the two clusters.

The concept presented with this use case is that clusters can move together with the groups of mobile robots to provide the desired positioning performance in the region of space occupied by the respective groups of mobile robots.

It will be understood that while FIGS. 18-20 were described in the context of being used for localization of a mobile robot 1000, FIGS. 18-20 can be used with any other suitable objects such as vehicles, people, or any other objects that comprises a self-localizing apparatus for receiving localization signals. In some embodiments, FIGS. 18-20 can be used with any of the embodiments of transceivers 130 and self-localizing apparatus 140 described herein.

Figure 21:
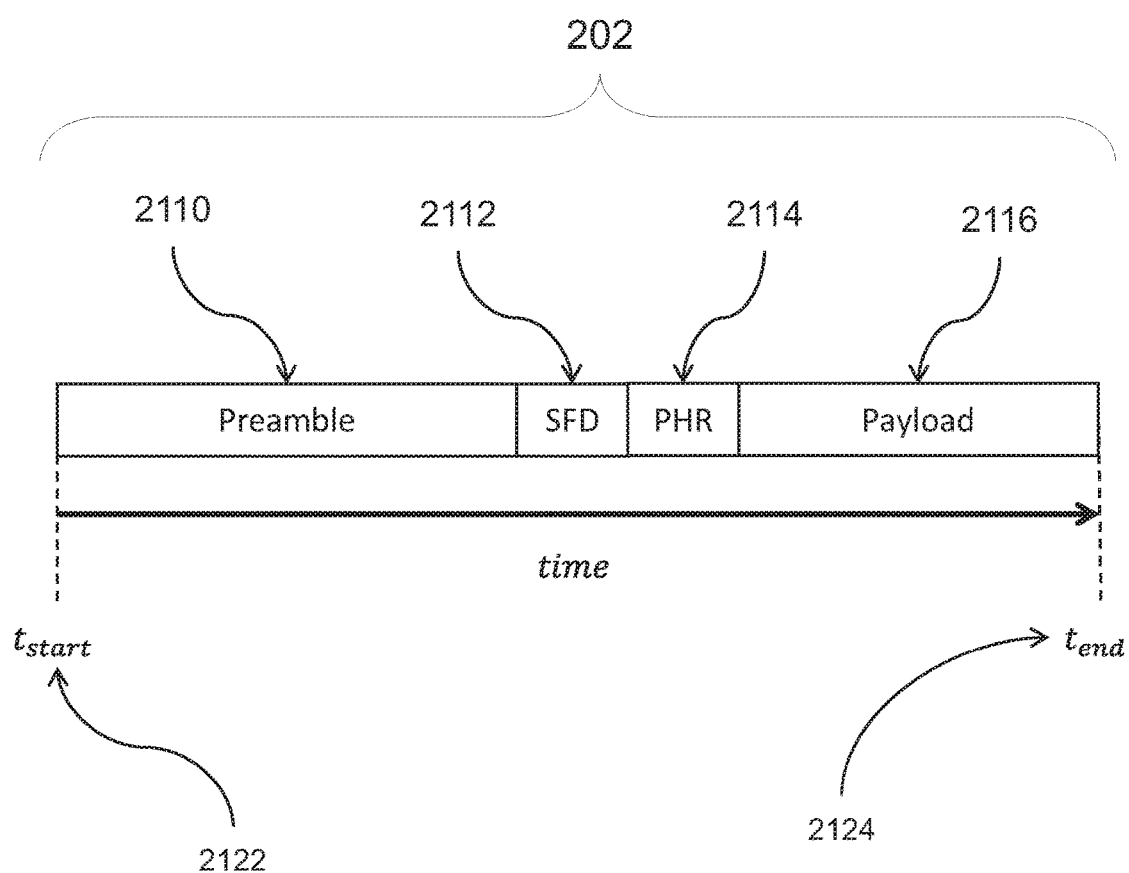
FIG. 21 is a diagram of an illustrative structure of a localization signal in accordance with some embodiments of the present disclosure.

FIG. 21 is a diagram of an illustrative structure of a localization signal 202 in accordance with some embodiments of the present disclosure. In some embodiments, the structure of localization signal 202 is similar to that defined in IEEE standard 802.15.4. The same standard describes other aspects of localization systems, such as the signal transmission process. The transmission of a localization signal 202 begins at time $t_{start}$ 2122 with the transmission of a preamble sequence 2110. This sequence is typically predefined and known to both the transmitter (e.g., a transceiver 130) and receiver (e.g., a self-localizing apparatus 140) of localization signal 202. In some embodiments, a preamble sequence 2110 may be stored in memory. In some embodiments, a preamble sequence 2110 may be configurable during system operation. In some embodiments, a preamble sequence 2110 may be encoded by the interconnection of digital or analog electronic components.

In some embodiments, preamble 2110 defines a sequence in which radio pulses (e.g., UWB radio pulses) are transmitted on a specific transmission channel and with a specific rate. This rate may sometimes be referred to as the pulse repetition frequency. The pulse repetition frequency is typically known to both the transmitter and receiver of a localization signal 202. In some embodiments, the pulse repetition frequency may be stored in memory. In some embodiments, the pulse repetition frequency may be configurable during system operation. In some embodiments, the pulse repetition frequency may be encoded by the interconnection of digital or analog components.

A receiver is typically capable of receiving a localization signal (e.g., an UWB signal) if it is configured to operate on the transmission center frequency, with the same transmission frequency bandwidth, with the same preamble code, and the same preamble modulation scheme (e.g., frequency shift or phase shift). In some embodiments, this may be achieved through appropriate configuration of the receiver's analog reception electronics (e.g., analog reception electronics 504) or digital reception electronics (e.g., digital reception electronics 506) or of the transmitter's analog transmission electronics (e.g., transmitter's analog transmission electronics 214) or digital transmission electronics (e.g., digital transmission electronics 216). In some embodiments, appropriate selection of channel or preamble 2110 or pulse repetition frequency may enable receivers to receive UWB signals from a specific subset of transmitters. In some embodiments, appropriate selection of channel or preamble 2110 or pulse repetition frequency may enable transmitters to transmit UWB signals to a specific subset of receivers. In some embodiments, appropriate selection of channel or preamble 2110 or pulse repetition frequency may allow multiple localization signals to be transmitted simultaneously, with reduced interference or with no interference.

After transmission of the preamble 2110, the transmitter transmits a start frame delimiter 2112, to indicate the beginning of the signal's data portion. After transmission of the start frame delimiter 2112, the transmitter transmits a physical-layer header (PHR) 2114, containing information pertaining to the encoding of the signal's payload 2116 (e.g., data rate). After transmission of physical header 2114, the signal's payload 2116 is transmitted. In some embodiments, the payload is empty. In some embodiments, the payload contains information from a global property sensor 228. In some embodiments, the payload 2116 contains information to facilitate synchronization by a synchronization unit (e.g., a synchronization unit 510). In some embodiments, payload 2116 contains information to enable the scheduling of future transmissions by a scheduling unit (e.g., scheduling unit 218). In some embodiments, payload 2116 contains information to enable the self-localizing apparatus to receive future transmissions (e.g., announcements of future signal transmissions that may include the transmission time, the transmission channel, the transmission preamble code, or the transmission pulse repetition frequency). In some embodiments, payload 2116 contains information pertaining to prior transmitted or received signals (e.g., signals 202 or 302). In some embodiments, payload 2116 contains other information. In some embodiments, payload 2116 may contain multiple pieces of information. In some embodiments, payload 2116 contains error-checking information that may be used to evaluate the integrity of the received payload 2116. Transmission of signal ends at time $t_{end}$ 2124 after transmission of the payload 2116.

Through the detection and reception of a localization signal's preamble 2110, a receiver is able to detect the transmission of a start frame delimiter (SFD) 2112. In some embodiments, the time at which the start frame delimiter 2112 is detected is time stamped by the receiver's digital reception electronics (e.g., digital reception electronics 506). After detection of the start frame delimiter 2112, the receiver is able to detect the physical header 2114. Information encoded in physical header 2114 may be used by the receiver to decode information encoded in the signal's payload 2116.

In some embodiments, payload 2116 may be checked for errors. In some embodiments, payload 2116 may be used within other units of the receiver. In some embodiments, payload 2116 may be used to calculate a time difference. In some embodiments, payload 2116 may be used to calculate a distance. In some embodiments, payload 2116 may be compared with a measurement from the receiver's global property sensor (e.g., global property sensor 520). In some embodiments, the payload may be stored in a memory (e.g., memory 230, 516).

As will be apparent to one skilled in the art, while the present embodiments disclose a specific signal's structure similar to that defined in IEEE standard 802.15.4, many other signal structures are equally valid and may be used with the present disclosure.

Figure 22:
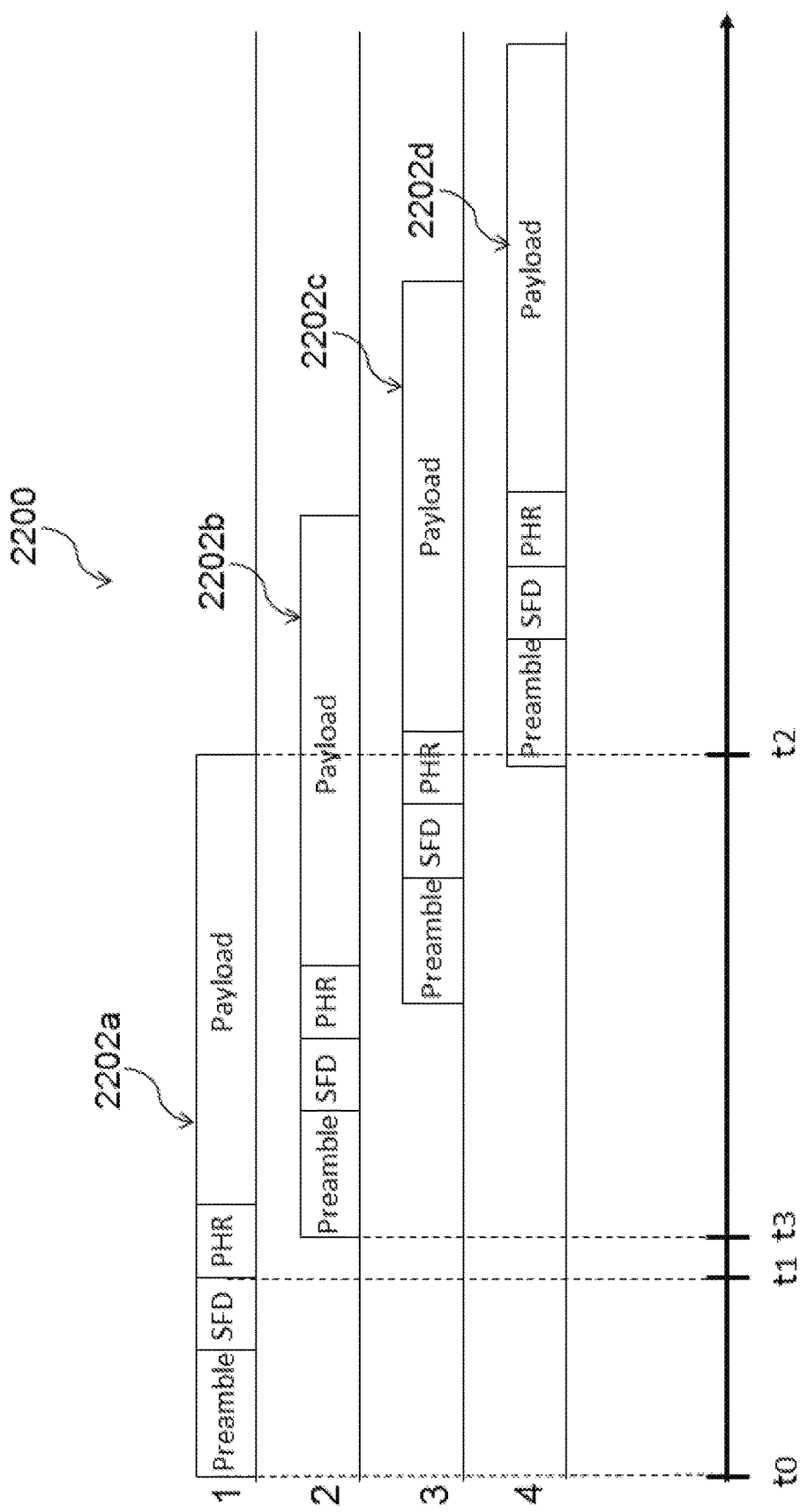
FIG. 22 shows an illustrative transmission schedule that may be used to achieve a higher localization update rate in accordance with some embodiments of the present disclosure.

FIG. 22 shows an illustrative transmission schedule 2200 that may be used to achieve a higher localization update in accordance with some embodiments of the present disclosure. Transmission schedule 2200 may be used, for example, where it is not crucial for a self-localizing apparatus to receive every transmitted data payload. Transmission schedule 2200 is depicted in the form of a plot with time on the x-axis and transceiver number on the y-axis. As illustrated, transmission schedule 2200 is determined such that transceiver 1 begins the transmission of the preamble of localization signal 2202a at time t0. The transmission duration of signal 2202a from transceiver 1 is T, and thus the transmission will be completed at t2=t0+T. The preamble and SFD of signal 2202a are transmitted during a first duration T'. Therefore, a self-localizing apparatus is capable of time-stamping the reception time of signal at time t1=t0+T'.

At time t3, the transmission of localization signal 2202b from transceiver 2 is scheduled. In a conventional schedule, one would choose t3>t2, such that a self-localizing apparatus is capable of completely receiving the signal from transceiver 1 before a second localization signal is transmitted. However, in this example, t3 is purposely chosen such that t0 <t3<t2 (i.e., the transmission of signal 2202b from transceiver 2 begins after transceiver 1 starts its transmission, but before it completes it). In some embodiments, the transmission will be scheduled such that t1<t3<t2.

Schedule 2200 allows a self-localizing apparatus receiving the signals of the localization system to select, around time t1 or a priori, whether it is more beneficial for its performance to (1) receive signal 2202a from transceiver 1 in full by keeping its reception electronics tuned into signal 2202a for the entire duration T or (2) only timestamp the signal from receiver 1 but ignore its payload, and instead also timestamp signal 2202b from receiver 2 by tuning into the signal from transceiver 1 for a duration of T', and then aborting the reception and tuning into signal 2202b from transceiver 2.

Schedule 2200 shows two additional signal transmissions 2202c, 2202d from respective transceivers 3, 4, where a receiving self-localizing apparatus can make a similar choice for reception.

To enable the self-localizing apparatus to selectively timestamp signals without receiving the signals in their entireties, the analog reception electronics or the digital reception electronics in the self-localizing apparatus must be operable to receive a signal through which the reception of a signal from the antenna can be limited to the timestamping of the preamble and SFD portion. In some embodiments, the digital reception electronics provide a signal when the timestamping has been completed to an interface to stop an ongoing signal reception; the signal and the interface can then be used in conjunction to stop the reception of a signal after the timestamping has been completed. In some embodiments, the digital reception electronics provide an interface where they can be configured to automatically stop a reception once the timestamping has been completed.

Figure 23:
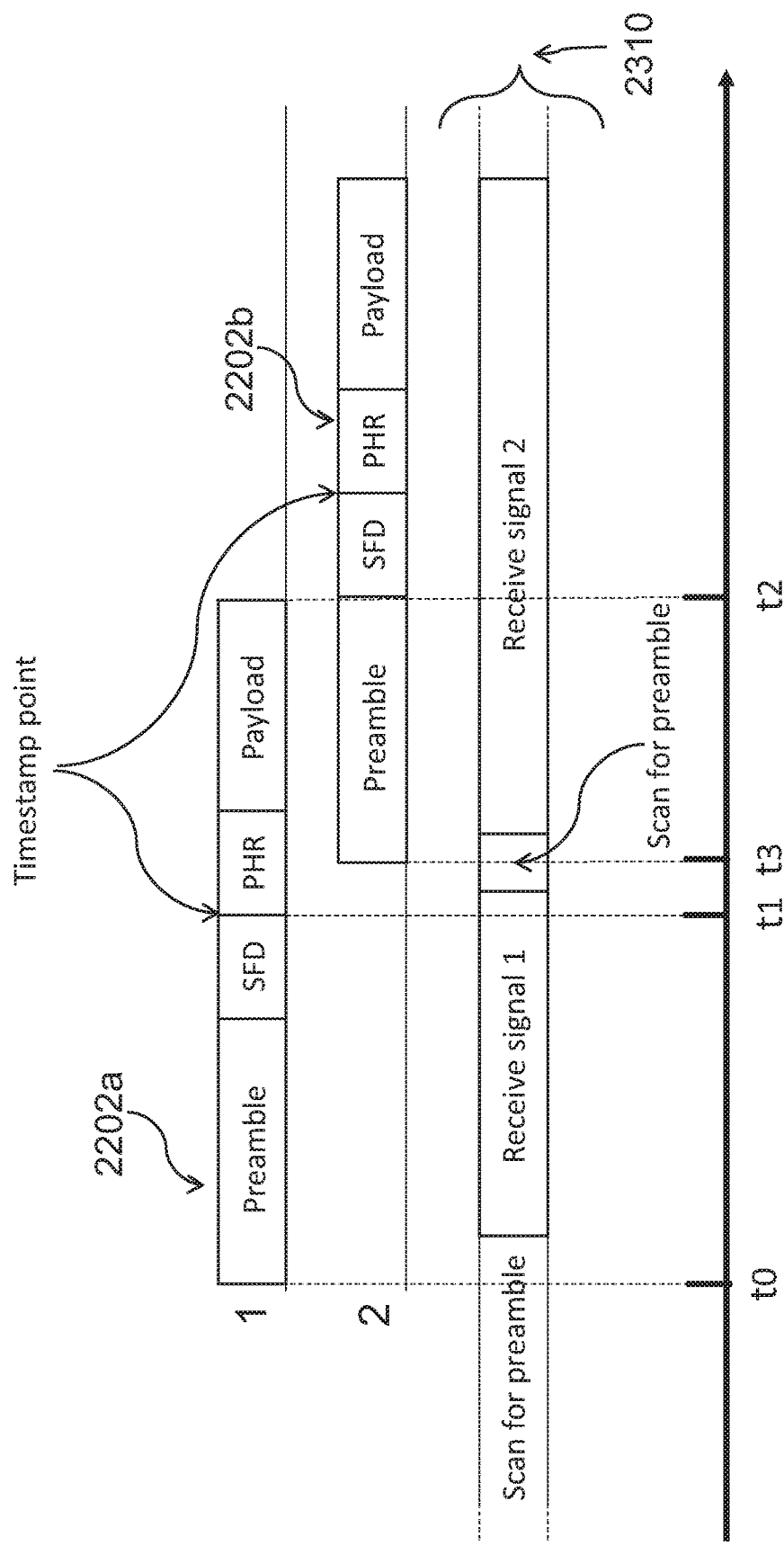
FIG. 23 shows a portion of the illustrative transmission schedule of FIG. 22 and corresponding receiver activity in accordance with some embodiments of the present disclosure.

FIG. 23 shows a portion of the illustrative transmission schedule of FIG. 22 and corresponding receiver activity 2310 in accordance with some embodiments of the present disclosure. FIG. 23 illustrates further details of the operation of a receiver of a self-localizing apparatus when localization signals are scheduled to partially overlap. Specially, FIG. 23 shows the two partially overlapping localization signals 2202a, 2202b of FIG. 22. Corresponding illustrative receiver activity 2310 is shown beneath localization signals 2202a, 2202b.

Before time t0, the receiver is scanning for a preamble. Shortly after the start of the preamble transmission from the first transceiver at time t0, the receiver begins to lock into the preamble sequence of localization signal 2202a. After the transmission of the preamble and the SFD has been completed, the receiver (e.g., digital reception electronics) has timestamped the reception of the localization signal 2202a. At this point, the receiver stops receiving the signal from transceiver 1 and begins scanning for a new preamble. Shortly after transmitter 2 begins to transmit the preamble of localization signal 2202b at time t3, the receiver locks into the preamble sequence. The receiver then stays locked into localization signal 2202b to receive the entirety of the signal from transceiver 2, to generate a reception timestamp as well as receive the data payload of that signal.

In some embodiments, the self-localizing apparatus includes decision logic that determines whether it is more beneficial to receive a localization signal in its entirety or to only receive the portion that is required for timestamping. This decision may, for example, be based on a required minimum payload reception frequency, on a list of localization anchors from which the payload must be received (while others may only be timestamped), or logic that monitors whether sufficient information is available to interpret signals that are only timestamped (such as which anchors they are transmitted by, at what times they are transmitted, etc.).

In some embodiments, the self-localizing apparatus includes a scheduling unit that configures the receiver to receive signals in their entirety or to only timestamp them according to a schedule stored in a memory. In some embodiments, the payload of localization signals includes a schedule of future transmissions, which is used by the self-localizing apparatus to determine whether to only timestamp or to receive in their entirety future localization signals.

Figure 24:
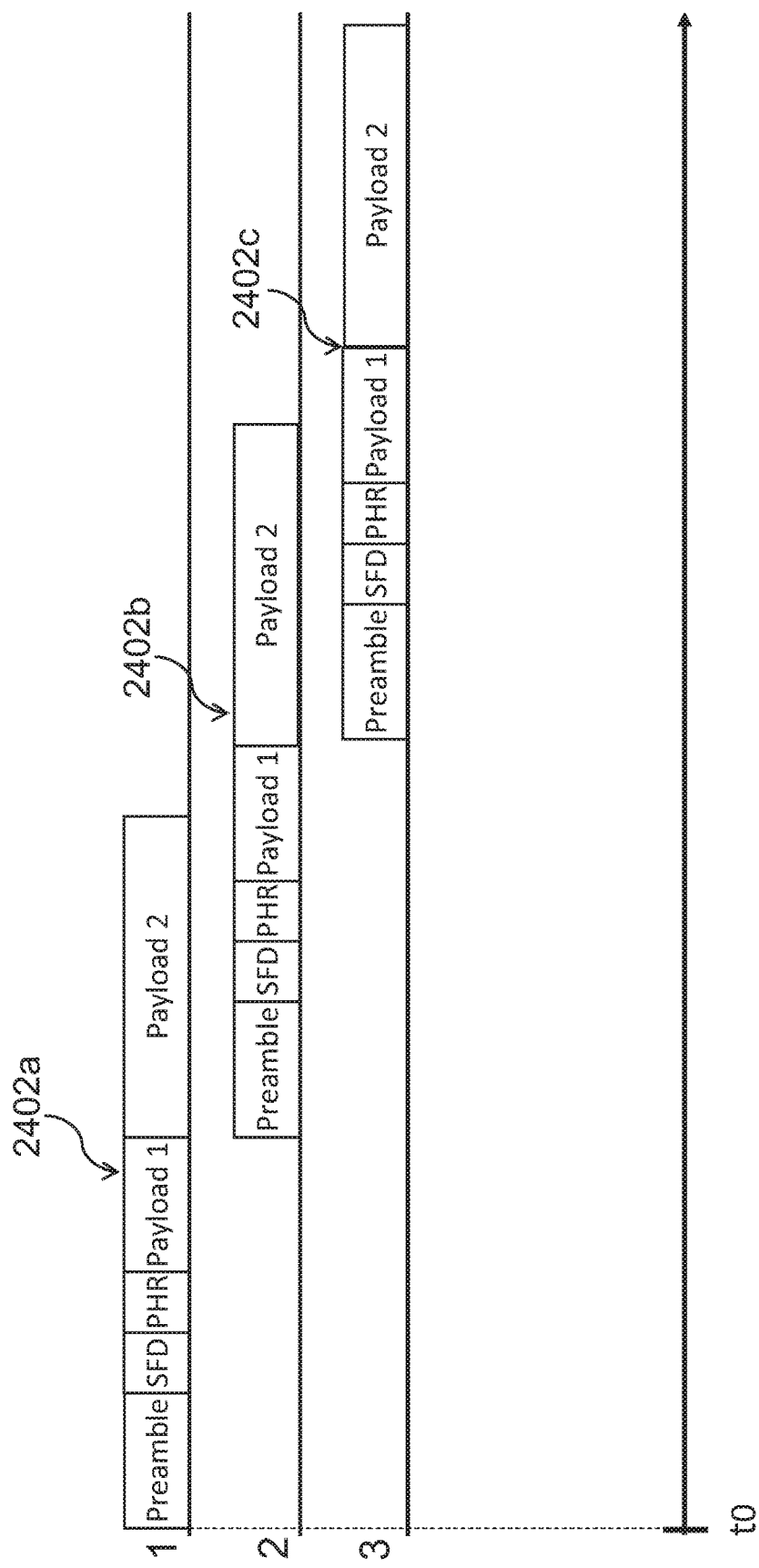
FIG. 24 shows an illustrative transmission schedule of localization signals comprising two payloads in accordance with some embodiments of the present disclosure.

FIG. 24 shows an illustrative transmission schedule of localization signals 2402a, 2402b, 2402c comprising two payloads in accordance with some embodiments of the present disclosure. The transmission schedule of FIG. 24 is similar to FIG. 22, but instead of there being a single payload, the payload of the localization signals is organized in two parts. The first part of the payload (payload 1) may contain information that all or most of the self-localizing apparatuses want to receive while the second part of the payload (payload 2) may contain information that is interesting for only some of the self-localizing apparatuses.

Before time t0, the receivers of self-localizing apparatuses are scanning for a preamble which is received shortly after time t0. Starting from this point the receivers can lock into signal 2402a, receive the SFD, and timestamp the message. Some of the receivers may decide that this information is enough and therefore stop the reception and start scanning for a new preamble. Some other receivers may be interested in receiving more information and therefore continue the reception until the first part of the payload (payload 1) is completely received. At this point, these receivers can decide whether to continue and receive the remaining part of the payload (payload 2) or interrupt the reception and start scanning for a new preamble.

The schedule shown in FIG. 24 allows self-localizing apparatuses to decide how much information is received and how frequently the desired information is received. For example, some self-localizing apparatuses may want to receive the second part of the payload every four incoming localizing signals, the first part of the payload every two incoming localizing signals, and the SFD (e.g., message timestamp) every incoming signal or whenever possible. This would allow for faster timestamping of incoming signals compared to a receiver that always receives the entire localization signal.

In some embodiments, the payload of the localization signals can be organized in three or more parts and the self-localizing apparatus can determined which parts to receive.

Figure 25:
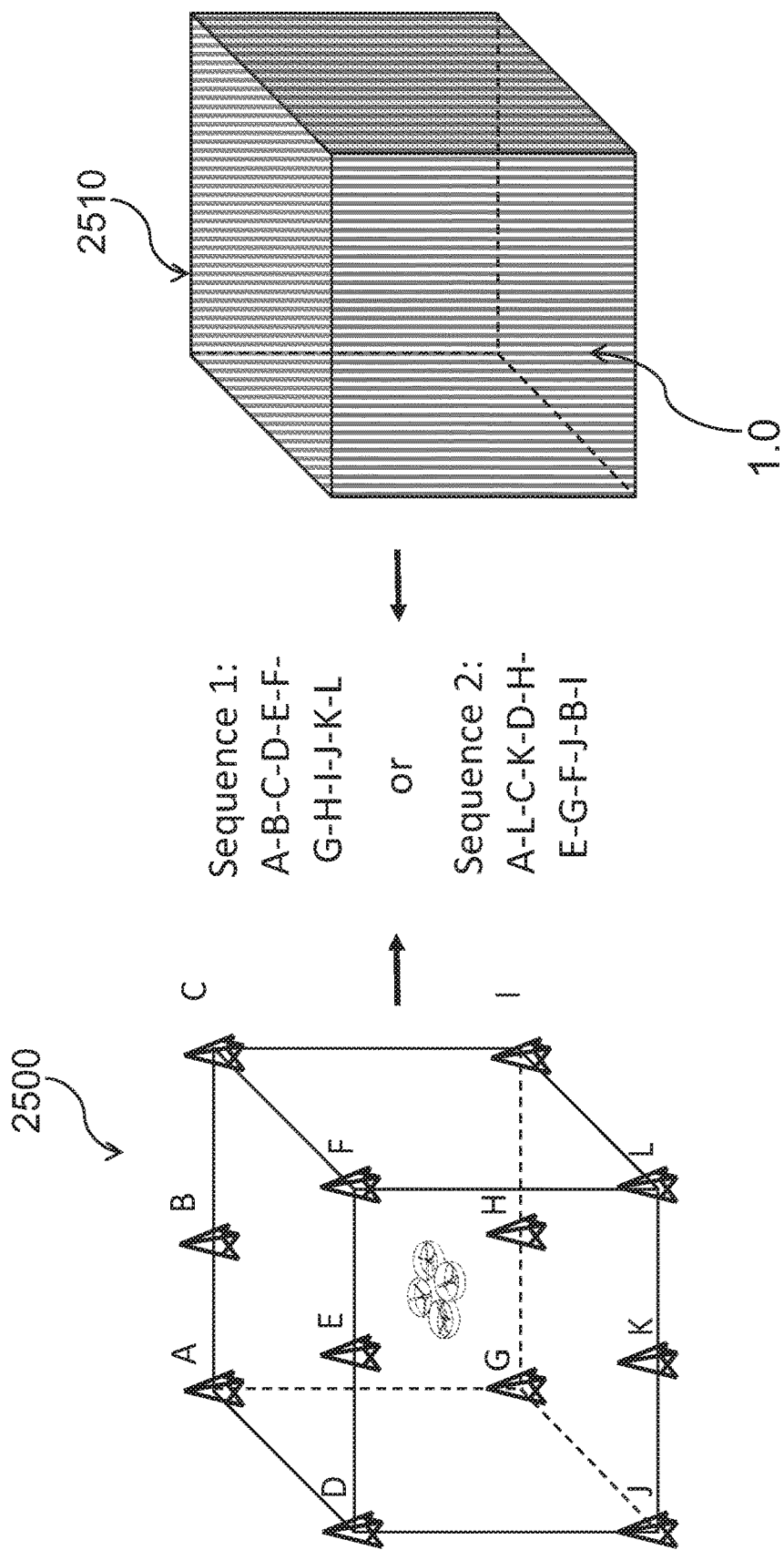
FIG. 25 shows an illustrative localization system and a corresponding performance map in accordance with some embodiments of the present disclosure.

FIG. 25 shows an illustrative localization system 2500 and a corresponding performance map 2510 in accordance with some embodiments of the present disclosure. Localization system 2500 comprises 12 anchors labelled A to L. Performance map 2510 indicates a positioning performance of 1 for the entire localization space of localization system 2500. Therefore, performance map 2510 indicates that the same positioning performance should be provided for the entire localization space.

Anchors A to L of localization system 2500 can be configured (e.g., using a schedule determined by a scheduler) to transmit localization signals according to any one of a number of different schedules to achieve a similar positioning performance in the localization region. In one example, the anchors can be scheduled to transmit in alphabetical order (i.e., A-B-C-D-E-F-G-H-I-J-K-L). In another example, the anchors can be scheduled to transmit in such a way that the transmission of an anchor located on the floor is followed by a transmission of anchor located on the ceiling (e.g., A-L-C-K-D-H-E-G-F-J-B-I). This may be desirable to maximize the difference in directions that the self-localizing apparatus receives localization signals from to optimize the localization performance of the self-localizing apparatus by minimizing the dilution of precision. It is noted that both the schedules are uniform in space and in transmission rate. It is also noted that these schedules are merely illustrative and that other schedules can also be used to achieve the same positioning performance within the localization space.

Figure 26:
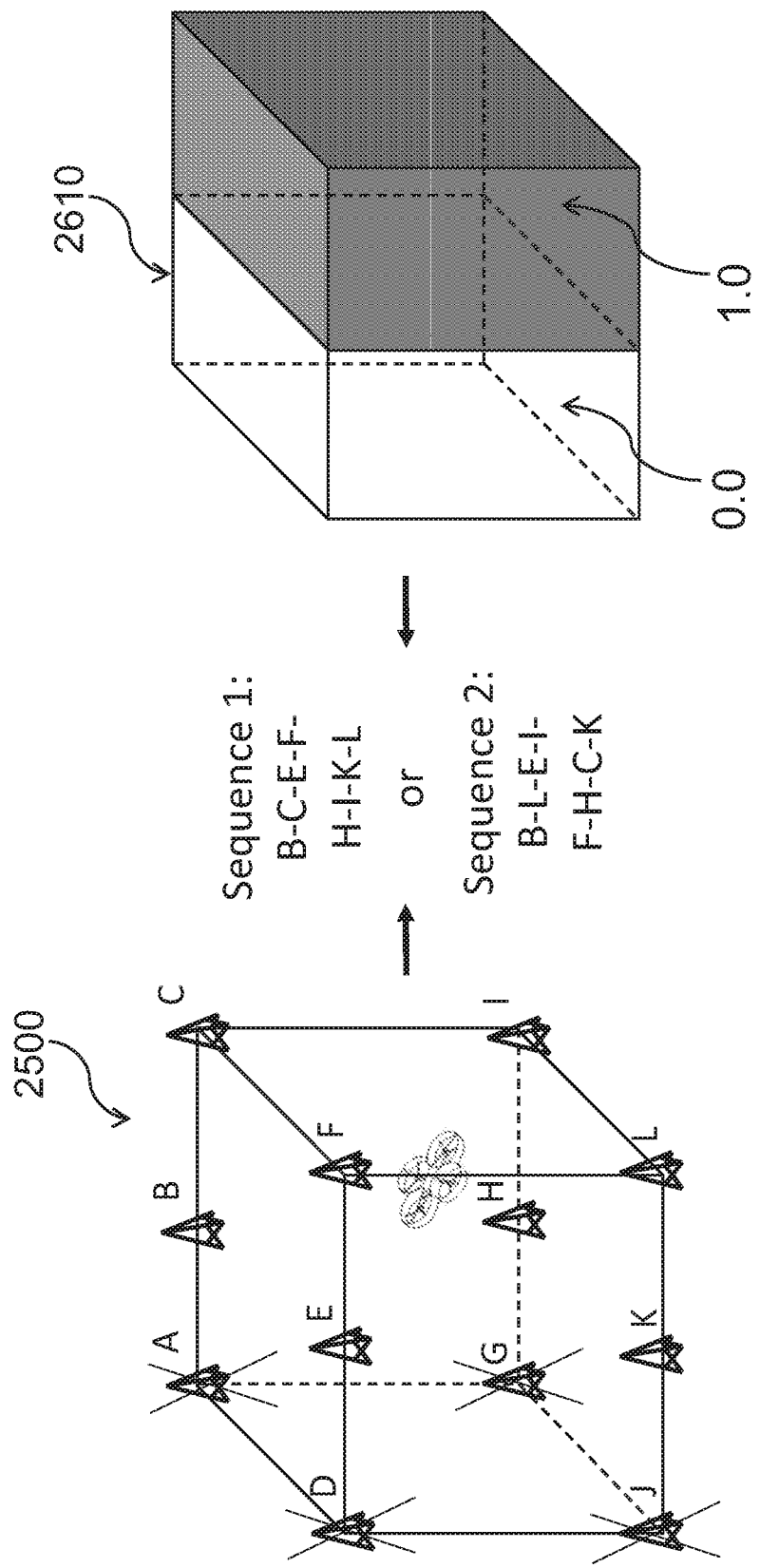
FIG. 26 shows the illustrative localization system of FIG. 25 used with a different performance map in accordance with some embodiments of the present disclosure.

FIG. 26 shows the illustrative localization system 2500 of FIG. 25 used with a different performance map 2610 in accordance with some embodiments of the present disclosure. Performance map 2610 differs from performance map 2510 of FIG. 25 in that it only requires positioning in the right part of the localization space. The left part of the localization space is not needed. For example, performance map 2610 may be used when there are no self-localizing apparatuses in the left part of the localization space.

To achieve the positioning performance required by performance map 2610, a subset of the anchors can be configured (e.g., using a schedule determined by a scheduler) to transmit localization signals according to any one of a number of different schedules to achieve the desired positioning performance. For example, the anchors can be configured such that the anchors on the left side of the localization space do not transmit localization signals. The resulting transmission schedule thus has the advantage of providing a faster transmission rate for the anchors that cover the right side of the localization space. Similar to FIG. 25, the transmission order could be alphabetical (i.e., B-C-E-F-H-I-K-L) or more sophisticated (e.g., B-L-E-I-F-H-C-K). It is noted that both of these schedules are uniform in transmission rate, but not uniform in the localization space.

Figure 27:
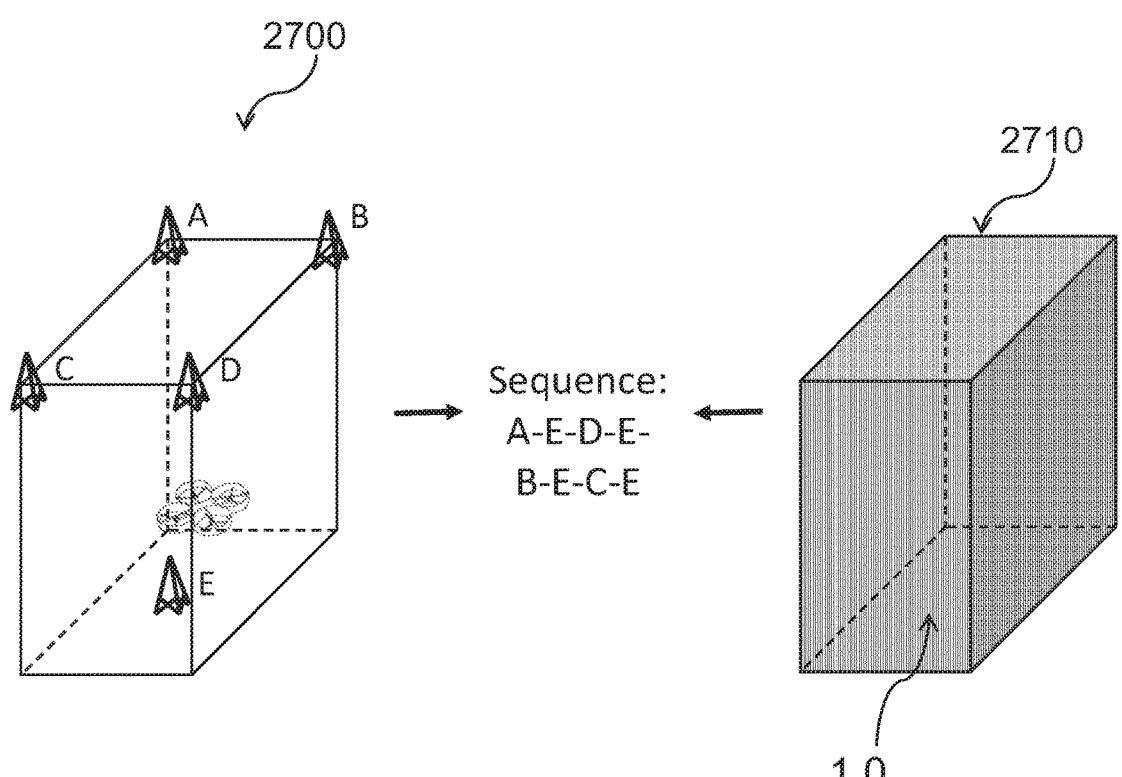
FIG. 27 shows the illustrative localization system and a corresponding performance map in accordance with some embodiments of the present disclosure.

FIG. 27 shows an illustrative localization system 2700 and a corresponding performance map 2710 in accordance with some embodiments of the present disclosure. Localization system 2700 comprises 5 anchors labelled A to E. The distribution of anchors in localization system 2700 is different than in localization system 2500 of FIG. 25 in that the number of anchors installed on the floor is different than the number of anchors installed on the ceiling. Performance map 2710 indicates that the desired positioning performance is uniform in the localization space.

In practice, it may be difficult to evenly distribute anchors within a localization space. For example, in some installations, it may be more practical to install a larger number of anchors on the ceiling and a lesser number of anchors on the floor. Localization system 2700 represents such a situation. If all of the anchors of system 2700 transmitted localization signals at the same rate, the positioning performance may be degraded compared to a system that had evenly distributed anchors because 4 out of 5 localization signals will originate from the ceiling. To mitigate the effect of an uneven distribution of anchors, like in localization system 2700, the transmission schedule can be defined in such a way that the anchor(s) located on the floor transmits more frequently than the ones located on the ceiling. For example, the transmission of localization signals may alternative between the floor and the ceiling such that the transmission rate for localization signals originating from anchors on the floor is the same as the transmission rate for localization signals originating from anchors on the ceiling. For example, one suitable transmission order for localization system 2700 is: A-E-D-E-B-E-C-E. It is noted that this schedule is uniform in space, but not in transmission rate (i.e., different anchors have different transmission rates).

Figure 28:
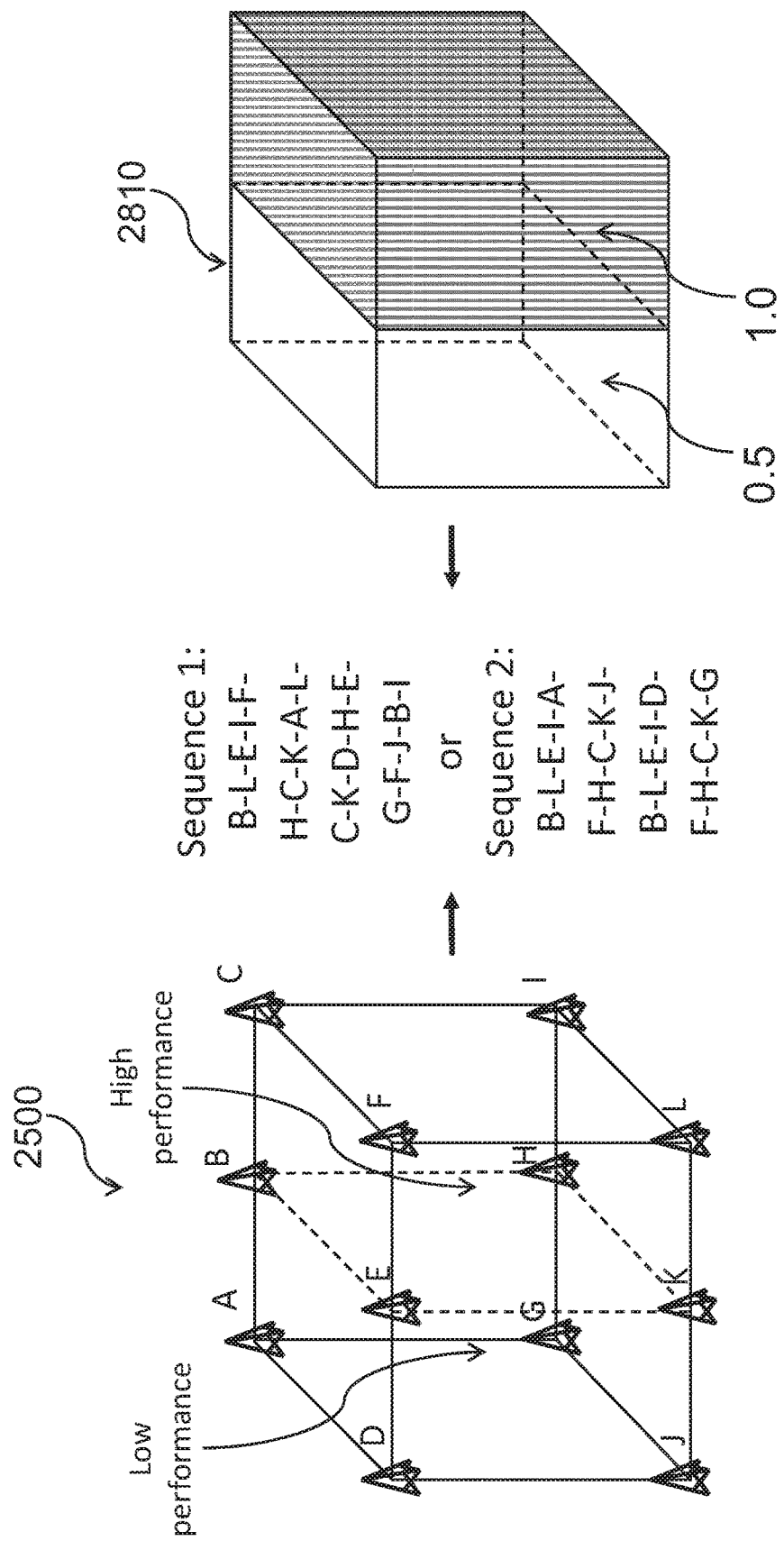
FIG. 28 shows the illustrative localization system of FIG. 25 used with a different performance map in accordance with some embodiments of the present disclosure.

FIG. 28 shows the illustrative localization system 2500 of FIG. 25 used with a different performance map 2810 in accordance with some embodiments of the present disclosure. Performance map 2810 differs from performance map 2510 of FIG. 25 in that it requires different levels of positioning performance within the localization space. Specifically, the positioning performance in the right part of the localization space is required to be higher than that in the left part of the localization space. For example, performance map 2810 may be used when the majority of self-localizing apparatuses are in the right part of the localization space. As another example, performance map 2810 may be used when more obstacles are present in the right part of the localization space and thus higher performance is desired to reduce the chance of collision with an obstacle.

The different levels of positioning performance can be achieved by configuring the anchors in such a way that the anchors covering the left side of the space transmit less frequently than the anchors covering the right side of the space. For example, one suitable transmission order is: B-L-E-I-F-H-C-K-A-L-C-K-D-H-E-G-F-J-B-I, which results in a transmission rate two times faster for the anchors covering the right side of the space. Another suitable transmission order is: B-E-I-A-F-H-C-K-J-B-L-E-I-D-F-H-C-K-G, which also results in a transmission rate two times faster for the anchors covering the right side of the space.

Figure 29:
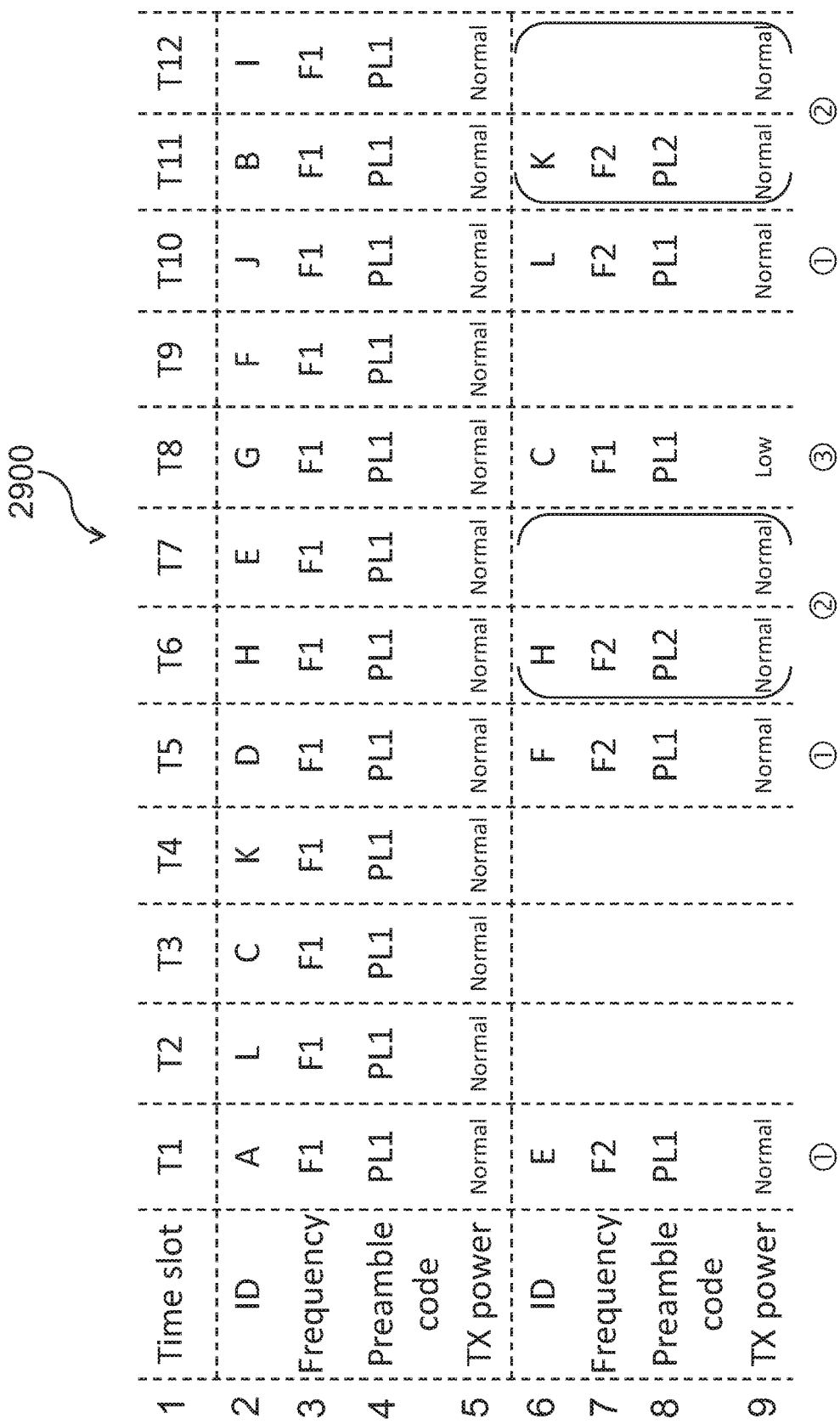
FIG. 29 shows an illustrative transmission schedule of localization signals in accordance with some embodiments of the present disclosure.

FIG. 29 shows an illustrative transmission schedule 2900 of localization signals in accordance with some embodiments of the present disclosure. Schedule 2900 represents a more sophisticated transmission schedule for localization system 2500 of FIG. 25 that accomplishes the desired positioning performance reflected in performance map 2810 of FIG. 28. Schedule 2900 comprises 9 rows of information. Row 1 indicates time slots. Rows 2-5 indicate the transmission parameters for a set first set of localization signals that are to be transmitted according to the schedule and rows 6-9 indicate the transmission parameters for a second set of localization signals that are to be transmitted according to the schedule. Rows 2 and 6 identify the anchors. Rows 3 and 7 identify the transmission carrier frequency. Rows 4 and 8 indicate the preamble code. Rows 5 and 9 indicate the transmission power. Accordingly, schedule 2900 differs from the previous exemplary schedules in that it not only specifies the anchor transmission order, but it also specifies additional transmission parameters such as carrier frequency, preamble code, and transmission power. The goal of schedule 2900 is to achieve high performance in the high performance region with little performance impact on the low performance region.

Schedule 2900 can be considered to have two sub-schedules that are time synchronized. Row 1 shows the time slots in which the sub-schedules are organized. Rows 2-5 can be considered to make up the first sub-schedule, which is the optimized sequence discussed above for FIG. 25. Rows 6-9 can be considered to make up the second sub-schedule, which defines additional transmissions for the anchors surrounding the high performance region. In this configuration, the first sub-schedule achieves uniform coverage in the entire space and the second sub-schedule increases the positioning performance in the high performance region.

During time slot T1, anchor A transmits a signal at the same time as anchor E. Because the two anchors transmit on different frequencies, a self-localizing apparatus can select to receive from either anchor A or anchor E to optimize its localization performance based on its position. This can be achieved by having the self-localizing apparatus receive data representative of the possible choices of anchors transmitting at that time slot. The data may be received from a remote location (e.g., as part of a payload of an earlier localization signal) or by using a transmission sequence known in advance and retrieving the data from a memory. The selection can be made in real-time (e.g., by computing the predicted reduction in dilution of precision that could be achieved by receiving either signal) or precomputed (e.g., stored in memory as a map of preferred transceivers based on the current position). A similar selection can be performed during time slots T5 and T10, where two different anchors transmit localization signals on different frequencies.

During time slot T6, anchor H transmits two signals simultaneously. The second signal is sent out on a frequency different from the first and includes a longer preamble, which allows for the reception of this second signal at greater distance as well as more precise time stamping. The longer preamble of the second signal may cause it to be transmitted during more than one time slot as illustrated. A self-localizing apparatus can thus select to receive signals from anchors H and E transmitted during time slots T6 and T7 on frequency 1, or a more precisely timestampable signal from anchor H transmitted during both time slots T6 and T7 on frequency 2. In this example, anchor H comprises a pair of transceivers. A similar principle without the need for an anchor having a pair of transceivers is used in time slots T11 and T12.

During time slot T8, anchor G transmits at the same time as anchor C on the same frequency. In this case, the parameters of anchor C are adjusted such that, to avoid interferences, it transmits at a lower transmission power and can only be received by devices (including self-localizing apparatuses and other anchors) that are out of range of anchor G.

It will be understood that the schedule depicted in FIG. 29 is merely illustrative and that other variations can be used.

In one variation, the first schedule (i.e., rows 2-5) can be changed such that all the transmissions use a longer preamble length to anticipate the transmission of the preambles. For example, an anchor configured to transmit during the time slot $T_K$ could start the transmission of the preamble during the last part of time slot $T_{K-1}$. A self-localizing apparatus can thus select to receive the entire preamble or to receive only the part of preamble transmitted during time slot $T_K$. The first option allows for a more precise time-stamping of the localization signal transmitted during time slot $T_K$ while the second option allows the self-localizing apparatus to receive both localization signals.

Figure 30:
FIG. 30 shows another illustrative transmission schedule of localization signals in accordance with some embodiments of the present disclosure.

FIG. 30 shows another illustrative transmission schedule 3000 of localization signals in accordance with some embodiments of the present disclosure. Schedule 3000 represents another sophisticated transmission schedule. Schedule 3000 specifies even more configuration parameters than set forth in schedule 2900. Schedule 3000 specifies the transmission time, anchor mode (i.e., reception or transmission), carrier frequency, preamble code, preamble length, transmission power, and antenna used to receive or transmit. Schedule 3000 specifies the configuration parameters of three transceivers (A, B, and C) and is organized in time slots (T1, T2, T3, T4, and T5).

Anchor A transmits during time slots T1 and T4. Anchor B transmits during time slots T2 and T5. Anchor C transmits during time slot T3. When the anchors are not transmitting, they are configured to receive localization signals transmitted by other anchors.

Anchor A always operates on frequency F1. Anchor B operates on frequency F1 during time slots T2, T3, and T5, while it operates on frequency F2 during the remaining time slots. Anchor C operates on frequency F1 during time slots T1 and T2, while it operates on frequency F2 during the remaining time slots. Using different frequencies allows for multiple transmissions at the same time (not represented in schedule 3000).

Anchor A always uses preamble code 1. Anchor B uses preamble code 5 during time slots T1 and T5, while it uses preamble code 1 during the remaining time slots. Anchor C always uses preamble code 5. Using different preamble codes allows for multiple transmissions at the same time (not represented in schedule 3000).

Anchors A and C always transmit localization signals with a preamble length of 250 microseconds. Anchor B always transmits localization signals with a preamble length of 500 microseconds. As mentioned above, a longer preamble length allows for the reception of the localization signal at greater distance as well as with more precise time stamping.

Anchor A always transmits localization signals with transmission power equal to 5 dBm. Anchors B and C always transmit localization signals with transmission power equal to 0.5 dBm. Using different transmission powers allows for transmissions with longer or shorter coverage. This can be used to have simultaneous but not interfering transmissions from different anchors that use the same frequency and the same preamble code.

Anchor A always receives and transmits localization signals using antenna 1. Anchor B always transmits using antenna 1 and always receives using antenna 2. Anchor C uses antenna 2 during the first 3 time slots and antenna 1 during the last 2 time slots. Using different antennas allows for transmissions that have different radiation patterns (i.e., can reach different regions of the space with different quality of the signal) and for better reception.

Self-localizing apparatuses can use the knowledge encoded in the schedule to configure their own reception parameters to receive data from a specific transmitter. A self-localizing apparatuses can, for example, select to receive a specific signal to optimize its localization performance based on its position.

In some embodiments, anchors can be configured (as part of schedule 3000) to receive a specific signal to improve the network clock synchronization or the propagation of information over the network.

Figure 31:
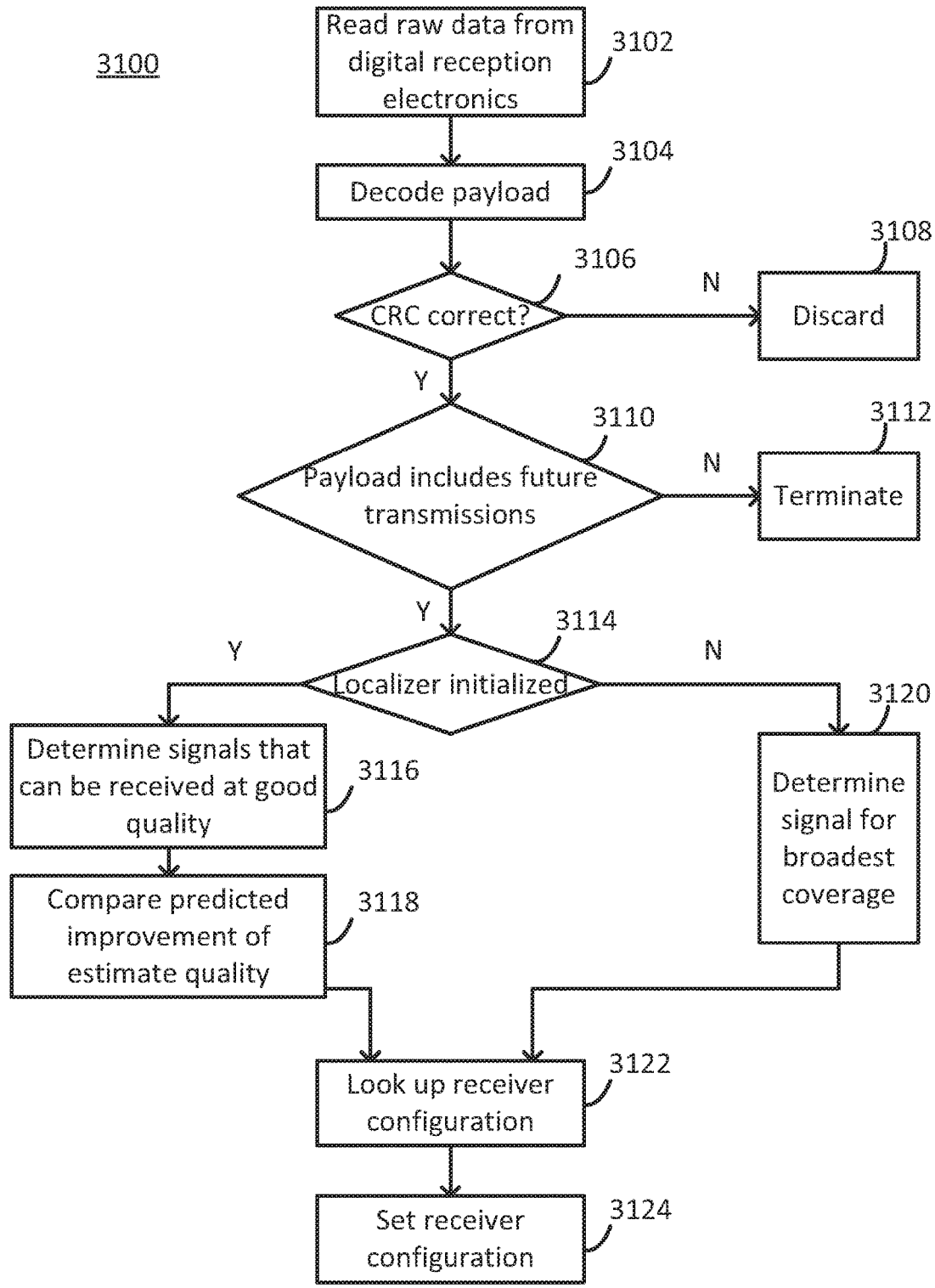
FIG. 31 shows an illustrative flow chart of logic that may be implemented on a self-localizing apparatus to configure its receiver in accordance with some embodiments of the present disclosure.

FIG. 31 shows an illustrative flow chart 3100 of logic that may be implemented on a self-localizing apparatus to configure its receiver based on a received payload identifying future transmissions in accordance with some embodiments of the present disclosure.

At step 3102, the self-localizing apparatus may read the raw received data from the digital reception electronics upon the reception of a localization signal. Such a read process may be implemented using a digital transmission protocol, for example, SPI, I2C, UART, or a parallel digital protocol.

At step 3104, after reading the data, the self-localizing apparatus may decode the received payload. Decoding may include a number of processing steps (not shown). For example, such processing may include: deserialization of data, parsing data representative of payload size, parsing data representative of payload type, any other processing steps, or any combination thereof.

At decision 3106, a data integrity check may be performed. For example, a CRC checksum may be verified. If the data integrity check fails (e.g., if the CRC checksum is not correct), the self-localizing apparatus may discard the received data at step 3108 and the process may return to step 3102. If the integrity check succeeds, the process may proceed to decision 3110.

At decision 3110, the content of the payload may be inspected to determine whether it contains a payload identifying future transmissions by positioning anchors. In some embodiments, step 3110 may be the final step of pre-processing the payload. If the payload is found not to identify future transmissions, the process may be terminated at step 3112 and return to step 3102. If the payload is found to identify future transmissions by positioning anchors, the process may proceed to decision 3114.

At this point, the self-localizing apparatus may carry out steps for determining which of the available localization signals is preferable to receive. For example, this decision may be carried out based on status information provided by the localizer.

At decision 3114, the self-localizing apparatus may determine whether the localizer has been successfully initialized (i.e., whether the localizer has a current estimated position). If the self-localizing apparatus determines that that the localizer has not been successfully initialized, the process may proceed to step 3120. If the self-localizing apparatus determines that that the localizer has been successfully initialized, the process may proceed to step 3116.

At step 3120, when the localizer is not initialized, the self-localizing apparatus may make the decision regarding which signal to receive based on a backup heuristic. For example, the self-localizing apparatus may decide to receive signals that provide the broadest coverage to determine an initial position estimate. The process may then proceed to step 3122.

At step 3116, when the localizer is initialized, the self-localizing apparatus may perform a first check based on the estimated position of the self-localizing apparatus. The position may be compared to the positions of the positioning anchors that will be transmitting signals in future time slots. If for some of these anchors, good reception at the self-localizing apparatus's location will not be possible, then they are marked as non-preferred signals. In some embodiments, this check may additionally account for the orientation of both the anchor antenna and the self-localizing apparatus antenna to more accurately estimate the reception quality. In some embodiments, the metric for what estimated reception quality is deemed acceptable may also be adjusted based on other metrics, for example capturing how important the signal would be for the quality of the position estimate.

At step 3118, the localizer's position estimate quality may be inspected. The quality may, for example, be expressed as the current dilution of precision or as the variance of the position estimate. Based on the probable range of positions of the self-localizing apparatus, the reduction of uncertainty for each of the candidate localization signals may be computed. For example, a simulated version of the future localization signal may be provided to the localizer to evaluate the change in variance. These evaluations may be carried out for each of the candidate localization signals, and a metric may then be applied to determine the preferred localization signal. In some embodiments, such a metric may be the root mean square of the total position variance, the total variance within a plane, or the variance along a direction of particular importance. The process may then proceed to step 3122.

After the aforementioned steps are carried out, a preferred localization signal to be received has been determined. At step 3122, the receiver settings are determined. While the payload may have provided high-level information about the configurations of future localization signals, more low-level receiver settings may typically be required to set up the reception electronics. In some embodiments, these low-level receiver settings may be hardware-dependent settings. For example, the hardware-dependent settings may include at least one of a configuration of phase-locked loops in the reception electronics, the preamble code to scan for during reception, positions of RF switches, other hardware setting, or any combination thereof. In some embodiments, the receiver settings may be stored in a memory in the form of a look-up table, allowing the self-localizing apparatus to determine the correct low-level configuration from the received high-level information.

At step 3124, the low-level receiver configuration may be applied to the receiver. In some embodiments, applying the configuration may be performed by writing configuration parameters to registers of the reception electronics through a protocol such as SPI, I2C, or UART. In some embodiments, applying the configuration may be performed by changing the value of digital or analog input pins of the transmission electronics, for example by changing the state of an output pin of a microcontroller.

In some embodiments, the status information from the localizer may be used to determine which localization signal to receive. In some embodiments, many other decision criteria may be used for the same purpose. For example, the decision may be made based on a known planned motion of the self-localizing apparatus, based on the signal strength of received localization signals, based on a stored localization signal priority list, based on other criteria, or on any combination thereof.

It will be understood that the steps and decision elements of flow chart 3100 are merely illustrative and that various modifications can be made within the scope of this disclosure. For example, in some embodiments, the top portion of flow chart 3100 may be performed independently from the bottom portion. For example, logic elements 3102-3112 may be performed on each received signal while logic elements 3114-2124 may separately and repeatedly select what signals to receive. As another example, in some embodiments, logic elements 3102-3112 may not need to be performed when a self-localizing apparatus stores a schedule of which anchors are scheduled to transmit localization signals at which times.

Figure 32:
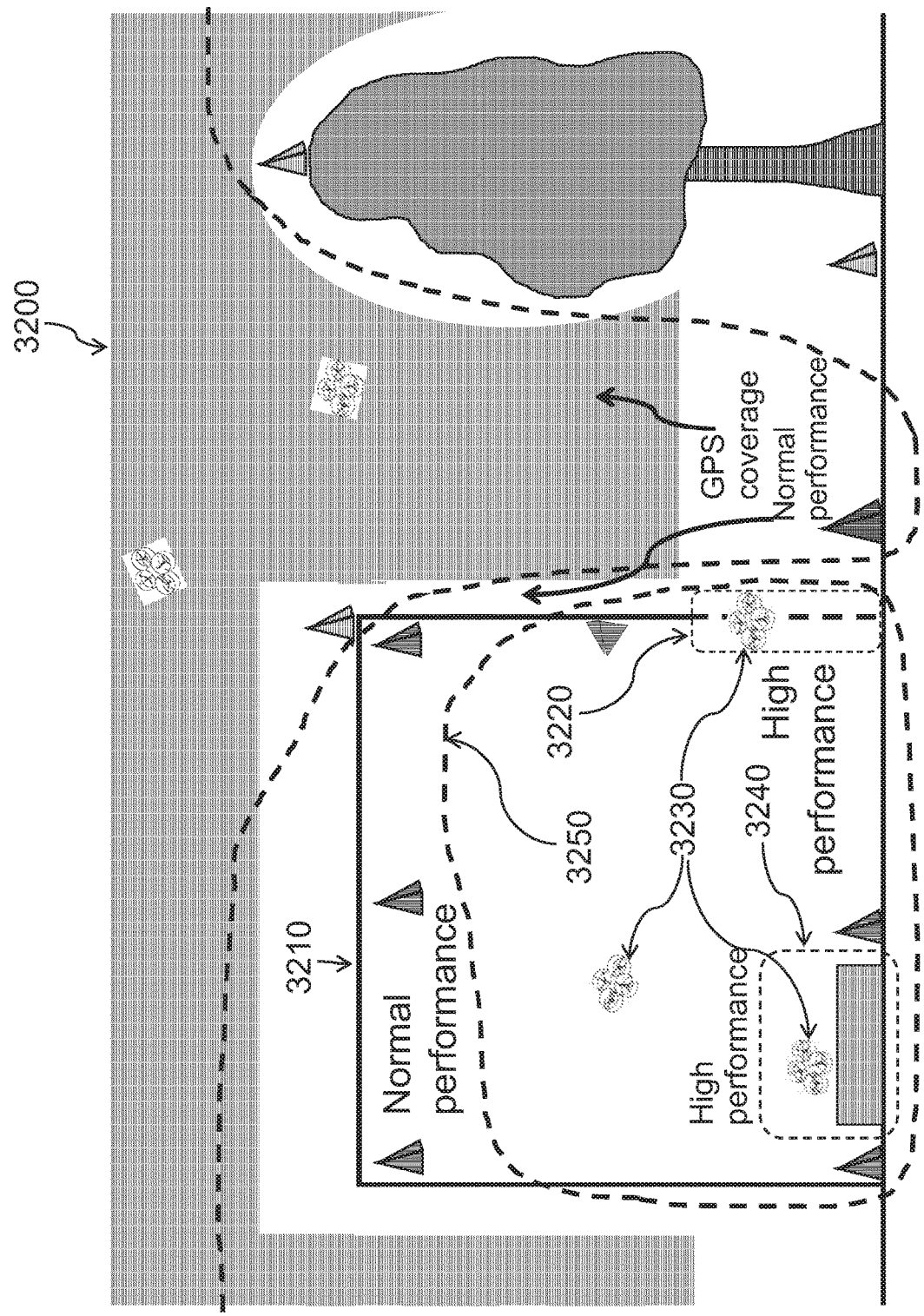
FIG. 32 shows an illustrative application of a performance map to an indoor and outdoor environment in accordance with some embodiments of the present disclosure.

FIG. 32 shows an illustrative application of a performance map to an indoor and outdoor environment 3200 in which flying operate in accordance with some embodiments of the present disclosure. Environment includes an indoor area within a building 3210 (e.g., a warehouse) with an access area 3220 through which flying machines 3230 can enter and leave the outdoor area. In this example, two localization systems have been installed. One is installed outdoors, while the second is installed indoors.

The required positioning performance is identified in different areas of the environment. A landing area 3240 surrounds the landing area of flying machines 3230. Due to tight flight tolerances that may be required during landing, this area is marked as requiring particularly high positioning performance. A second area 3250 covers the majority of the remaining space indoors, and requires a level of localization performance that is sufficient for normal safe flight. The remainder of the indoor space has no localization performance requirements, because the flying machines do not operate in those spaces.

A second area requiring particularly high localization performance surrounds access area 3220 that connects the indoor and outdoor areas because the flight maneuvering space is reduced in this area. The remaining outdoor area requires normal localization performance in the approach area to the access area, and no localization performance in other areas.

Additionally, FIG. 32 shows the availability of other localization mechanisms—in this case, GPS. The availability of such mechanisms may also be provided to the scheduler. If the self-localizing apparatus is configured to fuse different localization systems (such as the systems disclosed herein and GPS) to augment performance, then the scheduler can take this into account and adjust its localization performance requirements to achieve the required total positioning performance under the assumption that the other localization mechanism can be used as a support tool. For example, GPS may provide sufficient positioning performance without the localization systems described herein when flying machines 3230 operate above the building, and the schedule therefore does not need to account for coverage in that area.

FIG. 32 also shows the application of a bridge anchor, which is used here to allow flying machines to seamlessly transition between the indoor localization system and the outdoor localization system.

Figure 33:
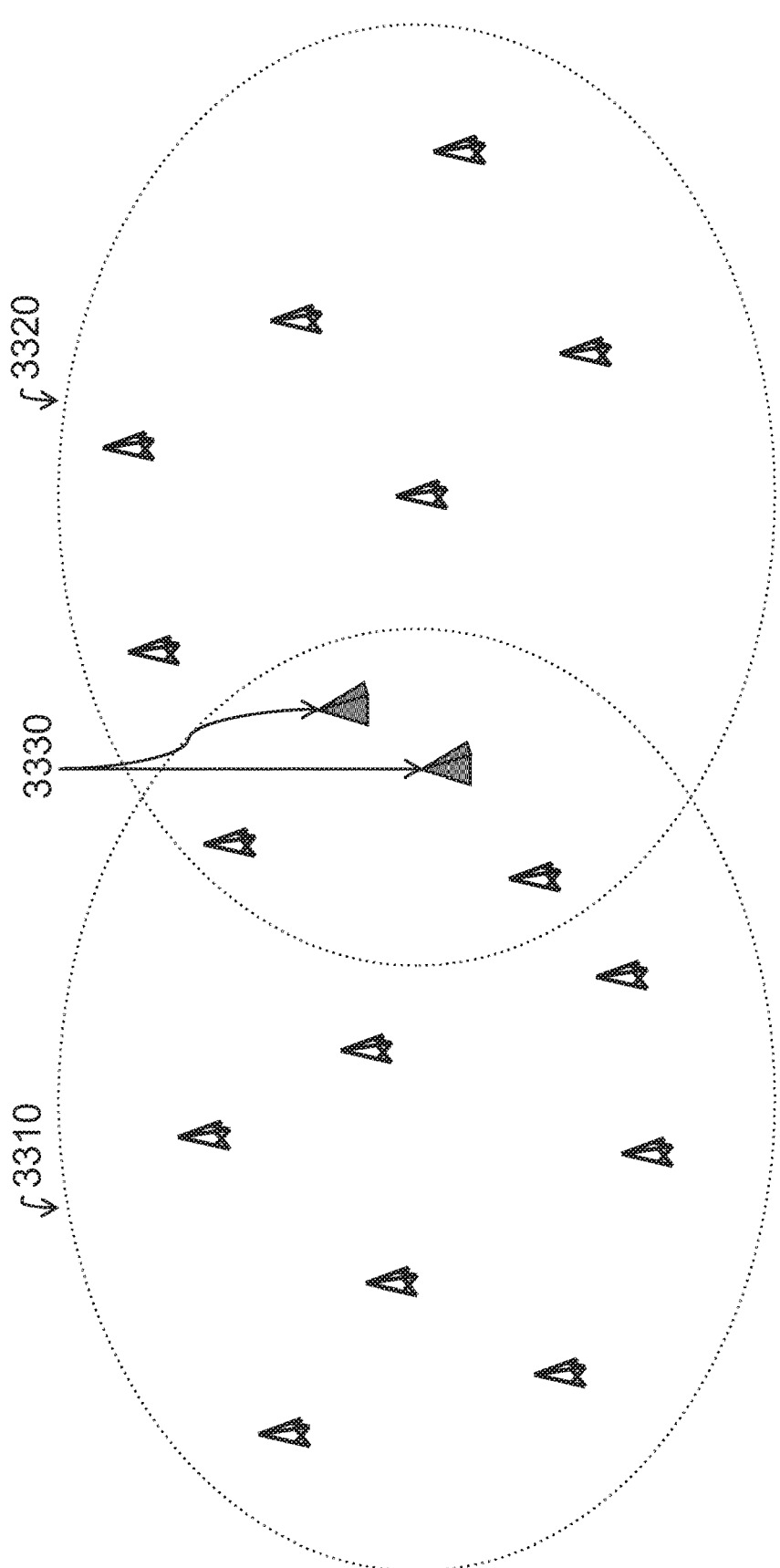
FIG. 33 shows two illustrative localization networks in accordance with some embodiments of the present disclosure.

FIG. 33 also shows two illustrative localization networks 3310, 3320 in accordance with some embodiments of the present disclosure. Localization network 3310 partially overlaps with localization network 3320. In some embodiments, localization network 3310 comprises a plurality of synchronized anchors and localization network 3320 comprises a plurality of synchronized anchors. However, because localization networks 3310, 3320 are different networks, they may not be synchronized with respect to each other. Therefore, a self-localizing apparatus may have difficulty in moving between localization networks 3310, 3320. To address this problem, one or more bridge anchors may be used to enable a self-localizing apparatus to switch from one network to the other. As illustrated, two bridge anchors 3330 are located in the area of overlap between the two networks.

Figure 34:
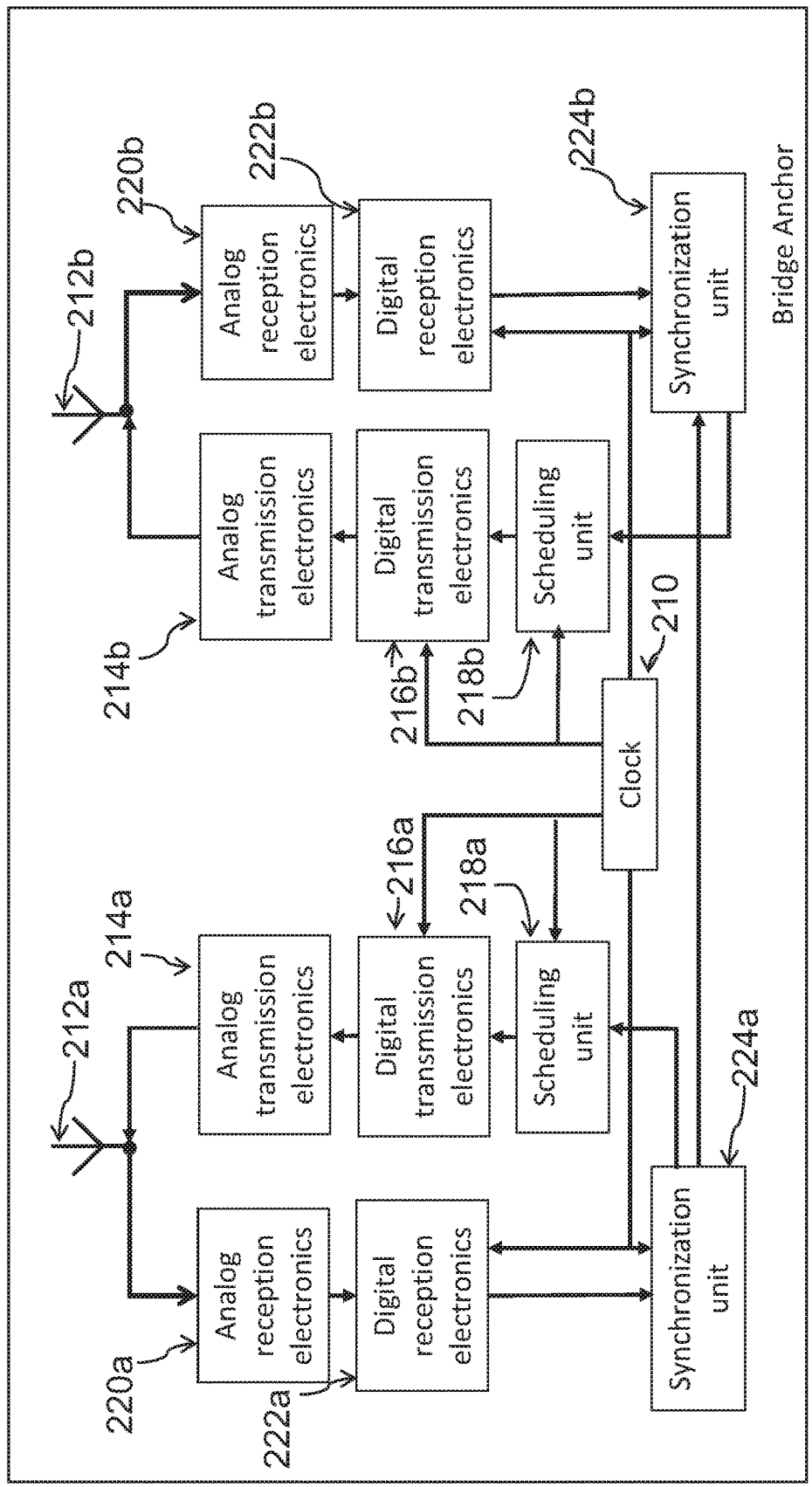
FIG. 34 is a block diagram of an illustrative bridge anchor in accordance with some embodiments of the present disclosure.

FIG. 34 is a block diagram of an illustrative bridge anchor that is configured to allow the synchronization of two localization systems (e.g., localization networks 3310, 3320) in accordance with some embodiments of the present disclosure. When two separate localization systems are used in the vicinity of each other, self-localizing apparatus that switch from receiving signals of the first system to receiving signals of the second system (e.g., because they moved from a location where the first system provides better performance to one where the second system provides better performance) would normally be required to re-initialize their localization unit to identify the timing information of the second localization system and then determine its position again. This would produce a black-out period during which no (or only degraded) localization is available as the self-localizing apparatus switches from one network to the next. The bridge transceiver shown in FIG. 34 allows the synchronization of the timing information between two neighboring networks, such that a self-localizing apparatus is able to switch between networks while keeping its local timing information as if it was still receiving localizing signals from the first network.

Like some of the anchors disclosed herein, this bridge anchor contains a clock 210, a scheduling unit 218a, digital transmission electronics 216a, analog transmission electronics 214a, antenna 212a, analog reception electronics 220a, and digital reception electronics 222a. These components are used for the bridge anchor to communicate with, and provide localization signals on, the first localization system.

To enable the bridge functionality, the bridge anchor in this embodiment includes a second set of some of the components used for the first localization system. Specifically, the bridge anchor here additionally includes scheduling unit 218b, digital transmission electronics 216b, analog transmission electronics 214b, antenna 212b, analog reception electronics 220b, and digital reception electronics 224b. These additional components are configured to receive and transmit signals of the second localization system.

The bridge anchor in this embodiment also includes synchronization unit 224a coupled to digital reception electronics 222a and clock 210. Synchronization unit 224a determines timing information of the first localization system. The bridge anchor here also includes a synchronization unit 224b to likewise determine timing information of the second localization system. In addition, synchronization unit 224b receives timing information of synchronization unit 224a to compare the timing information from the two localization systems. Synchronization unit 224b is coupled to scheduling unit 218b and can adjust the scheduling operation of the second localization system by at least one of (1) adjusting the scheduling of the second localization system such that it is steered towards being in synchrony with the scheduling of the first localization system and (2) including information in the transmission payload that causes the anchors in the second localization system to adjust their timing to the first localization system. The timing information referred to in this context could, for example, be the apparent clock rate of the localization system, the apparent clock offset, or the apparent clock skew.

Figure 35:
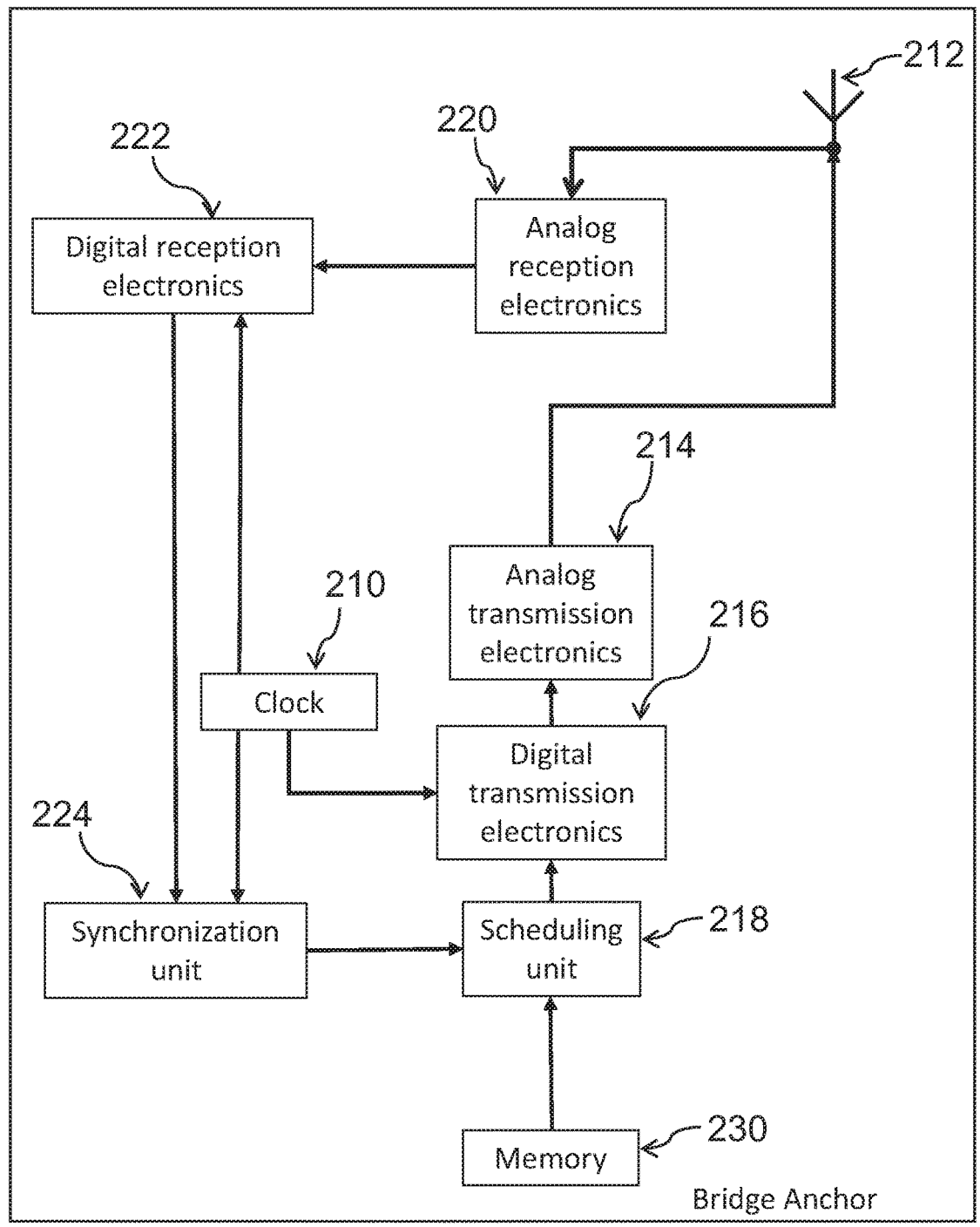
FIG. 35 is a block diagram of another illustrative bridge anchor in accordance with some embodiments of the present disclosure.

FIG. 35 is a block diagram of another illustrative bridge anchor that is configured to enable seamless transition of a self-localizing apparatus from one localization system to another in accordance with some embodiments of the present disclosure. Unlike the bridge anchor of FIG. 34, the bridge anchor of FIG. 35 does not share common timing information between two localization systems to synchronize them to each other. Therefore, the bridge anchor of FIG. 35 is required to enable seamless transition between two unsynchronized localization systems. The difficulty that causes a self-localization apparatus to have temporarily unavailable (or reduced performance) localization is that, to provide meaningful localization data, the self-localization apparatus needs to identify the timing of the second localization system when the localizer is reinitialized. The bridge transceiver shown in FIG. 35 allows the self-localization apparatus to quickly switch from a first to a second localization system by hot-starting its localizer after re-initialization, using additional timing information from the second localization system.

To achieve this, the bridge transceiver of FIG. 35 includes analog reception electronics 220 and digital reception electronics 222, coupled to antenna 212, which receives signals from the second localization system. Digital transmission electronics 216 and analog transmission electronics 214 are configured to transmit signals with the configuration of the first localization system. The reception and transmission electronics share a clock 210. The signals received from digital reception electronics 222 are provided to synchronization unit 224, which identifies the timing information of the received signals (which are signals from the second localization system). The identified timing information is sent to scheduling unit 218, which can include the identified timing information in the payload transmitted on the first localization system. A self-localizing apparatus receiving signals from the first localization system can decode this timing information and may, as it switches from the first to the second localization system, use the timing information to hot-start the localizer for the second localization system.

According to one aspect of the present disclosure, a localization system is provided that comprises a plurality of positioning anchors configured to wirelessly transmit localization signals. The localization signals may be capable of being used by self-localizing apparatus within a region to determine position information. For example, a self-localizing apparatus may use the localization signals to determine its own position within a defined three dimensional region.

In some embodiments, the plurality of the positioning anchors may comprise a first positioning anchor, a second positioning anchor, and a third positioning anchor. The first positioning anchor may be configured to wirelessly transmit first localization signals. The second positioning anchor may be configured to wirelessly transmit second localization signals. The third positioning anchor may be configured to wirelessly transmit third localization signals.

In some embodiments, each of the plurality of positioning anchors may be communicatively coupled to a scheduling unit. In some embodiments, the scheduling unit may be configured to schedule the transmission of the localization signals. For example, the scheduling unit may schedule the transmission of the first localization signals, second localization signals, and third localization signals. In some embodiments, the scheduling unit may schedule the transmission of the localization signals to control positioning performance. For example, the scheduling unit may schedule the first positioning anchor to transmit the first localization signals at a first transmission rate, schedule the second positioning anchor to transmit the second localization signals at a second transmission rate, and schedule the third positioning anchor to transmit the third localization signals at a third transmission rate. In some embodiments, the first transmission rate may be greater than the second transmission rate. In some embodiments, the first transmission rate, the second transmission rate, and the third transmission rates may be selected to provide greater positioning performance within a portion of the region.

In some embodiments, the scheduling unit may be configured to adjust the transmission rate of either of the first, second, and third localization signals, or any combination thereof in order to change the positioning performance within the region during operation. In some embodiments, the scheduling unit may be configured to receive location of the self-localizing apparatus and/or the flight pattern of the self-localizing apparatus. In some embodiments, the scheduling unit may be configured to adjust the transmission rates based on a known location of the self-localizing apparatus. In some embodiments, the scheduling unit may be configured to adjust the transmission rates based on a known motion of the self-localizing apparatus (e.g., a flight pattern).

In some embodiments, each of the first, second, and third localization signals may comprise ultra-wideband (UWB) localization signals. Each of the UWB localization signals may comprise a preamble code and a payload. In some embodiments, some of the UWB localization signals may comprise a payload that comprises commands. In some embodiments, the scheduling unit may be configured to schedule the transmission of the UWB localization signals to optimize the propagation of the commands to at least one of a self-localizing apparatus and the plurality of the anchors.

In some embodiments, each of the plurality of positioning anchors may comprise a clock. In some embodiments, some of the UWB localization signals may comprise a payload that comprises synchronization data. Each of the plurality of positioning anchors may be configured to receive the synchronization data from UWB localization signals received from at least one other positioning anchor. In some embodiments, the at least one scheduling unit may be configured to schedule the transmission of the UWB localization signals to optimize the synchronization of the clocks.

In some embodiments, the optimization for the synchronization of the clocks may be performed by including an objective function or a constraint that may representative of the clock synchronization performance. For example, such an optimization may incorporate a model that predicts the timestamping variability in dependence of environmental effects, with the objective being to achieve high communication rates between anchors that have low timestamping variability.

In some embodiments, each of the plurality of positioning anchors may comprise a synchronization unit, wherein each synchronization unit may be configured to compute a correction for at least one of a clock offset and a clock rate for its respective clock based on the received synchronization data.

In some embodiments, the scheduling unit may be configured to schedule the transmission of the localization signals to increase at least one of precision, accuracy, or update rate in one or more portions of the region. In some embodiments, the scheduling unit may be configured to schedule the transmission of the localization signals based on time slots in a schedule. In some embodiments, the first positioning anchor may be assigned more time slots in the schedule than the second positioning anchor.

In some embodiments, the scheduling unit may comprise a first scheduling unit, a second scheduling unit, and a third scheduling unit. The first scheduling unit may be physically coupled to the first positioning anchor and may be configured to schedule the transmission of the first localization signals. The second scheduling unit may be physically coupled to the second positioning anchor and may be configured to schedule the transmission of the second localization signals. The third scheduling unit may be physically coupled to the third positioning anchor and may be configured to schedule the transmission of the third localization signals.

In some embodiments, a method for transmitting localization signals in a localization system is provided. In some embodiments, the localization system may comprise a plurality of positioning anchors.

In some embodiments, the method may comprise a first positioning anchor of the plurality of positioning anchors wirelessly transmitting first localization signals during two or more time slots of a transmission schedule. The method may further comprise a second positioning anchor of the plurality of positioning anchors wirelessly transmitting second localization signals during one or more time slots of the transmission schedule. The method may further comprise a third positioning anchor of the plurality of positioning anchors wirelessly transmitting third localization signals during one or more time slots of the transmission schedule.

In some embodiments, the first localization signals, the second localization signals, and the third localization signals may be capable of being used by self-localizing apparatus within a region to determine position information. The first positioning anchor may be assigned more time slots in the transmission schedule than the second positioning anchor to provide greater positioning performance within a portion of the region.

In some embodiments, the method may comprise one or more scheduling units adjusting the number of time slots the first positioning anchor, the second positioning anchor, and the third positioning anchor are assigned in the transmission schedule during operation. In some embodiments, the method may comprise wirelessly receiving the known location of the self-localizing apparatus. In some embodiments, the number of time slots may be adjusted based on a known location of the self-localizing apparatus.

In some embodiments, the time slots of the transmission schedule may be assigned based on one or more of: a known location of the self-localizing apparatus; optimization of propagation of commands comprised as part of at least some of the first, second, and third localization signals; optimization of synchronization of clocks associated with the first, second, and third positioning anchors, and at least one of improved precision, accuracy, or update rate in one or more portions of the region.

In some embodiments, the method may further comprise generating, using a first clock, first timing signals used to determine when the first positioning anchor wirelessly transmits the first localization signals. The method may further comprise generating, using a second clock, second timing signals used to determine when the second positioning anchor wirelessly transmits the second localization signals. The method may further comprise generating, using a third clock, a third timing signal used to determine when the third positioning anchor wirelessly transmits the third localization signals, wherein the first, second, and third clocks are synchronized.

According to another aspect of the present disclosure, a localization system is provided that comprises a plurality of positioning anchors that may be configured to wirelessly transmit localization signals capable of being used by self-localizing apparatus within a region to determine position information. In some embodiments, the region may comprise a three-dimensional region.

In some embodiments, the localization system may further comprise at least one scheduling unit. The at least one scheduling unit may be communicatively coupled to the plurality of positioning anchors. In some embodiments, the at least one scheduling unit may be configured to schedule the transmission of the localization signals according to a first transmission schedule. The first transmission schedule may define a first temporal order for each of the plurality of positioning anchors to transmit the localization signals. In some embodiments, the localization signals may comprise ultra-wideband (UWB) localization signals. In some embodiments, each of the localization signals may comprise a preamble code and a payload.

In some embodiments, the at least one scheduling unit may be configured to determine when to change from the first transmission schedule to a second transmission schedule. The second transmission schedule may define a second temporal order for each of the plurality of positioning anchors to transmit localization signals. The second transmission schedule may define a second transmitter (TX) or receiver (RX) mode for each of the plurality of positioning anchors. In some embodiments, the second temporal order may be different than the first temporal order. In some embodiments, the second temporal order may be identical to the first temporal order.

In some embodiments, the at least one scheduling unit may be configured to determine when to restart a transmission schedule. In some embodiments, the at least one scheduling unit may be configured to start or restart a transmission schedule from a specific time (i.e., the schedule does not start or restart from the schedule's beginning). In some embodiments, the first transmission schedule and the second transmission schedule may provide at least one of increased precision, accuracy, and update rate in different portions of the region.

In some embodiments, the at least one scheduling unit may be configured to schedule, in response to a determination to change from the first transmission schedule to the second transmission schedule, the transmission of the localization signals according to the second transmission schedule. In some embodiments, the change from the first transmission schedule to the second transmission schedule may change the positioning performance within the region.

In some embodiments, the at least one scheduling unit may be configured to receive the known location of the self-localizing apparatus and/or a flight pattern of the self-localizing apparatus. In some embodiments, the at least one scheduling unit may be configured to determine when to change from the first transmission schedule to a second transmission schedule based on a known location of the self-localizing apparatus. In some embodiments, the at least one scheduling unit may be configured to determine when to change from the first transmission schedule to a second transmission schedule based on user input. In some embodiments, the at least one scheduling unit may be configured to determine when to change from the first transmission schedule to a second transmission schedule based on a known motion of the self-localizing apparatus.

In some embodiments, the payload of at least some of the UWB localization signals may comprise commands. In some embodiments, the at least one scheduling unit may be configured to change from the first transmission schedule to the second transmission schedule to optimize the propagation of the commands to at least one of a self-localizing apparatus and the plurality of the anchors.

In some embodiments, each of the plurality of positioning anchors may comprise a clock. In some embodiments, the payload of at least some of the UWB localization signals may comprise synchronization data. Each of the plurality of positioning anchors may be configured to receive the synchronization data from UWB localization signals received from at least one other positioning anchor. The at least one scheduling unit may be configured to change from the first transmission schedule to the second transmission schedule to optimize for the synchronization of the clocks.

In some embodiments, each of the plurality of positioning anchors may comprise a synchronization unit. Each synchronization unit may be configured to compute a correction for at least one of a clock offset and a clock rate for its respective clock based on the received synchronization data.

In some embodiments, the first transmission schedule and the second transmission schedule may each comprise a plurality of time slots. In some embodiments, at least one positioning anchor of the plurality of positioning anchors may be assigned a different number of time slots in the first transmission schedule and the second transmission schedule. In some embodiments, at least one positioning anchor of the plurality of positioning anchors may be assigned a different transmitter (TX) mode or receiver (RX) mode. In some embodiments, at least one positioning anchor of the plurality of positioning anchors may be assigned a different transmitter (TX) mode or receiver (RX) mode in the first transmission schedule and the second transmission schedule.

In some embodiments, the at least one scheduling unit may comprise a plurality of scheduling units. In some embodiments, each of the plurality of scheduling units may be physically coupled to a respective one of the plurality of positioning anchors. In some embodiments, each of the plurality of scheduling units may be configured to schedule the transmission of localization signals for its respective positioning anchor according to the time slots assigned to its respective positioning anchor.

In some embodiments, a method for transmitting localization signals in a localization system is provided. In some embodiments, the localization system may comprise a plurality of positioning anchors.

In some embodiments, the method may comprise using the plurality of positioning anchors to wirelessly transmit localization signals capable of being used by self-localizing apparatus within a region to determine position information. In some embodiments, the method may further comprise using at least one scheduling unit communicatively coupled to the plurality of positioning anchors to schedule the transmission of the localization signals according to a first transmission schedule. In some embodiments, the first transmission schedule may define a first temporal order for each of the plurality of positioning anchors to transmit the localization signals.

In some embodiments, the method may further comprise using the at least one scheduling unit to determine when to change from the first transmission schedule to a second transmission schedule. In some embodiments, the second transmission schedule may define a second temporal order for each of the plurality of positioning anchors to transmit localization signals. The second transmission schedule may define a second transmitter (TX) or receiver (RX) mode for each of the plurality of positioning anchors. In some embodiments, the second temporal order may be different than the first temporal order.

In some embodiments, the method may further comprise using the at least one scheduling unit to schedule, in response to a determination to change from the first transmission schedule to the second transmission schedule, the transmission of the localization signals according to the second transmission schedule. In some embodiments, such scheduling may change the positioning performance within the region.

In some embodiments, the localization signals may comprise ultra-wideband (UWB) localization signals. In some embodiments, each localization signal may comprise a preamble code and a payload. In some embodiments, the payload of at least some of the UWB localization signals may comprise commands. In some embodiments, the method may further comprise changing the at least one scheduling unit from the first transmission schedule to the second transmission schedule to optimize the propagation of the commands to at least one of a self-localizing apparatus and the plurality of the anchors.

In some embodiments, each of the plurality of positioning anchors may comprise a clock. In some embodiments, the payload of at least some of the UWB localization signals may comprise synchronization data. In some embodiments, the method may further comprise using each of the plurality of positioning anchors to receive synchronization data from UWB localization signals from at least one other positioning anchor. In some embodiments, the method may further comprise changing the at least one scheduling unit from the first transmission schedule to the second transmission schedule to optimize for the synchronization of the clocks.

In some embodiments, each of the plurality of positioning anchors may comprise a synchronization unit. In some embodiments, the method may further comprise using each synchronization unit to compute, a correction for at least one of a clock offset and a clock rate for its respective clock based on the received synchronization data.

In some embodiments, the first transmission schedule and the second transmission schedule may provide at least one of increased precision, accuracy, and update rate in different portions of the region.

In some embodiments, the first transmission schedule and the second transmission schedule may each comprise a plurality of time slots. In some embodiments, the method may further comprise assigning a different number of time slots in the first transmission schedule and the second transmission schedule to at least one positioning anchor of the plurality of positioning anchors.

In some embodiments, the first transmission schedule and the second transmission schedule may each comprise a plurality of time slots. In some embodiments, the at least one scheduling unit may comprise a plurality of scheduling units. In some embodiments, each of the plurality of schedule units may be physically coupled to a respective one of the plurality of positioning anchors. In some embodiments, the method may further comprise using each of the plurality of scheduling units to schedule the transmission of localization signals for its respective positioning anchor according to the time slots assigned to its respective positioning anchor.

According to another aspect of the present disclosure, a system for determining a transmission schedule for a localization system is provided. In some embodiments, the localization system may comprise a plurality of positioning anchors configured to wirelessly transmit localization signals. The plurality of positioning anchors may be used for determining position information within a region.

In some embodiments, the system may comprise an input. The input may be operable to receive: locations of the plurality of positioning anchors, at least one anchor property of the plurality of positioning anchors, and desired positioning performance within at least one zone within the region.

In some embodiments, the system may comprise at least one processor. The at least one processor may be configured to determine the transmission schedule for the plurality of anchors based on (a) the locations of the plurality of positioning anchors, (b) the at least one anchor property of the plurality of positioning anchors, and (c) the desired positioning performance within the at least one zone. In some embodiments, the plurality of positioning anchors may be configured to wirelessly transmit the localization signals according to the transmission schedule.

In some embodiments, the system may comprise an output operable to communicate the transmission schedule to the plurality of positioning anchors.

In some embodiments, the desired positioning performance within a first of the at least one zone may be greater than the desired positioning performance within a second of the at least one zone. In some embodiments, the determined transmission schedule may be determined to provide greater positioning performance within the first zone. In some embodiments, the at least one zone may cover the region.

In some embodiments, the at least one processor may be configured to determine the transmission schedule by predicting positioning performance within the at least one zone based on the locations of the plurality of positioning anchors and the at least one anchor property of the plurality of positioning anchors; and comparing the predicted positioning performance to the desired positioning performance within the at least one zone.

In some embodiments, the at least one anchor property may comprise transmission power levels. In some embodiments, the at least one processor may be further configured to determine transmission power levels for the transmission schedule. In some embodiments, the transmission schedule may indicates the power level each positioning anchor may be scheduled to use for transmitting its localization signals.

In some embodiments, the at least one anchor property may comprise transmission center frequencies. In some embodiments, the at least one processor may be further configured to determine transmission center frequencies for the transmission schedule. In some embodiments, the transmission schedule may indicates the transmission center frequency each positioning anchor may be scheduled to use for transmitting its localization signals.

In some embodiments, the at least one anchor property may comprise transmission frequency bandwidths. In some embodiments, the at least one processor may be further configured to determine transmission frequency bandwidths for the transmission schedule. In some embodiments, the transmission schedule may indicate the transmission frequency bandwidth each positioning anchor may be scheduled to use for transmitting its localization signals.

In some embodiments, the at least one anchor property may comprise preamble codes. In some embodiments, the at least one processor may be further configured to determine preamble codes for the transmission schedule. In some embodiments, the transmission schedule may indicate the preamble code scheduled to be used with each localization signal.

In some embodiments, the at least one anchor property may comprise preamble modulation schemes. In some embodiments, the at least one processor may be further configured to determine the preamble modulation schemes for the transmission schedule. In some embodiments, the transmission schedule may indicate the preamble modulation scheme scheduled to be used with each localization signal.

In some embodiments, the at least one anchor property may comprise preamble length. In some embodiments, the at least one processor may be further configured to determine the preamble lengths for the transmission schedule. In some embodiments, the transmission schedule may indicate the preamble lengths scheduled to be used with each localization signal.

In some embodiments, the transmission schedule may comprise a plurality of time slots. In some embodiments, the at least one processor may be further configured to assign one or more localization signals to each of the plurality of time slots.

In some embodiments, the at least one processor may be further configured to determine an amount of overlap of the plurality of time slots of the transmission schedule. In some embodiments, the amount of overlap of the plurality of time slots may be fixed. In some embodiments, the amount of overlap of the plurality of time slots may be variable. In some embodiments, the at least one processor may be configured to determine the transmission schedule by determining a temporal order for the plurality of positioning anchors to wirelessly transmit the localization signals.

In some embodiments, the at least one processor may be configured to determine the transmission schedule by determining transmission rates for the plurality of positioning anchors to wirelessly transmit the localization signals.

In some embodiments, the transmission schedule may comprise a plurality of time slots. In some embodiments, the at least one processor may be further configured to assign more time slots to a positioning anchor with a higher transmission rate than to a positioning anchor with a lower transmission rate.

In some embodiments, the at least one processor may be configured to determine the transmission schedule by using an optimization algorithm. In some embodiments, the at least one processor may be configured to determine the transmission schedule by minimizing a cost function.

In some embodiments, the input may be further operable to receive real-time positioning information of self-localizing apparatus within the region. In some embodiments, the at least one processor may be further configured to determine an updated transmission schedule based on the real-time positioning information. In some embodiments, the real-time positioning information may be received from memory of the system. In some embodiments, the desired positioning performance nay comprises a flight pattern.

In some embodiments, a method for determining a transmission schedule for a localization system is provided. In some embodiments, the localization system may comprise a plurality of positioning anchors configured to wirelessly transmit localization signals that may be used for determining position information within a region.

In some embodiments, the method may comprise using an input to receive locations of the plurality of positioning anchors, at least one anchor property of the plurality of positioning anchors, and desired positioning performance within at least one zone within the region.

In some embodiments, the method may further comprise using at least one processor to determine the transmission schedule for the plurality of anchors based on (a) the locations of the plurality of positioning anchors, (b) the at least one anchor property of the plurality of positioning anchors, and (c) the desired positioning performance within the at least one zone, wherein the plurality of positioning anchors are configured to wirelessly transmit the localization signals according to the transmission schedule. In some embodiments, the method may further comprise using an output to communicate the transmission schedule to the plurality of positioning anchors.

In some embodiments, the method may further comprise using the at least one processor to predict positioning performance within the at least one zone based on the locations of the plurality of positioning anchors and the at least one anchor property of the plurality of positioning anchors. The method may further comprise using the at least one processor to compare the predicted positioning performance to the desired positioning performance within the at least one zone.

In some embodiments, the at least one anchor property may comprise transmission power levels. The method may further comprise using at least one processor to determine transmission power levels for the transmission schedule. In some embodiments, the transmission schedule may indicate the power level each positioning anchor may be scheduled to use for transmitting its localization signals.

According to another aspect of the present disclosure, a localization system may comprise a plurality of positioning anchors configured to wirelessly transmit localization signals during time slots of a transmission schedule. In some embodiments, each localization signal may comprise a payload. In some embodiments, the payload for each localization signal may identify at least one positioning anchor of the plurality of positioning anchors configured to transmit a localization signal during at least one future time slot.

In some embodiments, a localization system may comprise a plurality of positioning anchors configured to wirelessly transmit wireless signals during time slots of a transmission schedule. In some embodiments, each wireless signal may comprise a payload. In some embodiments, the payload for each wireless signal may identify a configuration for a transmitter (TX) mode or a configuration for a receiver (RX) mode of at least one positioning anchor of the plurality of positioning anchors configured to transmit or receive a localization or wireless signal during at least one future time slot. In some embodiments, the payload may only identify a configuration for a TX mode and the anchor may determine its RX modes.

In some embodiments, the localization system may comprise a self-localizing apparatus. In some embodiments, the self-localizing apparatus may comprise a receiver. The self-localizing apparatus may be configured to receive at least some of the localization signal, extract the payload of the received localization signals. The self-localizing apparatus may be further configured to determine, based on the extracted payload of the received localization signals, which localization signals to receive for determining positioning information of the self-localizing apparatus. The self-localizing apparatus may be configured to configure the receiver based on the determined localization signals. The self-localizing apparatus may be further configured to receive, using the configured receiver, the determined localization signals, and determine the positioning information of the self-localizing apparatus based on the received determined localization signals.

In some embodiments, each localization signal may comprise a header portion and a payload portion. In some embodiments, the header portion may be a preamble. In some embodiments, the localization signals may comprise a first subgroup and a second subgroup. In some embodiments, the first subgroup and the second subgroup may comprise at least one different transmission characteristic. In some embodiments, the at least one different transmission characteristic may comprise at least one of transmission center frequency, transmission frequency bandwidth, preamble code, and preamble modulation scheme. In some embodiments, a localization signal from the first subgroup and a localization signal from the second subgroup may both be scheduled for transmission during the same time slot of the transmission schedule.

In some embodiments, the self-localizing apparatus may be configured to determine which localization signals to receive based on status information. In some embodiments, the status information may comprise a current position of the self-localizing apparatus. In some embodiments, the status information may comprise variance information associated with a localization estimator of the self-localizing apparatus.

In some embodiments, the self-localizing apparatus may be configured to determine which localization signals to receive to minimize variance associated with the localization estimator.

In some embodiments, the payload for each localization signal may identify two positioning anchors of the plurality of positioning anchors configured to transmit localization signals during the same future time slot. In some embodiments, the payload for each localization signal may identify at least one positioning anchor of the plurality of positioning anchors configured to transmit a localization signal during each of at least two future time slots.

In some embodiments, a localization method is provided. The method may comprise using a plurality of positioning anchors to wirelessly transmit localization signals during time slots of a transmission schedule. In some embodiments, each localization signal may comprise a payload. In some embodiments, the payload for each localization signal may identify at least one positioning anchor of the plurality of positioning anchors configured to transmit a localization signal during at least one future time slot.

The method may comprise using a self-localizing apparatus to receive at least some of the localization signals, extract the payload of the received localization signals, and determine which localization signals to receive for determining positioning information of the self-localizing apparatus based on the extracted payload of the received localization signals. In some embodiments, the method may comprise configuring the receiver of the self-localizing apparatus based on the determined localization signals. In some embodiments, the method may further comprise using the configured receiver to receive the determined localization signals, and determine the positioning information.

In some embodiments, the localization signals may comprise a first subgroup and a second subgroup, wherein the first subgroup and the second subgroup comprise at least one different transmission characteristic.

In some embodiments, the at least one different transmission characteristic comprises at least one of transmission center frequency, transmission frequency bandwidth, preamble code, and preamble modulation scheme. In some embodiments, a localization signal from the first subgroup and a localization signal from the second subgroup may both be scheduled for transmission during the same time slot of the transmission schedule.

In some embodiments, the method may further comprise using the self-localizing apparatus to determine which localization signals to receive based on status information. In some embodiments, the status information may comprise current position of the self-localizing apparatus. In some embodiments, the status information nay comprise variance information associated with a localization estimator of the self-localizing apparatus.

In some embodiments, the method may further comprise using the self-localizing apparatus to determine which localization signals to receive to minimize variance associated with the localization estimator.

In some embodiments, the payload for each localization signal may identify two positioning anchors of the plurality of positioning anchors configured to transmit localization signals during the same future time slot. In some embodiments, the payload for each localization signal may identify at least one positioning anchor of the plurality of positioning anchors configured to transmit a localization signal during each of at least two future time slots.

According to another aspect of the present disclosure, a localization system is provided that comprises a first localization network configured to wirelessly transmit first localization signals using a first set of time synchronized anchors. In some embodiments, the first localization signals may be usable to determine position information within a first region.

In some embodiments, the localization system may further comprise a second localization network configured to wirelessly transmit second localization signals using a second set of time synchronized anchors. In some embodiments, the second localization signals may be usable to determine position information within a second region.

In some embodiments, the localization system may further comprise a bridge anchor. In some embodiments, the bridge anchor may be configured to receive first time synchronization information related to the first set of time synchronized anchors. The bridge anchor may be configured to receive second time synchronization information related to the second set of time synchronized anchors, transmit time synchronization information related to the first time synchronization information to the second localization network. In some embodiments, the time synchronization information may comprise at least one of a clock offset and a clock rate of the first localization network.

In some embodiments, the second localization network may be configured to adjust at least one of a clock offset and a clock rate based on the received time synchronization information to time synchronize the second localization network with the first localization network.

In some embodiments, the bridge anchor may be configured to transmit the time synchronization information wirelessly. In some embodiments, wherein at least one anchor of the second localization network may be configured to wirelessly receive the time synchronization information.

In some embodiments, the bridge anchor may be further configured to transmit time synchronization information related to the second time synchronization information to the first localization network.

In some embodiments, the bridge anchor may be configured to transmit the time synchronization information wirelessly to a self-localizing apparatus of the first localization network to enable the self-localizing apparatus to determine its position using the first localization network and second localization network.

In some embodiments, the self-localizing apparatus may be configured to switch between receiving localization signals from the first localization network and localization signals from the second localization network based on the received time synchronization information. In some embodiments, the switching may be achieved by reconfiguring the receiver of the self-localizing apparatus. In some embodiments, the signals transmitted by the bridge anchor may comprise a payload representative of the receiver configuration for at least one of the two localization networks. In some embodiments, the self-localizing apparatus may reconfigure its receiver based on the payload received from the bridge anchor.

In some embodiments, the bridge anchor may be further configured to wirelessly transmit one or more of the second localization signals. In some embodiments, the one or more of the second localization signals may each comprise a preamble and a payload. In some embodiments, the payload of the one or more of the second localization signals may comprise the time synchronization information.

In some embodiments, the localization system of claim may further comprising a self-localizing apparatus. In some embodiments, the self-localizing apparatus may be configured to receive the second localization signals, and determine position information based on the received second localization signals. In some embodiments, the self-localizing apparatus may be configured to configure its receiver to receive the first localization signals, and determine position information based on the received first localization signals.

In some embodiments, the self-localizing apparatus may be further configured to receive time synchronization information from the bridge anchor. In some embodiments, the determining position information may be based on the received first localization signals may be further carried out in dependence of the time synchronization information from the bridge anchor.

In some embodiments, the self-localizing apparatus may be configured to receive one or more of the first localization signals from the first localization network, receive the one or more of the second localization signals from the bridge anchor, and receive one or more of the second localization signals from the second localization network. In some embodiments, the self-localizing apparatus may be further configured to determine position information based on the one or more first localization signals received from the first localization network, the one or more of the second localization signals received from the second localization network, and the time synchronization information received from the bridge anchor.

In some embodiments, the bridge anchor may be configured to alternately receive localization signals from the first localization network and the second localization network. In some embodiments, the first region and the second region at least partially overlap.

In some embodiments, the bridge anchor may configured to determine relative time information based on the received first time synchronization information and the received second time synchronization information and wherein the time synchronization information transmitted by the bridge anchor comprises the relative time information.

In some embodiments, the localization system may comprise a first localization network configured to transmit first localization signals using a first set of time synchronized anchors. In some embodiments, the first localization signals are usable to determine position information within a first region.

In some embodiments, the localization system may comprise a second localization network configured to transmit second localization signals using a second set of time synchronized anchors. In some embodiments, the second localization signals are usable to determine position information within a second region. In some embodiments, the localization system may comprise a bridge anchor.

In some embodiments, the bridge anchor may be configured to receive first time synchronization information related to the first set of time synchronized anchors, and to receive second time synchronization information related to the second set of time synchronized anchors. In some embodiments, the bridge anchor may be configured to transmit first localization signals based the received first time synchronization information as part of the first localization network in a first mode of operation; and to transmit second localization signals based the received second time synchronization information as part of the second localization network in a second mode of operation.

In some embodiments, the bridge anchor may be configured to switch between the first mode of operation and the second mode of operation based on desired positioning performance of at least one of the first and second localization networks.

In some embodiments, a localization method is provided. In some embodiments, the localization method may comprise using a first localization network to wirelessly transmit first localization signals using a first set of time synchronized anchors. The first localization signals may be usable to determine position information within a first region.

In some embodiments, the localization method may comprise using a second localization network to wirelessly transmit second localization signals using a second set of time synchronized anchors. The second localization signals may be usable to determine position information within a second region.

In some embodiments, the localization method may further comprise using a bridge anchor to receive first time synchronization information related to the first set of time synchronized anchors, and to receive second time synchronization information related to the second set of time synchronized anchors. The localization method may further comprise using a bridge anchor to transmit time synchronization information related to the first time synchronization information to the second localization network.

In some embodiments, the localization method may further comprise using the bridge anchor to transmit the time synchronization information wirelessly to a self-localizing apparatus of the first localization network to enable the self-localizing apparatus to determine its position using the first localization network and second localization network.

In some embodiments, another localization method is provided. In some embodiments, the localization method may comprise using a first localization network to transmit first localization signals using a first set of time synchronized anchors. The first localization signals may be usable to determine position information within a first region.

In some embodiments, the localization method may also comprise using a second localization network to transmit second localization signals using a second set of time synchronized anchors. The second localization signals may be usable to determine position information within a second region.

In some embodiments, the localization method may further comprise using a bridge anchor to receive first time synchronization information related to the first set of time synchronized anchors, and to receive second time synchronization information related to the second set of time synchronized anchors.

In some embodiments, the localization method may also comprise using the bridge anchor to wirelessly transmit first localization signals based the received first time synchronization information as part of the first localization network in a first mode of operation, and transmitting second localization signals based the received second time synchronization information as part of the second localization network in a second mode of operation.

According to another aspect of the present disclosure, a localization system is provided that comprises a first anchor configured to transmit a first timestampable localization signal. In some embodiments, the first timestampable localization signal comprise a preamble followed by a payload.

The localization system may further comprise a second anchor configured to transmit a second timestampable localization signal. In some embodiments, the second timestampable localization signal may comprise a preamble followed by a payload. In some embodiments, the transmission of the second timestampable localization signal may partially overlap with the transmission of the first timestampable localization signal such that the second timestampable localization signal does not overlap the preamble of the first timestampable localization signal. In some embodiments, the first timestampable localization signal and the second timestampable localization signal may be received within a common region.

In some embodiments, transmission of the second timestampable localization signal may begin before the transmission of first timestampable localization signal ends. In some embodiments, the transmission of the second timestampable localization signal may begin after the transmission of the first timestampable localization signal's preamble ends. In some embodiments, the preamble of the second timestampable localization signal may overlap with the payload of the first timestampable localization signal.

In some embodiments, the preamble of the first timestampable localization signal may comprise a first coded preamble. In some embodiments, the preamble of the second timestampable localization signal may comprise a second, identically coded preamble.

In some embodiments, the localization system may comprise a self-localizing apparatus. In some embodiments, the self-localizing apparatus may be configured to receive the entire first timestampable localization signal or the entire second timestampable localization signal, but not the entire first timestampable localization signal and the entire second timestampable localization signal. In some embodiments, the self-localizing apparatus may be configured to receive the preamble of the first timestampable localization signal and the entire second timestampable localization signal.

In some embodiments, the first timestampable localization signal may further comprise a start of frame delimiter (SFD) between the preamble and the payload. In some embodiments, the second timestampable localization signal may not overlap the SFD of the first timestampable localization signal. In some embodiments, the self-localizing apparatus may be configured to receive the preamble and the SFD of the first timestampable localization signal and the entire second timestampable localization signal.

In some embodiments, the self-localizing apparatus may be further configured to determine a timestamp corresponding to the reception of the preamble or the SFD of the first localization signal; and determine position information based on a known transmission time of the first timestampable localization signal and the timestamp.

In some embodiments, the payload of the first timestampable localization signal may comprise first and second payloads. In some embodiments, the second timestampable localization signal may overlap with the second payload, but not the first payload, of the first timestampable localization signal. In some embodiments, the self-localizing apparatus may be configured to receive the first payload of the first timestampable localization signal and the entire second timestampable localization signal.

In some embodiments, the first anchor may be configured to transmit the first timestampable localization signal using a transmission center frequency and a transmission frequency bandwidth. In some embodiments, the second anchor may be configured to transmit the second timestampable localization signal using the transmission center frequency and the transmission frequency bandwidth.

In some embodiments, the first anchor may be configured to transmit a plurality of first timestampable localization signals. In some embodiments, the second anchor may be configured to transmit a plurality of second timestampable localization signals. In some embodiments, each of the plurality of second timestampable localization signals may partially overlap with a corresponding one of the plurality of first timestampable localization signals.

In some embodiments, the localization system may further comprise four or more anchors. In some embodiments, the four or more anchors may comprise the first anchor and the second anchor. In some embodiments, the four or more anchors may be configured to transmit timestampable localization signals according to a transmission schedule that partially overlaps the transmission of the timestampable localization signals, thereby causing the timestampable localization system to transmit more timestampable signals per time unit than if the timestampable localization signals did not overlap.

In some embodiments, the payload of each of the first and second timestampable localization signals identifies when an anchor may be configured to transmit a localization signal during a future time slot.

In some embodiments, the self-localizing apparatus may be configured to receive an identification of when an anchor may be configured to transmit a localization signal during a future time lost, and select which timestampable signal to receive in its entirety based on the received identification.

In some embodiments, method for localization is provided. In some embodiments, the method may comprise using a first anchor to transmit a first timestampable localization signal. In some embodiments, the first timestampable localization signal may comprise a preamble followed by a payload.

In some embodiments, the method may further comprise using a second anchor to transmit a second timestampable localization signal. In some embodiments, the second timestampable localization signal may comprise a preamble followed by a payload. In some embodiments, the transmission of the second timestampable localization signal may partially overlap with the transmission of the first timestampable localization signal such that the second timestampable localization signal does not overlap the preamble of the first timestampable localization signal. In some embodiments, the first timestampable localization signal and the second timestampable localization signal may be received within a common region.

In some embodiments, the first timestampable localization signal may comprise a first ultra-wideband (UWB) signal, and the second timestampable localization signal may comprise a second UWB signal.

In some embodiments, the first timestampable localization signal may further comprises a start of frame delimiter (SFD) between the preamble and the payload. In some embodiments, the second timestampable localization signal may not overlap the SFD of the first timestampable localization signal. In some embodiments, the method may further comprise using a self-localizing apparatus to receive the preamble and the SFD of the first timestampable localization signal and the entire second timestampable localization signal.

In some embodiments, the method may further comprise using the self-localizing apparatus to determine a timestamp corresponding to the reception of the preamble or the SFD of the first localization signal; and determine position information based on a known transmission time of the first timestampable localization signal and the timestamp.

In some embodiments, the payload of the first timestampable localization signal may comprise first and second payloads and wherein the second timestampable localization signal may overlap with the second payload, but not the first payload, of the first timestampable localization signal. In some embodiments, the method may further comprise using a self-localizing apparatus to receive, the first payload of the first timestampable localization signal and the entire second timestampable localization signal.

According to another aspect of the present disclosure, a method for operating a localization system is provided. In some embodiments, the localization system may comprise a plurality of positioning anchors. In some embodiments, the method may comprise allocating a first subset of the plurality of positioning anchors to a first subnetwork. The method may also comprise operating the first subnetwork of the first subset of positioning anchors to transmit first localization signals according to a first transmission schedule. In some embodiments, the first localization signals may be used by a self-localizing apparatus to determine position information within a first geographic region;

The method may also comprise adjusting the allocation of the plurality of positioning anchors to the first subnetwork such that a second subset of the plurality of positioning anchors may be allocated to the first subnetwork. In some embodiments, at least one positioning anchor of the first subset is not included in the second subset and at least one positioning anchor of the second subset is not included in the first subset.

The method may also comprise operating the first subnetwork of the second subset of positioning anchors to transmit second localization signals according to a second transmission schedule. In some embodiments, the second localization signals may be used by the self-localizing apparatus to determine position information within a second geographic region. In some embodiments, the first geographic region and the third geographic region do not overlap.

In some embodiments, the first localization signals may comprise first ultra-wideband (UWB) signals, and the second localization signals may comprise second UWB signals.

In some embodiments, the method may also comprise allocating a third subset of the plurality of positioning anchors to a second subnetwork, and operating the second subnetwork of the third subset of positioning anchors to transmit third localization signals according to a third transmission schedule. In some embodiments, the third localization signals may be used by a self-localizing apparatus to determine position information within a third geographic region.

In some embodiments, the method may also comprise operating the first subnetwork and the second subnetwork simultaneously. In some embodiments, the third subset of the plurality of positioning anchors may not comprise any of the positioning anchors of the first subset of the plurality of positioning anchors.

In some embodiments, the method may also comprise operating the first subnetwork of the first subset of the plurality of positioning anchors and the second subnetwork simultaneously. In some embodiments, the third subset of the plurality of positioning anchors may comprise at least one positioning anchor of the first subset of the plurality of positioning anchors. In some embodiments, the transmission of the first and third localization signals may use at least one different transmission characteristic. In some embodiments, the at least one different transmission characteristic may comprise at least one of transmission center frequency, transmission frequency bandwidth, preamble code, and preamble modulation scheme.

In some embodiments, the method may also comprise operating the first subnetwork of the first subset of the plurality of positioning anchors and the second subnetwork simultaneously. In some embodiments, at least one of the anchors of the first subnetwork may be operated using a lower transmission power to reduce the size of the first geographic region such that first geographic region and the second geographic region do not overlap.

In some embodiments, the first subnetwork and the second subnetwork may transmit first and second localization signals using the same transmission characteristics. In some embodiments, the first and second localization signals may overlap in time.

In some embodiments, the method may also comprise adjusting the allocation of the plurality of positioning anchors to the second subnetwork such that a fourth subset of the plurality of positioning anchors may be allocated to the second subnetwork. In some embodiments, at least one positioning anchor of the third subset is not included in the fourth subset and at least one positioning anchor of the fourth subset is not included in the third subset.

In some embodiments, the method may also comprise additionally adjusting the allocation of the plurality of positioning anchors to the first subnetwork to dynamically change the geographic region serviced by the first subnetwork. In some embodiments, the allocation of the plurality of positioning anchors to the first subnetwork may be adjusted based on a known motion of at least one self-localizing apparatus serviced by the first subnetwork. In some embodiments, the motion may be a flight pattern.

In some embodiments, the method may also comprise receiving a known location of the at least one self-localizing apparatus. In some embodiments, the location may be received from the memory of the self-localizing apparatus. In some embodiments, the received known location retrieved from memory is an expected location of a self-localizing apparatus. In some embodiments, the expected location is predicted based on a time elapsed since the beginning of a trajectory execution. In some embodiments, the use of the first subnetwork in the localization system may increase positioning performance within the first geographic region.

In some embodiments, a localization system is provided. The localization system may comprise a plurality of positioning anchor. In some embodiments, the localization system may be configured to allocate a first subset of the plurality of positioning anchors to a first subnetwork. The localization system may be configured to operate the first subnetwork of the first subset of positioning anchors to transmit first localization signals according to a first transmission schedule. In some embodiments, the first localization signals may be used by a self-localizing apparatus to determine position information within a first geographic region;

The localization system may also be configured to adjust the allocation of the plurality of positioning anchors to the first subnetwork such that a second subset of the plurality of positioning anchors may be allocated to the first subnetwork. In some embodiments, at least one positioning anchor of the first subset is not included in the second subset and at least one positioning anchor of the second subset is not included in the first subset.

The localization system may also be configured to operate the first subnetwork of the second subset of positioning anchors to transmit second localization signals according to a second transmission schedule. In some embodiments, the second localization signals may be used by the self-localizing apparatus to determine position information within a second geographic region.

In some embodiments, the first localization signals may comprise first ultra-wideband (UWB) signals, and the second localization signals may comprise second UWB signals.

In some embodiments, the localization system may be further configured to allocate a third subset of the plurality of positioning anchors to a second subnetwork; and operate the second subnetwork of the third subset of positioning anchors to transmit third localization signals according to a third transmission schedule. In some embodiments, the third localization signals may be used by a self-localizing apparatus to determine position information within a third geographic region.

In some embodiments, another localization system is provided. In some embodiments, the localization system may comprise a plurality of positioning anchors. In some embodiments, the plurality of positioning anchors may comprise at least a first positioning anchor, a second positioning anchor, and a third positioning anchor.

In some embodiments, a first subset of positioning anchors may be configured to transmit first localization signals during a first time period according to a first transmission schedule. In some embodiments, the first localization signals may be used by a self-localizing apparatus to determine position information within a first geographic region. In some embodiments, the first subset of positioning anchors may comprise the first positioning anchor and the second positioning anchor. In some embodiments, the third positioning anchor may be configured to not transmit during the first time period.

In some embodiments, a second subset of positioning anchors may be configured to transmit second localization signals during a second subsequent time period according to a second transmission schedule. In some embodiments, the second localization signals may be used by the self-localizing apparatus to determine position information within a second geographic region. In some embodiments, the second subset of positioning anchors may comprise the first positioning anchor and the third positioning anchor. In some embodiments, the second positioning anchor may be configured to not transmit during the second time period.

According to another aspect of the present disclosure, a method for operating a localization system is provided. In some embodiments, the localization system may comprise a plurality of positioning anchors. In some embodiments, the method may comprise using the plurality of positioning anchors to transmit first timestampable localization signals according to a first transmission schedule. In some embodiments, the first timestampable localization signals may comprise a first set of transmission characteristics and wherein the first timestampable localization signals may be used by a self-localizing apparatus to determine position information within a first geographic region.

In some embodiments, the method may further comprise using the plurality of positioning anchors to transmit second timestampable localization signals according to a second transmission schedule. In some embodiments, the second timestampable localization signals may comprise a second set of transmission characteristics. In some embodiments, the second timestampable localization signals may be used by the self-localizing apparatus to determine position information within a second geographic region.

In some embodiments, the first geographic region and the second geographic region may at least partially overlap. In some embodiments, at least some of the first timestampable localization signals and the second timestampable localization signals may be transmitted such that they overlap in time. In some embodiments, at least one type of transmission characteristic may be different in the first set of transmission characteristics and the second set of transmission characteristics to reduce interference between the at least some of the first timestampable localization signals and the second timestampable localization signals that overlap.

In some embodiments, the first timestampable localization signals may comprise first ultra-wideband (UWB) signals, and the second timestampable localization signals may comprise second UWB signals.

In some embodiments, the at least one type of transmission characteristic may comprise at least one of transmission center frequency, transmission frequency bandwidth, preamble code, and preamble modulation scheme.

In some embodiments, one of the plurality of positioning anchors may comprise first and second antennas and may be configured to transmit one of the first timestampable localization signals using the first antenna and one of the second timestampable localization signals using the second antenna.

In some embodiments, the one positioning anchor may be configured to transmit the one first timestampable localization signal and the one second timestampable localization signal such that they overlap in time.

In some embodiments, the self-localizing apparatus may comprise at least one reception setting. In some embodiments, the method may further comprise configuring the at least one reception setting of the self-localizing apparatus to select which of the first and second timestampable localization signals to receive.

In some embodiments, the method may further comprise using the self-localizing apparatus to determine whether to receive one of the first timestampable localization signals or one of the second timestampable localization signals based on information. In some embodiments, the information may comprise configuration information received as part of a previously received timestampable localization signal. In some embodiments, the information may comprise information stored on memory of the self-localizing apparatus. In some embodiments, the information may comprise one of an internal metric of the self-localizing apparatus and an internal state of the self-localizing apparatus.

In some embodiments, the method may further comprise using one of the plurality of positioning anchors to receiving at least one of the first timestampable localization signals and the second timestampable localization signals transmitted by at least one other of the plurality of positioning anchors. In some embodiments, the method may further comprise using the one positioning anchor to determine whether to receive one of the first timestampable localization signals or one of the second timestampable localization signals based on information. In some embodiments, the information may comprise configuration information received as part of a previously received timestampable localization signal. In some embodiments, the information may comprise information stored on memory of the one positioning anchor.

In some embodiments, the first set of transmission characteristics and the second set of transmission characteristics may comprise the same center frequency and transmission frequency bandwidth.

In some embodiments, a localization system is provided. In some embodiments, the localization system may comprise a plurality of positioning anchors. In some embodiments, the plurality of positioning anchors may be configured to transmit first timestampable localization signals according to a first transmission schedule. In some embodiments, the first timestampable localization signals may comprise a first set of transmission characteristics. In some embodiments, the first timestampable localization signals may be used by a self-localizing apparatus to determine position information within a first geographic region.

In some embodiments, the plurality of positioning anchors may be configured to transmit second timestampable localization signals according to a second transmission schedule. In some embodiments, the second timestampable localization signals may comprise a second set of transmission characteristics. In some embodiments, the second timestampable localization signals may be used by the self-localizing apparatus to determine position information within a second geographic region.

In some embodiments, the first geographic region and the second geographic region may at least partially overlap. In some embodiments, at least some of the first timestampable localization signals and the second timestampable localization signals may be transmitted such that they overlap in time. In some embodiments, at least one type of transmission characteristic may be different in the first set of transmission characteristics and the second set of transmission characteristics to reduce interference between the at least some of the first timestampable localization signals and the second timestampable localization signals that overlap.

In some embodiments, the first timestampable localization signals may comprise first ultra-wideband (UWB) signals, and the second timestampable localization signals may comprise second UWB signals.

In some embodiments, the plurality of positioning anchors may further comprises a first and a second set of three radio frequency anchors. Each of the radio frequency anchors may be configured to emit a radio frequency signal. In some embodiments, each of the radio frequency anchors may comprise an anchor antenna, an anchor clock interface operable to receive an anchor clock signal, and an analog transmission electronics.

In some embodiments, each of the radio frequency anchors may comprise digital transmission electronics operationally coupled to the anchor clock interface and the analog transmission electronics and operable to emit the radio frequency signal at a scheduled transmission time with reference to the anchor clock signal.

In some embodiments, the system may further comprise a self-localizing apparatus. In some embodiments, the self-localizing apparatus may be configured to receive the radio frequency signals. In some embodiments, the self-localizing apparatus may comprise an apparatus antenna; an apparatus clock interface configured to receive an apparatus clock signal; and apparatus analog reception electronics.

In some embodiments, the system may further comprise apparatus digital reception electronics operationally coupled to the apparatus clock interface and the apparatus analog reception electronics and configured to timestamp the received radio frequency signals with reference to the apparatus clock signal. In some embodiments, the first and second sets of radio frequency anchors may operate in geographically adjacent cells with an overlapping region. In some embodiments, the self-localizing apparatus may be configured to receive the radio frequency signals from the first set of radio frequency anchors or from the second set of radio frequency anchors when positioned in the overlapping region. In some embodiments, the plurality of positioning anchors may be configured to use at least one of separation of signals in time, separation of signals in space, or separation of signals in frequency to mitigate signal interference between the first and second sets of radio frequency anchors.

In some embodiments, the at least one type of transmission characteristic may comprise at least one of transmission center frequency, transmission frequency bandwidth, preamble code, and preamble modulation scheme.

In some embodiments, one of the plurality of positioning anchors may be further configured to receive at least one of the first timestampable localization signals and the second timestampable localization signals transmitted by at least one other of the plurality of positioning anchors.

According to another aspect of the present disclosure, a self-localizing apparatus for determining a vehicle's position is provided. In some embodiments, the self-localizing apparatus may comprise a first subsystem and a second subsystem.

In some embodiments, the first subsystem may comprise a first antenna that may be operable to receive a first radio frequency signal, and a first analog reception electronics that may be configured to amplify the first radio frequency signal. The first subsystem may also comprise a first digital reception electronics that may configured to timestamp the amplified first radio frequency signal with reference to a clock signal; and a first localization unit that may be configured to compute a first estimate of the self-localizing apparatus' position in a coordinate system based on the timestamp of the amplified first radio frequency signal.

In some embodiments, the second subsystem may comprise a second antenna that may be operable to receive a second radio frequency signal, and a second analog reception electronics that may be configured to amplify the second radio frequency signal. The second subsystem may also comprise a second digital reception electronics that may configured to timestamp the amplified second radio frequency signal with reference to a clock signal; and a second localization unit that may be configured to compute a second estimate of the self-localizing apparatus' position in a coordinate system based on the timestamp of the amplified second radio frequency signal.

In some embodiments, each of the first subsystem and the second subsystem may be configured to be selectively used to control the vehicle without relying on the other subsystem.

In some embodiments, the first subsystem and the second subsystem may be fully redundant. For example, in some embodiments, the first subsystem may further comprise a first clock. In some embodiments, the first digital reception electronics may be configured to timestamp the amplified first radio frequency signal with reference to a first clock signal generated by the first clock. In some embodiments, the second subsystem may further comprise a second clock. In some embodiments, the second digital reception electronics may be configured to timestamp the amplified second radio frequency signal with reference to a second clock signal generated by the second clock.

In some embodiments, the first subsystem may further comprise a first synchronization unit configured to compute a clock correction for the first clock. In some embodiments, the second subsystem may further comprise a second synchronization unit configured to compute a clock correction for the second clock.

In some embodiments, the first subsystem may further comprise a first sensor for sensing at least one of a position, orientation, or velocity of the self-localizing apparatus relative to an external reference frame. In some embodiments, the first localization unit may be configured to compute the first estimate of the self-localizing apparatus' position further based on a first signal generated by the first sensor. In some embodiments, the second subsystem may further comprise a second sensor for sensing at least one of a position, orientation, or velocity of the self-localizing apparatus relative to an external reference frame. In some embodiments, the second localization unit may be configured to compute the second estimate of the self-localizing apparatus' position further based on a second signal generated by the second sensor. In some embodiments, the first sensor may be a first global property sensor; and the second sensor may be a second global property sensor.

In some embodiments, the first subsystem may further comprise a first compensation unit. In some embodiments, the first localization unit may be configured to compute the first estimate of the self-localizing apparatus' position further based on data provided by the first compensation unit. In some embodiments, the second subsystem may further comprise a second compensation unit. In some embodiments, the second localization unit may be configured to compute the second estimate of the self-localizing apparatus' position further based on data provided by the second compensation unit.

In some embodiments, the first subsystem and the second subsystem may be partially redundant. For example, in some embodiments, the self-localizing apparatus may comprise a clock. The first digital reception electronics may be configured to timestamp the amplified first radio frequency signal with reference to a first clock signal generated by the clock. The second digital reception electronics may be also configured to timestamp the amplified second radio frequency signal with reference to the first clock signal generated by the clock. In some embodiments, the self-localizing apparatus may comprise a synchronization unit. In some embodiments, the synchronization unit may be configured to compute a clock correction for the clock.

In some embodiments, the self-localizing apparatus may further comprise a sensor for sensing at least one of a position, orientation, or velocity of the self-localizing apparatus relative to an external reference frame. In some embodiments, the first localization unit may be configured to compute the first estimate of the self-localizing apparatus' position further based on a first signal generated by the sensor. In some embodiments, the second localization unit may be configured to compute the second estimate of the self-localizing apparatus' position further based on the first signal generated by the sensor. In some embodiments, the sensor is a global property sensor.

In some embodiments, the self-localizing apparatus may further comprise a compensation unit. In some embodiments, the first localization unit may be configured to compute the first estimate of the self-localizing apparatus' position further based on data provided by the compensation unit. In some embodiments, the second localization unit may be configured to compute the second estimate of the self-localizing apparatus' position further based on data provided by the compensation unit.

In some embodiments, a self-localizing apparatus for use in a localization network is provided. In some embodiments, the localization network may comprise a plurality of anchors configured to transmit radio frequency signal. In some embodiments, the self-localizing apparatus may comprise an antenna that may be operable to receive radio frequency signals from the localization network. In some embodiments, the self-localizing apparatus may comprise analog reception electronics that may be configured to amplify the radio frequency signals received by the antenna.

In some embodiments, the self-localizing apparatus may comprise digital reception electronics that may be configured to timestamp the amplified radio frequency signals with reference to a first clock signal to generate a plurality of timestamps. In some embodiments, the self-localizing apparatus may comprise a localization unit. In some embodiments, the localization unit may be configured to compute an estimate of the self-localizing apparatus' position in a coordinate system based on the timestamps, and determine to receive a selected future radio frequency signal from at least two future radio frequency signals.

In some embodiments, the localization unit may be configured to configure at least one of the antenna, the analog reception electronics, and the digital reception electronics to receive the selected radio frequency signal; and compute an updated estimate of the self-localizing apparatus' position in the coordinate system based on the received selected radio frequency signal.

In some embodiments, the self-localizing apparatus of claim 170 may further comprise digital and analog transmission electronics that may be configured to transmit the self-localizing apparatus' position to at least one of the plurality of anchors.

In some embodiments, the received radio frequency signals may each comprises a payload. In some embodiments, the digital reception electronics may be configured to extract the payload. In some embodiments, the payload may identify at least one anchor of the plurality of anchors that may be configured to transmit a localization signal during at least one future time slot.

In some embodiments, the localization unit may be configured to determine to receive the selected future radio frequency signal based on the location of the anchor that may be configured to transmit the selected future radio frequency signal and a variance associated with the computed estimate of the self-localizing apparatus' position.

In some embodiments, the at least two future radio frequency signals may partially overlap in time. In some embodiments, the localization unit may be configured to determine to receive the entire selected future radio frequency signal and only a portion of another of the at least two future radio frequency signals. In some embodiments, the localization unit is configured to receive one of (i) a portion of the first and the entire second of the at least two future radio frequency signals, or (ii) the entire first and none of the second of the at least two future radio frequency signals. In some embodiments, the at least two future radio frequency signals may use different preamble codes. In some embodiments, the at least two future radio frequency signals may be transmitted by different localization networks.

In some embodiments, the localization unit may be further configured to compute the estimate of the self-localizing apparatus' position in the coordinate system based on known locations of the anchors configured to transmit the radio frequencies received by the antenna.

In some embodiments, a method for determining a vehicle's position using a self-localizing apparatus is provided. In some embodiments, the self-localizing apparatus may comprise a first subsystem and a second subsystem.

In some embodiments, the method may comprise using a first antenna of the first subsystem to receive a first radio frequency signal. The method may further comprise using first analog reception electronics of the first subsystem to amplify the first radio frequency signal.

The method may further comprise using first digital reception electronics of the first subsystem to timestamp the amplified first radio frequency signal with reference to a clock signal. The method may further comprise using a first localization unit of the first subsystem to compute a first estimate of the self-localizing apparatus' position in a coordinate system.

In some embodiments, the method may comprise using a second antenna of the second subsystem to receive a second radio frequency signal. The method may further comprise using second analog reception electronics of the second subsystem to amplify the second radio frequency signal.

The method may further comprise using second digital reception electronics of the second subsystem to timestamp the amplified second radio frequency signal with reference to a clock signal. The method may further comprise using a second localization unit of the second subsystem to compute a second estimate of the self-localizing apparatus' position in a coordinate system.

The method may further comprise using one of the first subsystem and the second subsystem without relying on the other subsystem to control the vehicle.

In some embodiments, a localization method for a self-localizing apparatus in a localization network is provided. In some embodiments, the localization network may comprise a plurality of anchors configured to transmit radio frequency signals. In some embodiments, the method may comprise using an antenna to receiving radio frequency signals from the localization network. The method may also comprise using analog reception electronics to amplify the radio frequency signals received by the antenna. The method may also comprise, using digital reception electronics to timestamp the amplified radio frequency signals with reference to a first clock signal to generate a plurality of timestamps.

The method may also comprise using a localization unit to compute an estimate of the self-localizing apparatus' position in a coordinate system based on the timestamps. The method may also comprise using the localization unit to determine to receive a selected future radio frequency signal from at least two future radio frequency signals. The method may also comprise using the localization unit to configure the analog reception electronics, and the digital reception electronics to receive the selected radio frequency signal. The method may further comprise using the localization unit to compute an updated estimate of the self-localizing apparatus' position in the coordinate system based on the received selected radio frequency signal.

While certain aspects of the present disclosure have been particularly shown and described with reference to exemplary embodiments thereof, it will be understood by those of ordinary skill in the art that various changes in form and details may be made therein without departing from the spirit and scope of the present disclosure as defined by the following claims. For example, specific aspects of the present disclosure that apply to timestampable signals may apply equally well to UWB signals, or vice versa. As another example, specific aspects of the present disclosure that apply to timestampable signals may apply equally to localization signals that are not timestampable.

It will also be understood that the transceivers, apparatus, and components of the present disclosure may comprises hardware components or a combination of hardware and software components. The hardware components may comprise any suitable tangible components that are structured or arranged to operate as described herein. Some of the hardware components (e.g., the scheduler, scheduling unit controller, scheduling unit, synchronization unit, scheduling unit, localization unit, compensation unit, control unit, digital reception electronics, digital transmission electronics, etc.) may comprise processing circuity (e.g., a processor or a group of processors) to perform the operations described herein. The software components may comprise code recorded on tangible computer-readable medium. The processing circuitry may be configured by the software components to perform the described operations.

It is therefore desired that the present embodiments be considered in all respects as illustrative and not restrictive.

FIGURE NUMERALS

100 Localization system
110 Scheduler
120 Scheduling unit controller
130, 130a, 130b Transceivers
140, 140a, 140b Self-localizing apparatuses
202 Timestampable localization signal
210 Clock
212, 212a, 212b Antennas
214, 214a, 214b Transceiver analog transmission electronics
216, 216a, 216b Transceiver digital transmission electronics
218 Scheduling unit
220, 220a, 220b Transceiver analog reception electronics
222, 222a, 222b Transceiver digital reception electronics
224 Transceiver synchronization unit
226 Sensor
228 Global property sensor
230 Transceiver memory
302 Transceiver signal
400 Structural element
402a, 402b Clock interfaces
502, 502a, 502b, 502c Self-localizing apparatus antennas
504, 504a, 502b Self-localizing apparatus analog reception electronics
506, 506a, 506b Self-localizing apparatus digital reception electronics
508 Self-localizing apparatus clock
510 Self-localizing apparatus synchronization unit
512, 512a, 512b Self-localizing apparatus localization units
514, 514a, 514b Self-localizing apparatus onboard sensors
516 Compensation unit
518 Self-localizing apparatus memory
520 Global property sensor
600 Progression of time as measured in the clock of self-localizing apparatus A
602 Arrival time of first message at self-localizing apparatus A's antenna
604 Difference between time-stamp of first message by self-localizing apparatus A's digital reception electronics and arrival time of first message at self-localizing apparatus A's antenna
606 Time-stamp of first message by self-localizing apparatus A's digital reception electronics 612 Arrival time of second message at self-localizing apparatus A's antenna
614 Difference between time-stamp of second message by self-localizing apparatus A's digital reception electronics and arrival time of second message at self-localizing apparatus A's antenna
616 Time-stamp of second message by self-localizing apparatus A's digital reception electronics
700 Structural element
702 Communication path
800 Radio frequency switch
900 Reception timestamp
902 Clock correction
904 Effect compensation
906 Corrected time of arrival
910 Remote global property
912 Compare
914 Global property model
920 Extended Kalman filter process update
922 Prior
924 Extended Kalman filter measurement update
926 Posterior
930 Location
940 Control unit
1000 Mobile robot
1002 Central processing electronics
1004 Actuators
1006 Accelerometer
1008 Gyroscope
1010 Propeller
1102 Horizontal controller
1104 Command specifying vehicle acceleration in the x-direction
1106 Command specifying vehicle acceleration in the y-direction
1110 Vertical controller
1112 Command specifying vehicle acceleration in the z-direction
1120 Reduced attitude controller
1122 Command specifying vehicle pitch rate
1124 Command specifying vehicle roll rate
1130 Yaw controller
1132 Command specifying vehicle yaw rate
1142 Body rate controller
1144 Actuator commands
1146 Movement
1200 Radial coverage of transceiver signal
1210 Wireless communication between two in-range transceivers
1220 Overlapping spatial coverage by multiple transceivers within one cell
1240 Overlapping spatial coverage by multiple transceiver cells
1410 Overlapping spatial coverage by multiple transceivers within one cell
1420 Overlapping spatial coverage by multiple transceiver cells
1610 Input parameter map with performance contours
1620 Input parameter map with binary performance
1710 Dynamic positioning performance map
1810 Panel
1820a, 1820b Location maps
1830a, 1830b Coverage requirement maps
1840a, 1840b Schedules
1910a, 1910b, 1910c, 1910d Location maps
2010a, 2010b, 2010c, 2010d Location maps
2110 Localization signal preamble
2112 Localization signal start frame delimiter (SFD)
2114 Localization signal packet header
2116 Localization signal payload
2122 Time at which localization signal transmission begins
2124 Time at which localization signal transmission ends
2200 Transmission schedule
2202a, 2202b, 2202c, 2202d Localization signals
2310 Receiver activity
2402a, 2402b, 2402c Localization signals
2500 Localization system
2510 Performance map
2610 Performance map
2700 Localization system
2710 Performance map
2810 Performance map
2900 Transmission schedule
3000 Transmission schedule
3100 Flow Chart
3102 Flow chart step
3104 Flow chart step
3106 Flow chart decision
3108 Flow chart step
3110 Flow chart decision
3112 Flow chart step
3114 Flow chart decision
3116 Flow chart step
3118 Flow chart step
3210 Flow chart step
3222 Flow chart step
3124 Flow chart step
3200 Indoor and outdoor environment
3210 Building
3220 Access area
3230 Flying machine
3240 Landing area
3250 Second area
3310 Localization network
3320 Localization network
3330 Bridge anchors

What is claimed:

1. A localization system, comprising:
a plurality of positioning anchors configured to wirelessly transmit localization signals capable of being used by self-localizing apparatus within a region to determine position information; and
at least one scheduling unit communicatively coupled to the plurality of positioning anchors, wherein the at least one scheduling unit is configured to:
schedule the transmission of the localization signals according to a first transmission schedule, wherein the first transmission schedule defines a first temporal order for each of the plurality of positioning anchors to transmit the localization signals;
determine when to change from the first transmission schedule to a second transmission schedule, wherein the second transmission schedule defines a second temporal order for each of the plurality of positioning anchors to transmit localization signals, and wherein the second temporal order is different than the first temporal order; and
schedule, in response to a determination to change from the first transmission schedule to the second transmission schedule, the transmission of the localization signals according to the second transmission schedule, thereby changing the positioning performance within the region.

2. The localization system of claim 1, wherein the at least one scheduling unit is configured to determine when to change from the first transmission schedule to a second transmission schedule based on a known location of the self-localizing apparatus.

3. The localization system of claim 2, wherein the at least one scheduling unit is configured to receive the known location of the self-localizing apparatus.

4. The localization system of claim 1, wherein the at least one scheduling unit is configured to determine when to change from the first transmission schedule to a second transmission schedule based on a known motion of the self-localizing apparatus.

5. The localization system of claim 4, wherein the motion is a flight pattern.

6. The localization system of claim 1, wherein the localization signals comprise ultra-wideband (UWB) localization signals, each comprising a preamble code and a payload.

7. The localization system of claim 6, wherein the payload of at least some of the UWB localization signals comprises commands and wherein the at least one scheduling unit is configured to change from the first transmission schedule to the second transmission schedule to optimize the propagation of the commands to at least one of a self-localizing apparatus and the plurality of the anchors.

8. The localization system of claim 6, wherein each of the plurality of positioning anchors comprises a clock, wherein the payload of at least some of the UWB localization signals comprises synchronization data, wherein each of the plurality of positioning anchors is configured to receive the synchronization data from UWB localization signals received from at least one other positioning anchor, and wherein the at least one scheduling unit is configured to change from the first transmission schedule to the second transmission schedule to optimize for the synchronization of the clocks.

9. The localization system of claim 8, wherein each of the plurality of positioning anchors comprises a synchronization unit, wherein each synchronization unit is configured to compute a correction for at least one of a clock offset and a clock rate for its respective clock based on the received synchronization data.

10. The localization system of claim 1, wherein the first transmission schedule and the second transmission schedule provide at least one of increased precision, accuracy, and update rate in different portions of the region.

11. The localization system of claim 1, wherein the first transmission schedule and the second transmission schedule each comprise a plurality of time slots, wherein at least one positioning anchor of the plurality of positioning anchors is assigned a different number of time slots in the first transmission schedule and the second transmission schedule.

12. The localization system of claim 1, wherein the first transmission schedule and the second transmission schedule each comprise a plurality of time slots, wherein the at least one scheduling unit comprises a plurality of scheduling units, wherein each of the plurality of schedule units is physically coupled to a respective one of the plurality of positioning anchors, and wherein each of the plurality of scheduling units is configured to schedule the transmission of localization signals for its respective positioning anchor according to the time slots assigned to its respective positioning anchor.

13. The localization system of claim 1, wherein the region comprises a three-dimensional region.

14. A method for transmitting localization signals in a localization system comprising a plurality of positioning anchors, the method comprising:
wirelessly transmitting, using the plurality of positioning anchors, localization signals capable of being used by self-localizing apparatus within a region to determine position information;
scheduling, using at least one scheduling unit communicatively coupled to the plurality of positioning anchors, the transmission of the localization signals according to a first transmission schedule, wherein the first transmission schedule defines a first temporal order for each of the plurality of positioning anchors to transmit the localization signals;
determining, using the at least one scheduling unit, when to change from the first transmission schedule to a second transmission schedule, wherein the second transmission schedule defines a second temporal order for each of the plurality of positioning anchors to transmit localization signals, and wherein the second temporal order is different than the first temporal order; and
scheduling, using the at least one scheduling unit, in response to a determination to change from the first transmission schedule to the second transmission schedule, the transmission of the localization signals according to the second transmission schedule, thereby changing the positioning performance within the region.

15. The method of claim 14, wherein the localization signals comprise ultra-wideband (UWB) localization signals, each comprising a preamble code and a payload wherein the payload of at least some of the UWB localization signals comprises commands, the method further comprising:
changing the at least one scheduling unit from the first transmission schedule to the second transmission schedule to optimize the propagation of the commands to at least one of a self-localizing apparatus and the plurality of the anchors.

16. The method of claim 15, wherein each of the plurality of positioning anchors comprises a clock, wherein the payload of at least some of the UWB localization signals comprises synchronization data, the method further comprising:
receiving, using each of the plurality of positioning anchors, synchronization data from UWB localization signals received from at least one other positioning anchor; and
changing the at least one scheduling unit from the first transmission schedule to the second transmission schedule to optimize for the synchronization of the clocks.

17. The method of claim 16, wherein each of the plurality of positioning anchors comprises a synchronization unit, the method further comprising
computing, using each synchronization unit, a correction for at least one of a clock offset and a clock rate for its respective clock based on the received synchronization data.

18. The method of claim 14, wherein the first transmission schedule and the second transmission schedule provide at least one of increased precision, accuracy, and update rate in different portions of the region.

19. The method of claim 14, wherein the first transmission schedule and the second transmission schedule each comprise a plurality of time slots, the method further comprising:

assigning a different number of time slots in the first transmission schedule and the second transmission schedule to at least one positioning anchor of the plurality of positioning anchors.

20. The method of claim 14, wherein the first transmission schedule and the second transmission schedule each comprise a plurality of time slots, wherein the at least one scheduling unit comprises a plurality of scheduling units, wherein each of the plurality of schedule units is physically coupled to a respective one of the plurality of positioning anchors, the method further comprising:

scheduling, using each of the plurality of scheduling units, the transmission of localization signals for its respective positioning anchor according to the time slots assigned to its respective positioning anchor.

* * * * *